US012651132B2

(12) United States Patent
Feldman

(10) Patent No.: US 12,651,132 B2
(45) Date of Patent: *Jun. 9, 2026

(54) AUTHENTICATION SYSTEMS AND METHODS

(71) Applicant: ARK Ideaz, Inc., Pottstown, PA (US)

(72) Inventor: Randy Feldman, Pottstown, PA (US)

(73) Assignee: ARK Ideaz, Inc., Pottstown, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/747,996

(22) Filed: Jun. 19, 2024

(65) Prior Publication Data

US 2024/0428027 A1     Dec. 26, 2024

Related U.S. Application Data

(63) Continuation-in-part of application No. 18/133,202, filed on Apr. 11, 2023, now Pat. No. 12,056,563, which is a continuation of application No. 17/670,551, filed on Feb. 14, 2022, now Pat. No. 11,657,241, which is a continuation of application No. 16/106,206, filed on Aug. 21, 2018, now Pat. No. 11,281,875, which is a continuation of application No. 15/835,638, filed on Dec. 8, 2017, now Pat. No. 10,410,024, which is a continuation of application
(Continued)

(51) Int. Cl.
| | |
|---|---|
| *G06K 7/10* | (2006.01) |
| *G01S 5/04* | (2006.01) |
| *G01S 13/87* | (2006.01) |
| *G06Q 30/018* | (2023.01) |
| *G08B 7/06* | (2006.01) |

(52) U.S. Cl.
CPC ............ *G06K 7/10366* (2013.01); *G01S 5/04* (2013.01); *G06K 7/10346* (2013.01); *G06Q 30/0185* (2013.01); *G08B 7/06* (2013.01); *G01S 13/878* (2013.01)

(58) Field of Classification Search
None
See application file for complete search history.

(56) References Cited

U.S. PATENT DOCUMENTS

| | | | | |
|---|---|---|---|---|
| 5,681,165 A | * | 10/1997 | Feldman .................. | A61C 7/30 433/8 |
| 6,904,410 B1 | * | 6/2005 | Weiss .................. | G06Q 20/203 705/28 |

(Continued)

*Primary Examiner* — Fekadeselassie Girma
(74) *Attorney, Agent, or Firm* — The Juhasz Law Firm

(57) ABSTRACT

A method includes: storing, within first and second computing devices, a first immutable token (IT) that incorporates at least a first data concerning a first characteristic of a registered virtual object; receiving, at the first and second computing devices, and from a reading device, a request to authenticate another virtual object as being the registered virtual object based on a second IT associated with the other virtual object; separately comparing, at the first and second computing devices, the second IT to the first IT; separately determining, at the first and second computing devices, whether to authenticate the other virtual object based on a degree to which the second IT matches the first IT; and separately transmitting, from the first and second computing devices, and to the reading device, separate indications of whether the other virtual object is able to be authenticated.

20 Claims, 53 Drawing Sheets

Related U.S. Application Data

No. 14/754,062, filed on Jun. 29, 2015, now Pat. No. 9,870,496, which is a continuation of application No. 13/495,183, filed on Jun. 13, 2012, now Pat. No. 9,070,131.

(60) Provisional application No. 61/496,772, filed on Jun. 14, 2011.

(56)        References Cited

U.S. PATENT DOCUMENTS

| | | | | |
|---|---|---|---|---|
| 7,222,791 | B2 * | 5/2007 | Heilper | G06Q 30/06 |
| | | | | 235/487 |
| 8,818,874 | B2 * | 8/2014 | Veseli | G06Q 20/203 |
| | | | | 705/16 |
| 8,831,677 | B2 * | 9/2014 | Villa-Real | H04M 1/66 |
| | | | | 455/552.1 |
| 9,070,131 | B2 * | 6/2015 | Feldman | G06K 7/10366 |
| 9,870,496 | B2 * | 1/2018 | Feldman | G08B 7/06 |
| 10,410,024 | B2 * | 9/2019 | Feldman | G01S 5/04 |
| 11,048,894 | B2 * | 6/2021 | Feldman | G01S 5/04 |
| 11,281,875 | B2 * | 3/2022 | Feldman | G06Q 30/0185 |
| 12,056,563 | B2 * | 8/2024 | Feldman | G01S 5/04 |
| 2001/0016871 | A1 * | 8/2001 | Fujita | H04L 67/535 |
| | | | | 705/16 |
| 2002/0010679 | A1 * | 1/2002 | Felsher | G06F 21/6245 |
| | | | | 705/51 |
| 2003/0050891 | A1 * | 3/2003 | Cohen | G06Q 20/108 |
| | | | | 705/42 |
| 2004/0088231 | A1 * | 5/2004 | Davis, Jr. | G06Q 10/087 |
| | | | | 705/28 |
| 2005/0080677 | A1 * | 4/2005 | Foss, Jr. | G06Q 30/06 |
| | | | | 705/16 |
| 2006/0004639 | A1 * | 1/2006 | O'Keefe, Jr. | G06Q 20/12 |
| | | | | 705/26.81 |
| 2006/0022059 | A1 * | 2/2006 | Juds | G06K 19/06056 |
| | | | | 235/494 |
| 2006/0253710 | A1 * | 11/2006 | Koo | G06Q 20/4014 |
| | | | | 713/186 |
| 2007/0005331 | A1 * | 1/2007 | Han | G06Q 10/06398 |
| | | | | 703/22 |
| 2007/0106897 | A1 * | 5/2007 | Kulakowski | H04L 9/083 |
| | | | | 713/168 |
| 2008/0005557 | A1 * | 1/2008 | Chester | H04L 9/3263 |
| | | | | 713/155 |
| 2008/0191009 | A1 * | 8/2008 | Gressel | H04W 4/021 |
| | | | | 235/382 |
| 2009/0106134 | A1 * | 4/2009 | Royyuru | G06Q 40/00 |
| | | | | 705/35 |
| 2010/0179914 | A1 * | 7/2010 | Levin | G06K 19/18 |
| | | | | 235/375 |
| 2010/0205652 | A1 * | 8/2010 | Bouchard | G06Q 30/0269 |
| | | | | 707/769 |
| 2014/0162598 | A1 * | 6/2014 | Villa-Real | G07F 7/0886 |
| | | | | 455/411 |
| 2022/0164556 | A1 * | 5/2022 | Feldman | G01S 5/04 |
| 2023/0281406 | A1 * | 9/2023 | Feldman | G06Q 30/0185 |
| | | | | 340/5.8 |
| 2024/0428027 | A1 * | 12/2024 | Feldman | G06K 7/10366 |

* cited by examiner

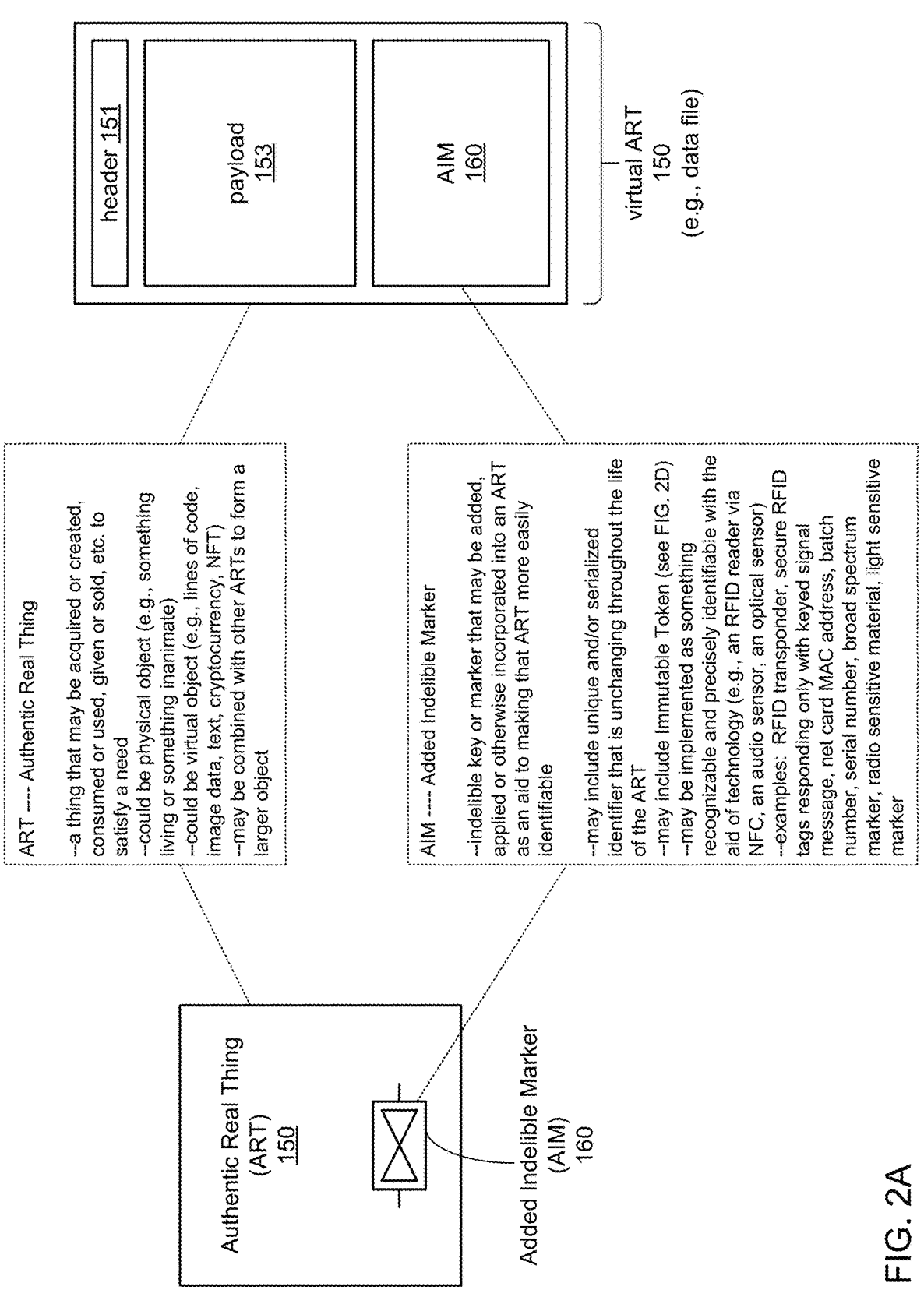

header 151 payload
153

AIM
160 virtual ART
150
(e.g., data file)

ART — Authentic Real Thing

--a thing that may be acquired or created, consumed or used, given or sold, etc. to satisfy a need
--could be physical object (e.g., something living or something inanimate)
--could be virtual object (e.g., lines of code, image data, text, cryptocurrency, NFT)
--may be combined with other ARTs to form a larger object AIM — Added Indelible Marker --indelible key or marker that may be added, applied or otherwise incorporated into an ART as an aid to making that ART more easily identifiable
--may include unique and/or serialized identifier that is unchanging throughout the life of the ART
--may include Immutable Token (see FIG. 2D)
--may be implemented as something recognizable and precisely identifiable with the aid of technology (e.g., an RFID reader via NFC, an audio sensor, an optical sensor)
--examples: RFID transponder, secure RFID tags responding only with keyed signal message, net card MAC address, batch number, serial number, broad spectrum marker, radio sensitive material, light sensitive marker Authentic Real Thing
(ART)
150

Added Indelible Marker
(AIM)
160

FIG. 2A

TA --- True Artifact

--an object or solution that combines multiple ARTs, where the multiple ARTs may include and/or carry multiple AIMs --use or consumption of a TA may include the use or consumption of the multiple ARTs that it includes

ART 150

AIM 160

• • •

ART 150

AIM 160

True Artifact (TA) 100

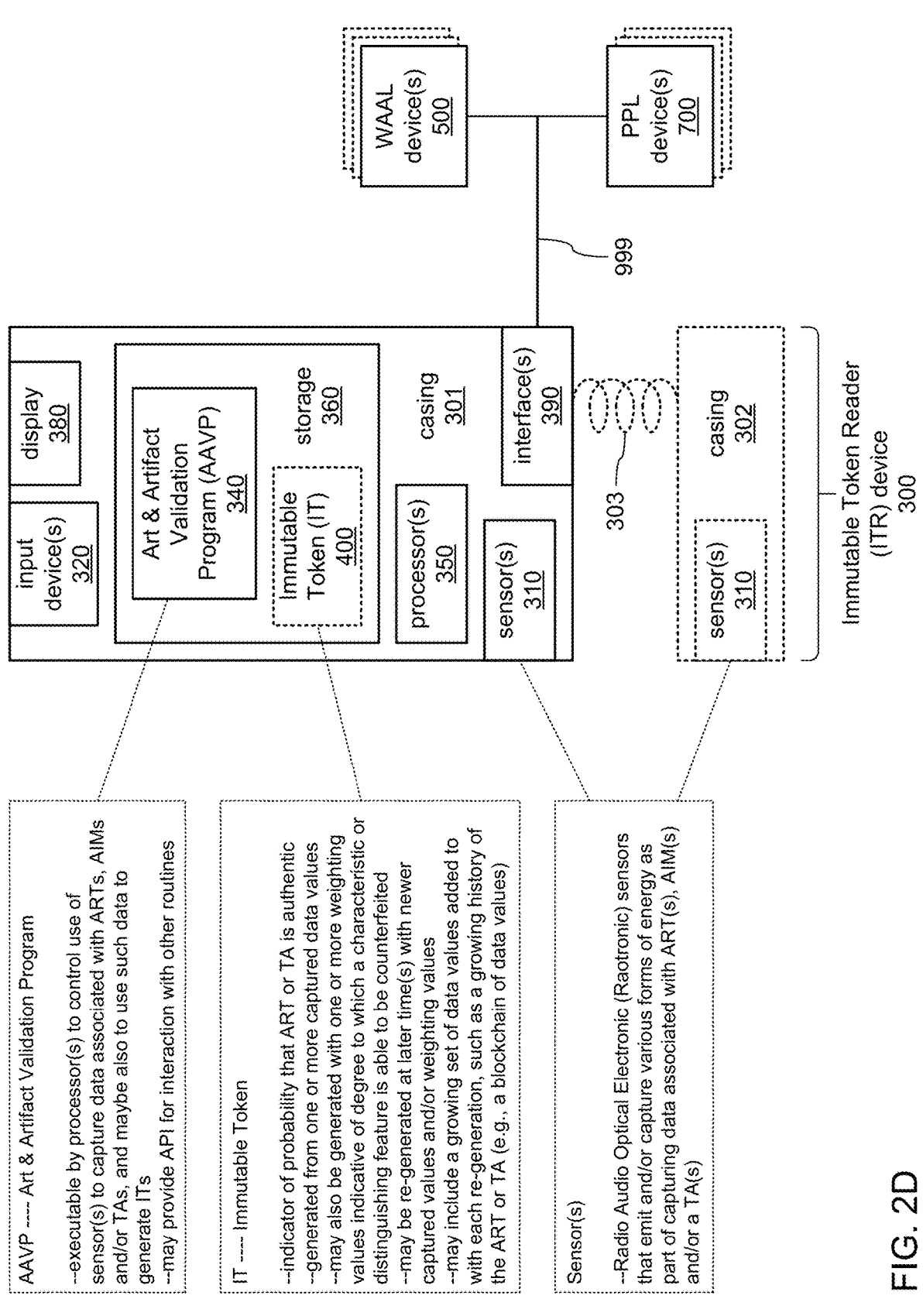

AAVP ---- Art & Artifact Validation Program

--executable by processor(s) to control use of sensor(s) to capture data associated with ARTs, AIMs and/or TAs, and maybe also to use such data to generate ITs
--may provide API for interaction with other routines IT ---- Immutable Token --indicator of probability that ART or TA is authentic
--generated from one or more captured data values
--may also be generated with one or more weighting values indicative of degree to which a characteristic or distinguishing feature is able to be counterfeited
--may be re-generated at later time(s) with newer captured values and/or weighting values
--may include a growing set of data values added to with each re-generation, such as a growing history of the ART or TA (e.g., a blockchain of data values)

Sensor(s)

--Radio Audio Optical Electronic (Raotronic) sensors that emit and/or capture various forms of energy as part of capturing data associated with ART(s), AIM(s) and/or a TA(s)

FIG. 2D

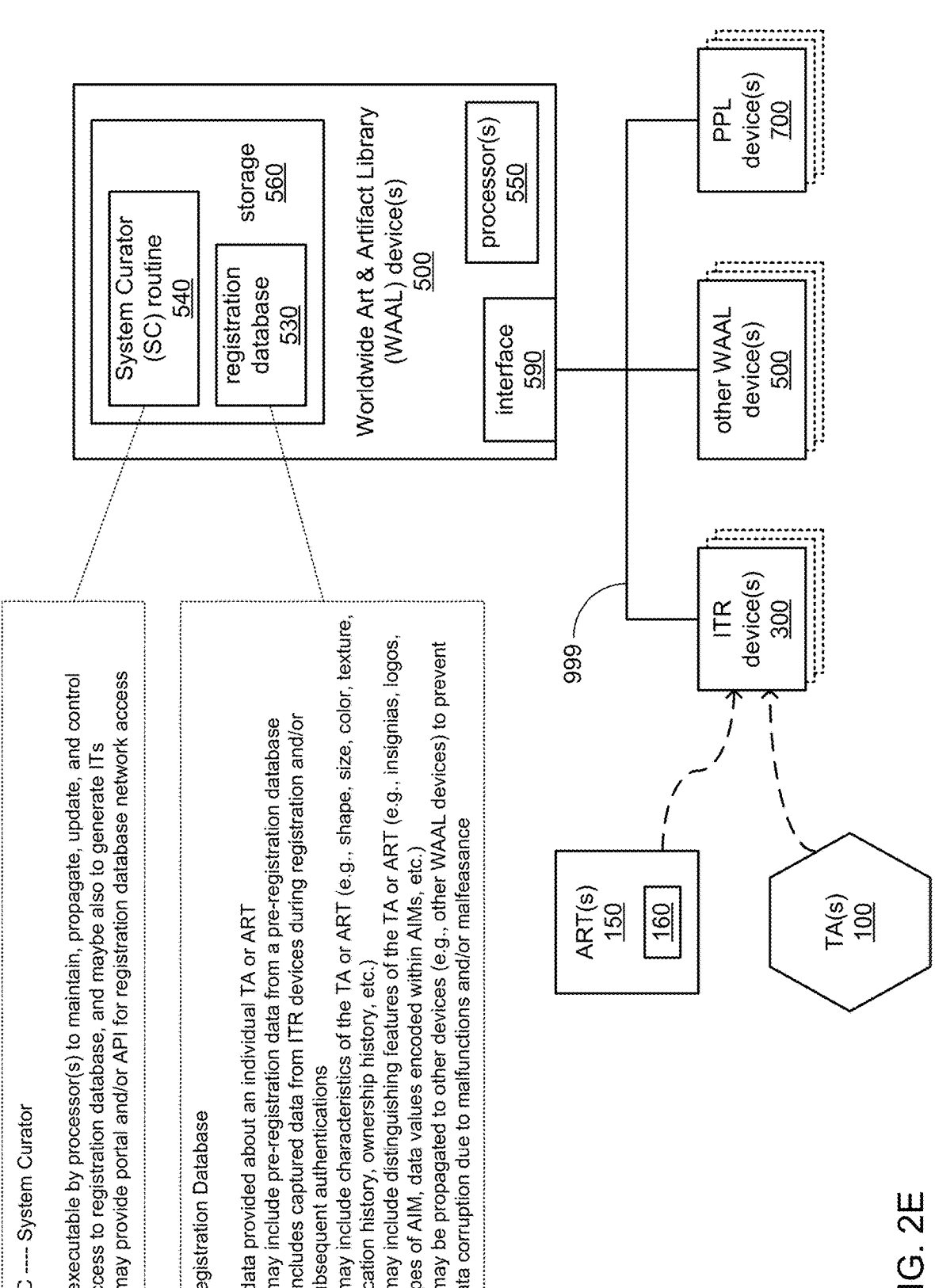

SC — System Curator

—executable by processor(s) to maintain, propagate, update, and control access to registration database, and maybe also to generate ITs
—may provide portal and/or API for registration database network access Registration Database —data provided about an individual TA or ART
—may include pre-registration data from a pre-registration database
—includes captured data from ITR devices during registration and/or subsequent authentications
—may include characteristics of the TA or ART (e.g., shape, size, color, texture, location history, ownership history, etc.)
—may include distinguishing features of the TA or ART (e.g., insignias, logos, types of AIM, data values encoded within AIMs, etc.)
—may be propagated to other devices (e.g., other WAAL devices) to prevent data corruption due to malfunctions and/or malfeasance Worldwide Art & Artifact Library (WAAL) device(s) 500

System Curator (SC) routine 540 registration database 530 storage 560 processor(s) 550 interface 590

PPL device(s) 700 other WAAL device(s) 500

ITR device(s) 300

999

ART(s) 150

= IT (Immutable Token)

Figure 5G:
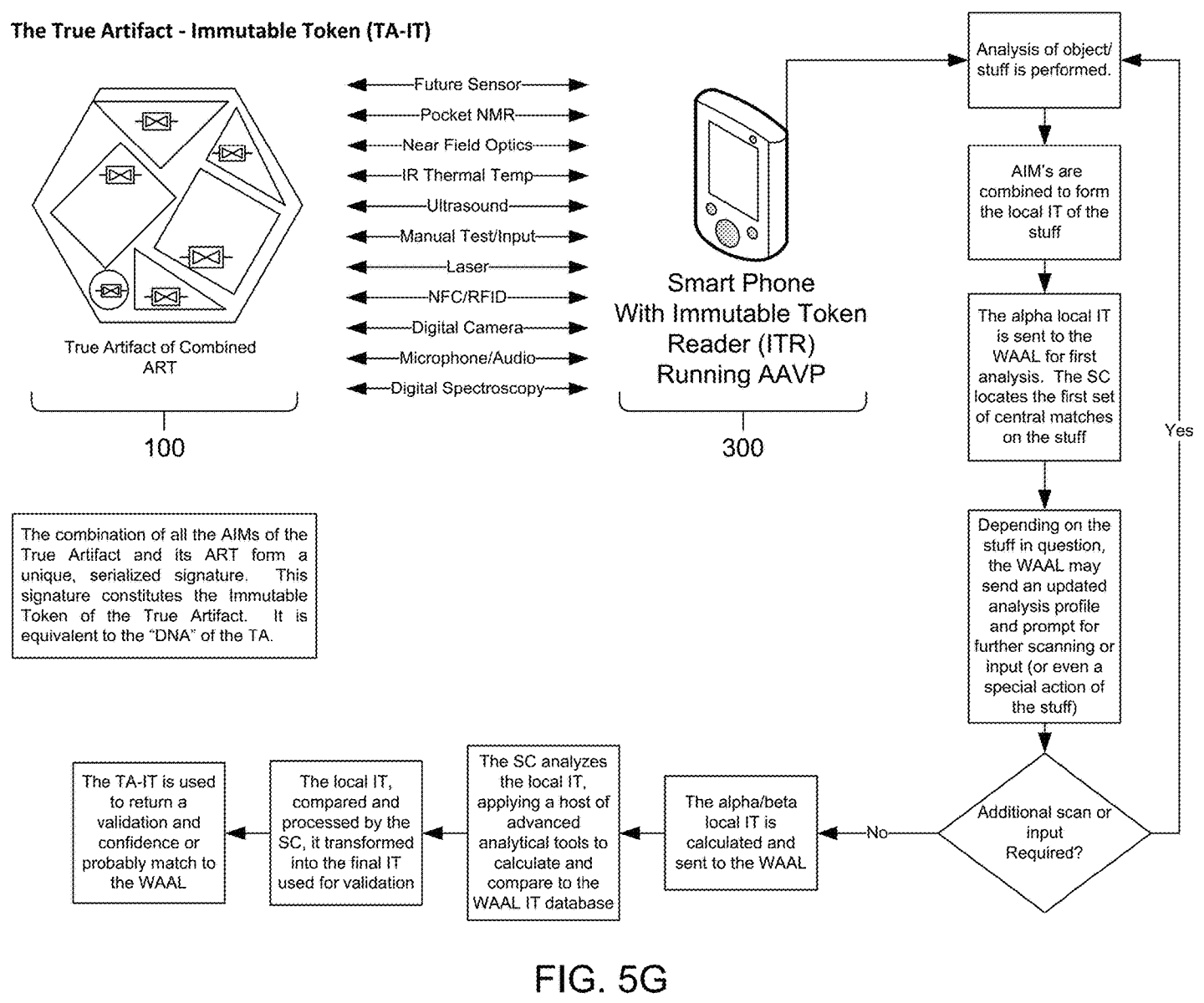

The True Artifact - Immutable Token (TA-IT)

Future Sensor
Pocket NMR
Near Field Optics
IR Thermal Temp
Ultrasound
Manual Test/Input
Laser
NFC/RFID
Digital Camera
Microphone/Audio
Digital Spectroscopy Smart Phone With Immutable Token Reader (ITR) Running AAVP

300

True Artifact of Combined ART

100

The combination of all the AIMs of the True Artifact and its ART form a unique, serialized signature. This signature constitutes the Immutable Token of the True Artifact. It is equivalent to the 'DNA' of the TA.

Analysis of object/stuff is performed.

AIM's are combined to form the local IT of the stuff

The alpha local IT is sent to the WAAL for first analysis. The SC locates the first set of central matches on the stuff Depending on the stuff in question, the WAAL may send an updated analysis profile and prompt for further scanning or input (or even a special action of the stuff)

Additional scan or input Required?

Yes

No

The alpha/beta local IT is calculated and sent to the WAAL

The SC analyzes the local IT, applying a host of advanced analytical tools to calculate and compare to the WAAL IT database The local IT, compared and processed by the SC, it transformed into the final IT used for validation The TA-IT is used to return a validation and confidence or probably match to the WAAL

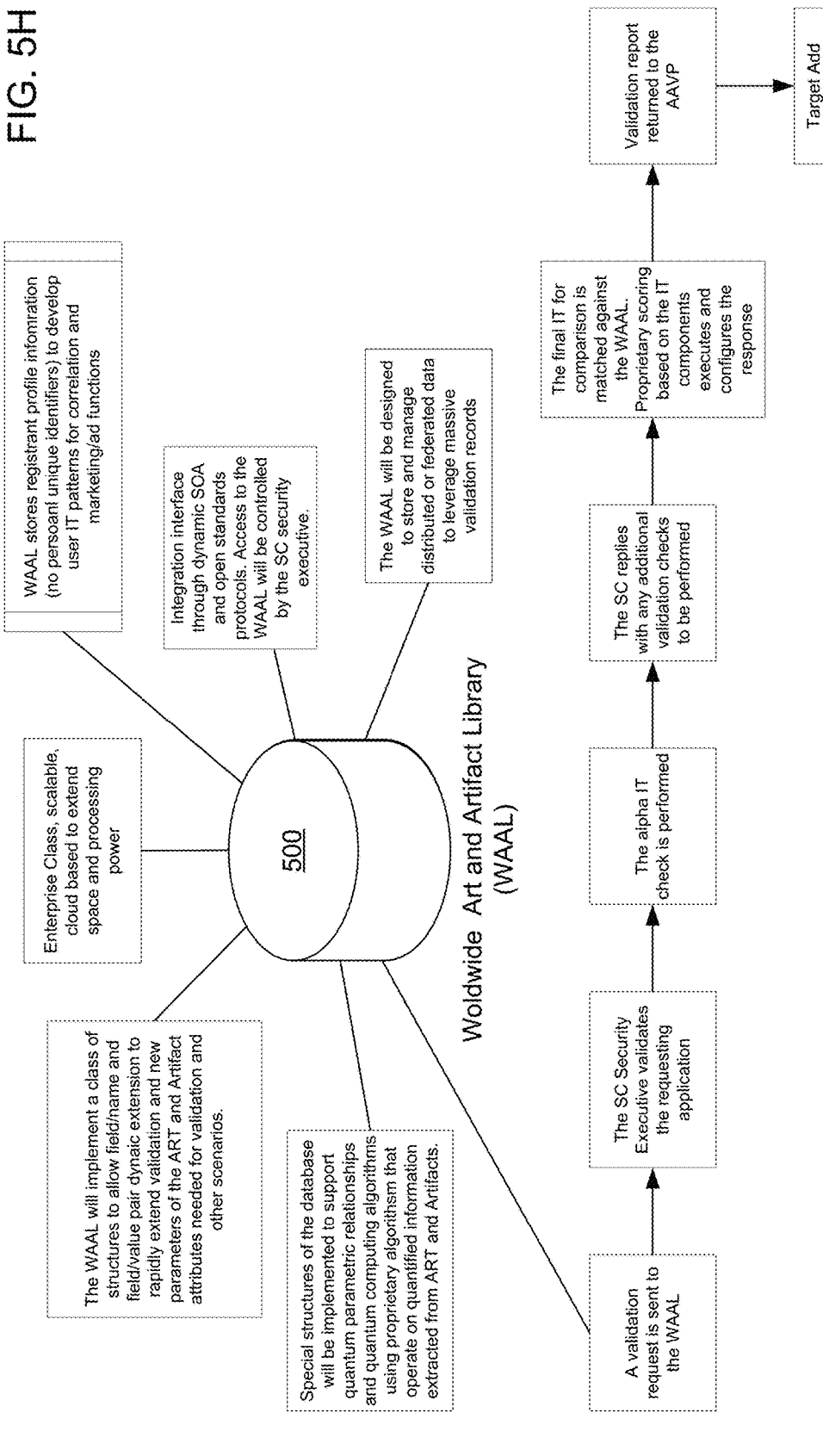

FIG. 5H

WAAL stores registrant profile information (no persoani unique identifiers) to develop user IT patterns for correlation and marketing/ad functions Integration interface through dynamic SCA and open standards protocols. Access to the WAAL will be controlled by the SC security executive.

The WAAL will be designed to store and manage distributed or federated data to leverage massive validation records Enterprise Class, scalable, cloud based to extend space and processing power

500

The WAAL will implement a class of structures to allow field/name and field/value pair dynaic extension to rapidly extend validation and new parameters of the ART and Artifact attributes needed for validation and other scenarios.

Special structures of the database will be implemented to support quantum parametric relationships and quantum computing algorithsm that operate on quantified information extracted from ART and Artifacts.

Woldwide Art and Artifact Library (WAAL)

Validation report returned to the AAVP

Target Add returned based on profile pattern match and IT matching, optimized by probabilistic quantification.

The final IT for comparison is matched against the WAAL. Proprietary scoring based on the IT components executes and configures the response The SC replies with any additional validation checks to be performed The alpha IT check is performed The SC Security Executive validates the requesting application A validation request is sent to the WAAL

Worldwide ART & Artifact Library (WAAL): an electronic system and network based library to store, disseminate, index and manage the ART and Artifact AIMs and ITs. The WAAL will support the history, information, lineage and other details about the ART and Artifacts needed to be validated or tracked. The WALL will be internet accessible and cloud computer based to insure access and scale commensurate with today and future requirements. Today, the GS1 and EPC Global organizations have offered a standard with which the WAAL may be based or compatible (EPCIS 1.01 specification from EPCglobal/GS1).

Figure 5K:
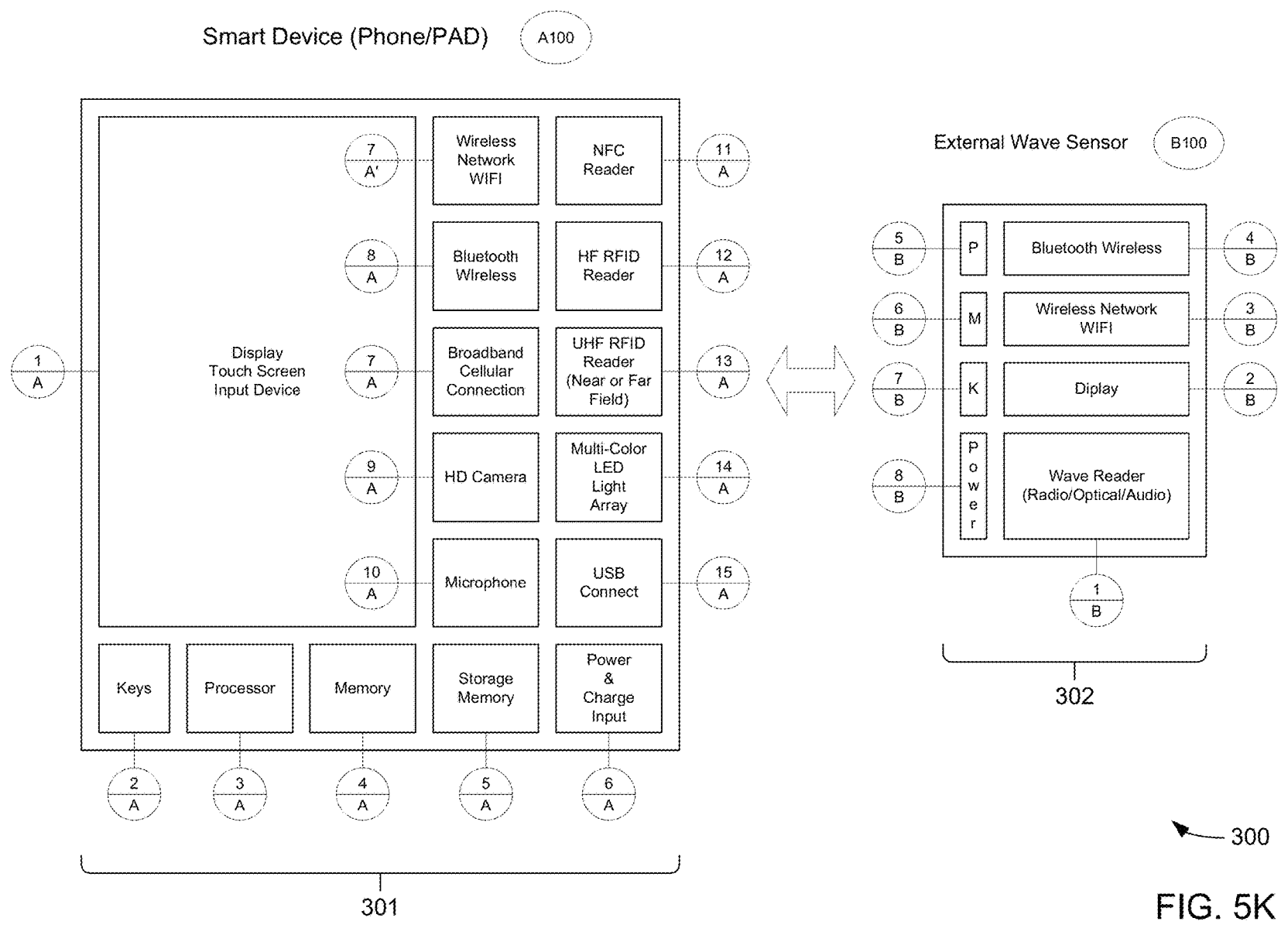

External Wave Sensor　　B100

Bluetooth Wireless

Wireless Network WIFI

Diplay

Wave Reader (Radio/Optical/Audio)

P

M

K

Power

302

Smart Device (Phone/PAD)　　A100

NFC Reader

HF RFID Reader

UHF RFID Reader (Near or Far Field)

Multi-Color LED Light Array

USB Connect

Power & Charge Input

Wireless Network WIFI

Bluetooth Wireless

Broadband Cellular Connection

HD Camera

Microphone

Storage Memory

Display Touch Screen Input Device

Keys

Processor

Memory

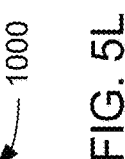

Immutable Token Reader (ITR) is powered buy the Near Field Communications device in Smartphones, PDAs or dedicated devices like handheld scanners.

Worldwide Validation Network
WWVN
3/19/2011

Reseeking
(8)

International Sales
(7)

Shipping
(6)

(8.1)

(7.1)

(6.1)

WAAL

500

(5.1)

(5)

(4.1)

(4)

Sales & Distribution

Governing Organization
(10)

(3.1)

MFG-PPL (2.1)

SWV- PPL (1.1)

HWV-PPL (3)

(2)

(1)

Chip/Board for Assembly

Consumer Electronics Mfg

Licensed Software

Hardware OEM

Software Vendor

Validate Authenticity

Put the viewfinder over a barcode

Support UPC (12 digits) and EAN (13 digits)

Overview | i | Help

380

Validate Authenticity

Press GO! and wave the device 2 inches from product all around the product.

Overvi... | Help | GO !

Receive calculated
IT value from ITR

2302

Compare calculated
IT value received
from ITR to database
values

2304

Matching IT
value in
memory?

2306

Yes

No

Transmit message to
WAAL

2308

Receive message
from WAAL/Update
database

2310

Transmit message to
ITR identifying status
of object being
authenticated

2312

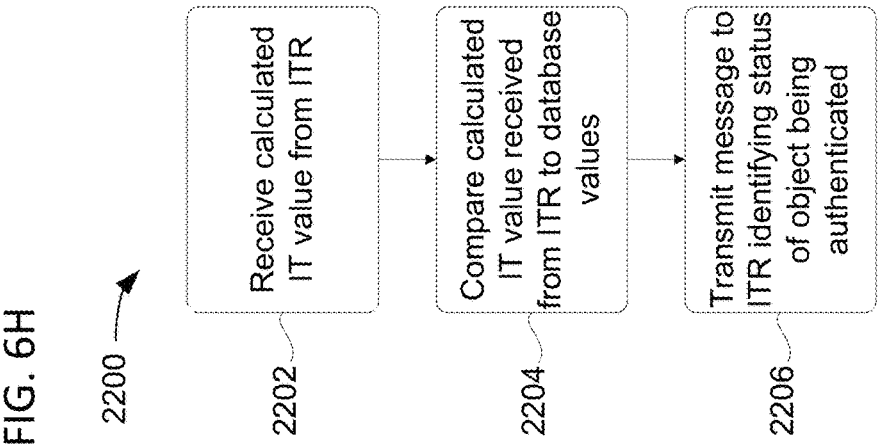

Receive calculated
IT value from ITR

2202

Compare calculated
IT value received
from ITR to database
values

2204

Transmit message to
ITR identifying status
of object being
authenticated

2206

AUTHENTICATION SYSTEMS AND METHODS

RELATED APPLICATION

This application is a continuation-in-part of U.S. patent application Ser. No. 18/133,202, filed Apr. 11, 2023; which is a continuation of U.S. patent application Ser. No. 17/670, 551, filed Feb. 14, 2022 (issued May 23, 2023 as U.S. Pat. No. 11,657,241); which is a continuation of U.S. patent application Ser. No. 16/106,206, filed Aug. 21, 2018 (issued Mar. 22, 2022 as U.S. Pat. No. 11,281,875); which is a continuation of U.S. patent application Ser. No. 15/835,638, filed Dec. 8, 2017 (issued Sep. 10, 2019 as U.S. Pat. No. 10,410,024); which is a continuation of U.S. patent application Ser. No. 14/754,062, filed Jun. 29, 2015 (issued Jan. 16, 2018 as U.S. Pat. No. 9,870,496); which is a continuation of U.S. patent application Ser. No. 13/495,183, filed Jun. 13, 2012 (issued Jun. 30, 2015 as U.S. Pat. No. 9,070,131); which claims priority to U.S. Provisional. Patent Application No. 61/496,772 filed on Jun. 14, 2011; the disclosures of which are incorporated herein by reference in their entireties for all purposes.

BACKGROUND

1. Technical Field

The present disclosure relates to the field of authentication. More specifically, the systems and methods disclosed herein relate to the authentication of objects using various parameter value sensors for discerning attributes of an object, together with data processing systems and associated data storages, for comparing sensed parameters to stored criteria that are associated with authenticity.

2. Description of the Related Art

Counterfeit goods are damaging to the owners of name brand products as well as damaging to unknowing purchasers of such goods. For example, brand name owners or manufacturers suffer as they lose out on revenue from the sale of counterfeit goods and such goods can also damage the reputation of the brand name owner if the goods are shoddily made. Consumers can be damaged by unknowingly over-paying for counterfeit goods that they believe are authentic.

It has become commonplace to employ experts to examine goods to determine their authenticity. Such experts are often familiar with the history of objects of a particular type, of a particular era, and/or of a particular maker or other particular source. As a result, such experts often know of various particular characteristics and/or distinguishing features to examine to provide clues as to the provenance of an object, and accordingly, whether a that object is authentic.

Unfortunately, relying on the knowledge and judgment of such an expert to authenticate an object is not without its drawbacks. Becoming such an expert often requires ongoing research and/or in-person exposure to objects in the field. As a result, becoming such an expert and maintaining one's status as such an expert is often time consuming and expensive. This usually leads to there being relatively few experts that are available to apply their built-up expertise to authenticating a particular object. This, in turn, can lead to relatively high costs to engage the services of such an expert and/or a relatively lengthy wait for such an expert to become available.

More broadly, the fact that such experts are often few in number often precludes being able to quickly conclude a transfer of ownership of an object. Stated differently, while technology has enabled buyers and sellers of objects to identify each other and meet relatively quickly, and while technology has enabled negotiations over such transfers of ownership and payments to be quickly carried out at a great distance between parties, the enablement of quick and inexpensive determinations of authenticity without having to pay for and await the physical arrival of such an expert often remains an unmet need.

There is also the issue of such an expert being only as capable as the degree to which they have encountered similar objects to the one that is to be authenticated, and/or the degree to which they are willing to work to gain ever more of such exposure to similar objects. Thus, there is always the danger that such an expert may incorrectly determine whether an object is authentic as a result of simply not having personally encountered enough of such objects from a particular maker, a particular culture, a particular industry, a particular era, etc.

There is also the issue of the need to trust an expert to provide their services without the effects of a personal bias for or against objects of a particular maker, a particular culture, a particular industry, a particular era, etc. It is not unheard of for an expert to allow a personal disdain for objects of a particular maker, or culture, or era of history to influence their determinations of authenticity of an object. Alternatively or additionally, there is the issue of the need to trust an expert to not have a hidden and/or illicit agenda in determining the authenticity of a particular object. It is not unheard of for an expert to provide a determination of an object as not being authentic, and then using that determination as a basis for offering to buy the object at a greatly reduced price as an example of an inauthentic one of that type of object.

The present invention addresses these and other drawbacks of the prior art by providing systems and methods to quickly and efficiently authenticate a wide variety of objects in a manner that is based on information gathered from a wide and decentralized variety of sources. A combination of decentralized pre-registration and registration databases may be used to store data concerning characteristics and/or distinguishing features of known authentic and/or fake objects in a manner that is resistant to corruption from malfunctions and/or malicious actions. When the time comes to authenticate an object, such information may be used in comparisons with data captured from an examination of that object to determine whether that object is authentic or fake in a speedy, impartial and cost-effective manner.

BRIEF SUMMARY

Techniques are described for providing a system of one or more devices that implements a method for quickly and efficiently authenticating a wide variety of objects in a manner that is based on information gathered from a wide and decentralized variety of sources.

A method for distributed authentication includes: storing, within a first computing device and a second computing device of a validation network, a first immutable token (IT) that incorporates at least a first data concerning a first characteristic of a registered virtual object; receiving, at the first computing device and at the second computing device, and from a reading device of the validation network, a request to authenticate another virtual object as being the registered virtual object based on a second IT associated with the other virtual object; separately comparing, at the first computing device and at the second computing device, the second IT to the first IT; separately determining, at the first computing device and at the second computing device, whether to authenticate the other virtual object based on a degree to which the second IT matches the first IT; transmitting, from the first computing device, and to the reading device, a first indication of whether the other virtual object is able to be authenticated; and transmitting, from the second computing device, and to the reading device, a second indication of whether the other virtual object is able to be authenticated.

A system includes a first computing device of a validation network, the first computing device including a first storage configured to store a first immutable token (IT) that incorporates at least a first data concerning a first characteristic of a registered virtual object, and a first processor, wherein the first processor is configured to perform operations including: receive, at the first computing device, and from a reading device of the validation network, a request to authenticate another virtual object as being the registered virtual object based on a second IT associated with the other virtual object; compare, at the first computing device, the second IT to the first IT; determine, at the first computing device, whether to authenticate the other virtual object based on a degree to which the second IT matches the first IT; and transmit, from the first computing device, and to the reading device, a first indication of whether the other virtual object is able to be authenticated. The system also includes a second computing device of the validation network, the second comprising a second storage configured to store the first IT, and a second processor, wherein the second processor is configured to perform operations including: receive, at the second computing device, and from the reading device, the request to authenticate the other virtual object; separately compare, at the second computing device, the second IT to the first IT; separately determine, at the second computing device, whether to authenticate the other virtual object based on the degree to which the second IT matches the first IT; and transmit, from the second computing device, and to the reading device, a second indication of whether the other virtual object is able to be authenticated.

BRIEF DESCRIPTION OF THE DRAWINGS

The disclosure will be better understood and when consideration is given to the drawings and the detailed description which follows. Such description makes reference to the annexed drawings wherein:

FIGS. 2A, 2B, 2C, 2D and 2E, together, provide a more detailed presentation of embodiments of components of the authentication system of FIGS. 1A-D, and of embodiments of objects that are authenticated thereby.

FIGS. 3A, 3B, 3C, 3D, 3E, 3F, 3G, 3H, 3I, 3J, 3K, 3L and 3M, together, provide a more detailed presentation of use of an embodiment of the authentication system of FIGS. 1A-D to register embodiments of objects in preparation for subsequent authentications thereof.

FIGS. 5A, 5B, 5C, 5D, 5E, 5F, 5G, 5H, 5I, 5J, 5K, 5L, 5M, 5N, 5O, 5P, 5Q, 5R, 5S and 5T are reproduced from the aforementioned U.S. Provisional Patent Application No. 61/496,772.

FIGS. 6A, 6B, 6C, 6D, 6E, 6F, 6G, 6H, 6I, 6J, 6K, 6L, 6M, 6N, 6O, 6P, 6Q and 6R are reproduced from the aforementioned U.S. patent applications, including U.S. patent application Ser. No. 13/495,183 that successfully issued as U.S. Pat. No. 9,070,131.

DETAILED DESCRIPTION

Figure 1A:
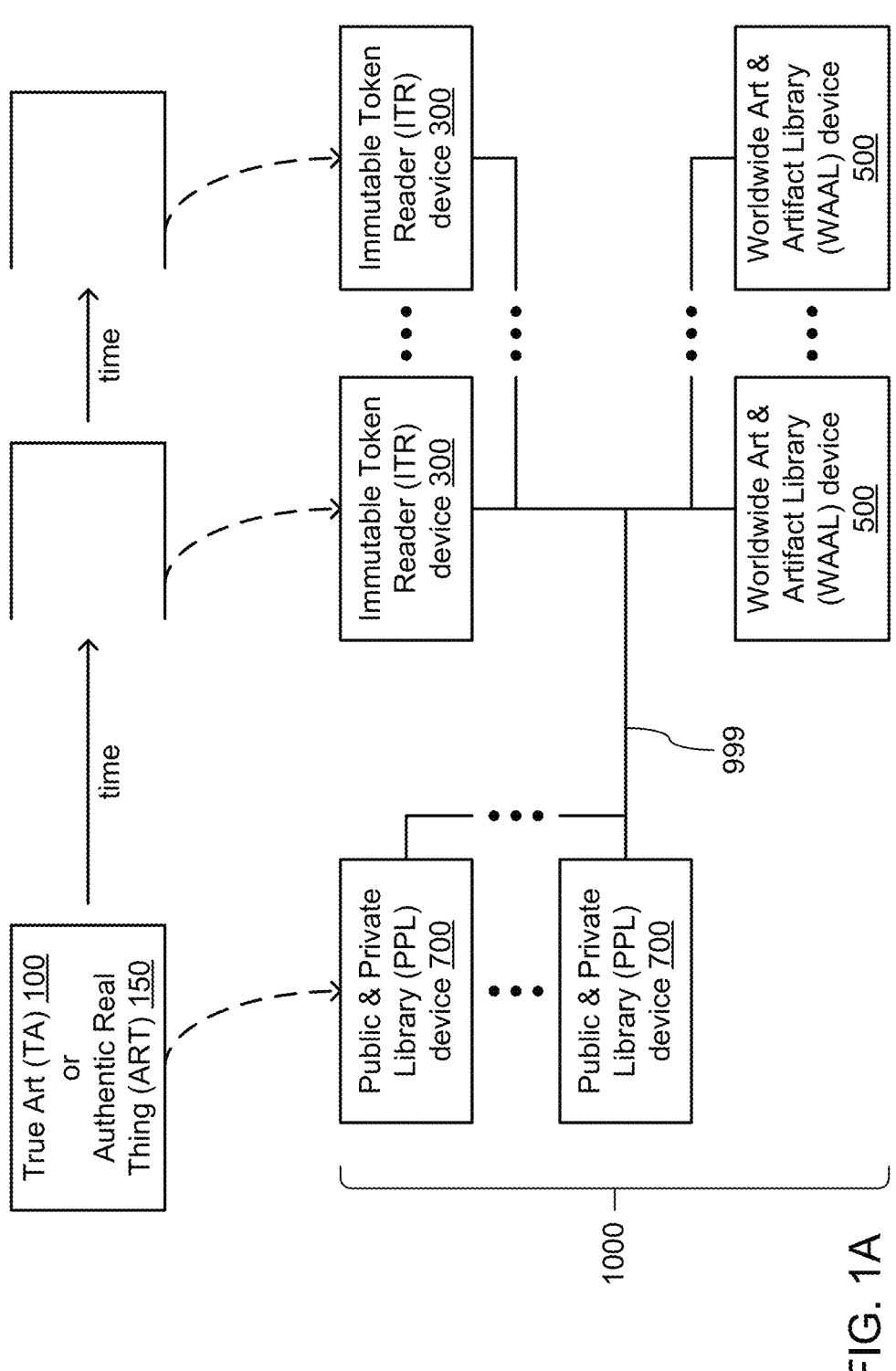
FIGS. 1A, 1B, 1C and 1D, together, provide block diagrams of an example embodiment of an authentication system for authenticating objects.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

A method for distributed authentication includes: storing, within a first computing device and a second computing device of a validation network, a first immutable token (IT) that incorporates at least a first data concerning a first characteristic of a registered virtual object; receiving, at the first computing device and at the second computing device, and from a reading device of the validation network, a request to authenticate another virtual object as being the registered virtual object based on a second IT associated with the other virtual object; separately comparing, at the first computing device and at the second computing device, the second IT to the first IT; separately determining, at the first computing device and at the second computing device, whether to authenticate the other virtual object based on a degree to which the second IT matches the first IT; transmitting, from the first computing device, and to the reading device, a first indication of whether the other virtual object is able to be authenticated; and transmitting, from the second computing device, and to the reading device, a second indication of whether the other virtual object is able to be authenticated.

A system includes a first computing device of a validation network, the first computing device including a first storage configured to store a first immutable token (IT) that incorporates at least a first data concerning a first characteristic of a registered virtual object, and a first processor, wherein the first processor is configured to perform operations including: receive, at the first computing device, and from a reading device of the validation network, a request to authenticate another virtual object as being the registered virtual object based on a second IT associated with the other virtual object; compare, at the first computing device, the second IT to the first IT; determine, at the first computing device, whether to authenticate the other virtual object based on a degree to which the second IT matches the first IT; and transmit, from the first computing device, and to the reading device, a first indication of whether the other virtual object is able to be authenticated. The system also includes a second computing device of the validation network, the second comprising a second storage configured to store the first IT, and a second processor, wherein the second processor is configured to perform operations including: receive, at the second computing device, and from the reading device, the request to authenticate the other virtual object; separately compare, at the second computing device, the second IT to the first IT; separately determine, at the second computing device, whether to authenticate the other virtual object based on the degree to which the second IT matches the first IT; and transmit, from the second computing device, and to the reading device, a second indication of whether the other virtual object is able to be authenticated.

Overview of Authentication System

FIGS. 1A, 1B, 1C and 1D, taken together, present an example of an authentication system 1000 being prepared, and then being used, to authenticate various objects. As will be explained in greater detail, the authentication system 1000 may be implemented as a distributed system in which multiple ones of each of various processing devices 300, 500 and/or 700 may cooperate in a distributed manner through a network 999 to capture data describing characteristics and/or distinguishing features of various objects 150 or 100 (e.g., the depicted TA 100 or ART 150), to store such data in a distributed manner as a measure against corruption, and/or to use such stored data to generate values indicative of probabilities of such objects 150 or 100 being authentic or fake (e.g., the depicted IT 400), as well as to also store such generated values in a distributed manner.

Turning to FIG. 1A, an example embodiment of the authentication system 1000 that may include one or more Immutable Token Reader (ITR) devices 300, one or more Worldwide Art & Artifact Library (WAAL) devices 500, and/or one or more Public & Private Library (PPL) devices 700 interconnected by a network 999. As will be explained in greater detail these processing devices 300, 500 and 700 may be geographically dispersed (e.g., throughout one or more countries and/or continents) with at least a portion of the network 999 including at least a portion of the Internet. As will also be explained in greater detail, different ones of these processing devices 300, 500 and 700 may be owned and/or operated by a wide variety of different entities, including and not limited to, governmental, business, educational and/or religious entities; and/or by a wide variety of individual people. Such distributed possession and/or ownership of these processing devices 300, 500 and/or 700 contributes to the security of the overall system 1000 by making it difficult for any one entity or person to corrupt a portion of it.

As will be explained in greater detail, there may be multiple instances of a single object 150 or 100 having interacted with the authentication system 1000 over time. Such interactions may begin with pre-registration (see FIG. 1B) and/or registration (see FIG. 1C) by which the object 150 or 100 may be introduced to the authentication system 1000. Subsequently, there may be one or more instances of authentication (see FIG. 1D) in which the authentication system 1000 is used to authenticate the object 150 or 100.

Figure 1B:
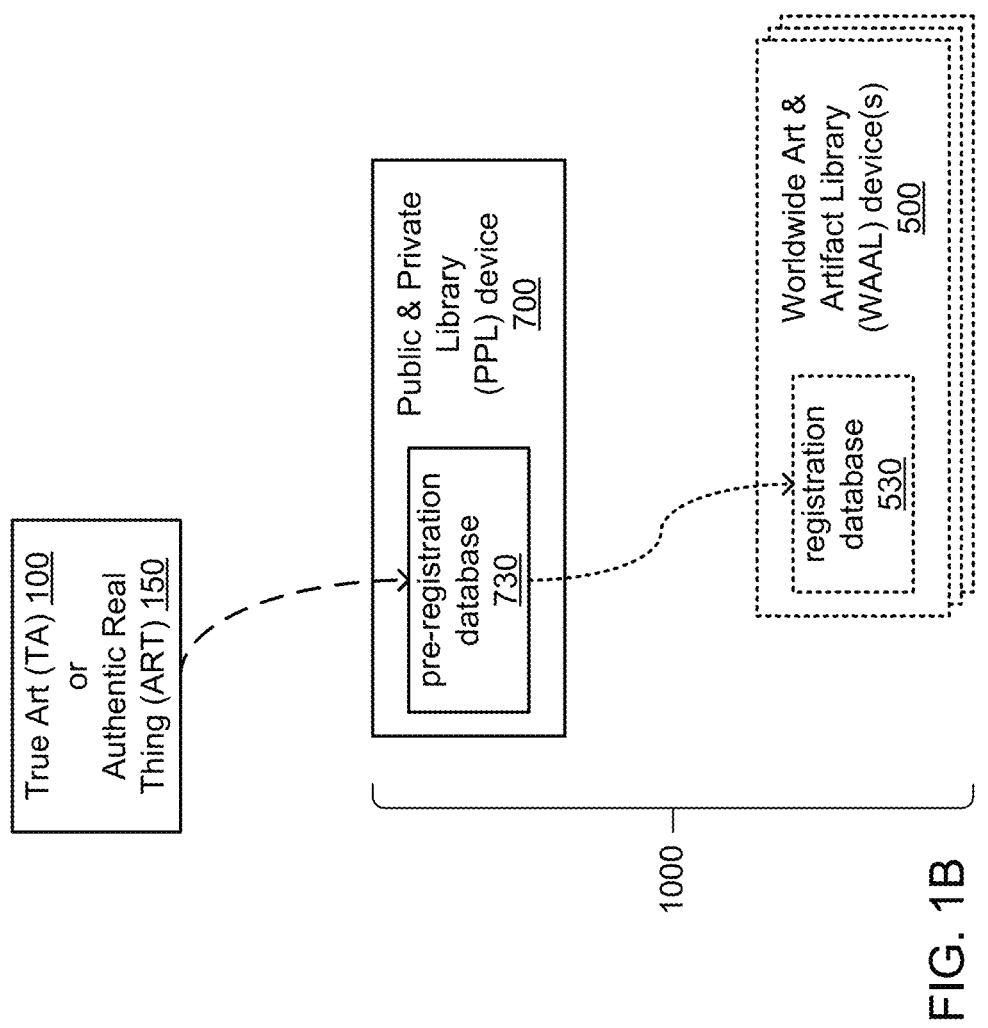

FIG. 1B presents an example embodiment of using the authentication system 1000 to pre-register an object 150 or 100. More specifically, during pre-registration of an object 150 or 100, an initial amount of information concerning that object 150 or 100 may be stored as pre-registration data within a pre-registration database 730 maintained within at least one PPL device 700 of the authentication system 1000. Pre-registration for an object 150 or 100 may be performed on or about the time that an object 150 or 100 is either discovered or created.

By way of example, where an object 150 or 100 is discovered (e.g., where that object 150 or 100 is antique discovered in an attic, or an ancient relic discovered at an archeological site), personnel associated with its discovery may add pre-registration data that is descriptive of that object 150 or 100 into an entry created within the pre-registration database 730 for that object 150 or 100. Such pre-registration data may include descriptions of physical characteristics (e.g., what it is, weight, dimensions, color, surface texture, etc.) and/or descriptions of distinguishing features (e.g., markings, glyphs, artwork, sculpting details, etc.).

By way of another example, where an object 150 or 100 is a manufactured item, personnel associated with its manufacture may similarly add pre-registration data that is descriptive of that object 150 or 100 into an entry created within the pre-registration database 730 for that object 150 or 100. Such pre-registration data may include descriptions of physical characteristics (e.g., what it is, weight, dimensions, color, time and/or date of manufacture, etc.) and/or descriptions of distinguishing features (e.g., serial number marked thereon, manufacturing date and/or location code marked thereon, any custom markings and/or customizations made as part of filling a particular order, etc.).

By way of yet another example, where an object 150 or 100 is a virtual item (e.g., where that object 150 or 100 is generated by and exists only within a computing device), personnel associated with its generation and/or its initial storage may similarly add pre-registration data that is descriptive of that object 150 or 100 into an entry created within the pre-registration database 730 for that object 150 or 100. Such pre-registration data may include descriptions of physical characteristics (e.g., its file type and/or data structure as stored, storage space it requires, where is it physically stored, etc.), and/or descriptions of distinguishing features (e.g., serial number marked thereon, what it represents, what it is a copy and/or recording of, etc.).

As will be explained in greater detail, the pre-registration data for an object 150 or 100 may be subsequently propagated to one or more WAAL devices 150. More specifically, a later time, the particular types of descriptive information selected to be included in the pre-registration data for a particular object 150 or 100 in the pre-registration database 730 may be used to provide guidance concerning what characteristics and/or distinguishing features of the object 150 or 100 are to be used for authentication during subsequent registration and/or distinct authentication(s) of that object 150 or 100.

Figure 1C:
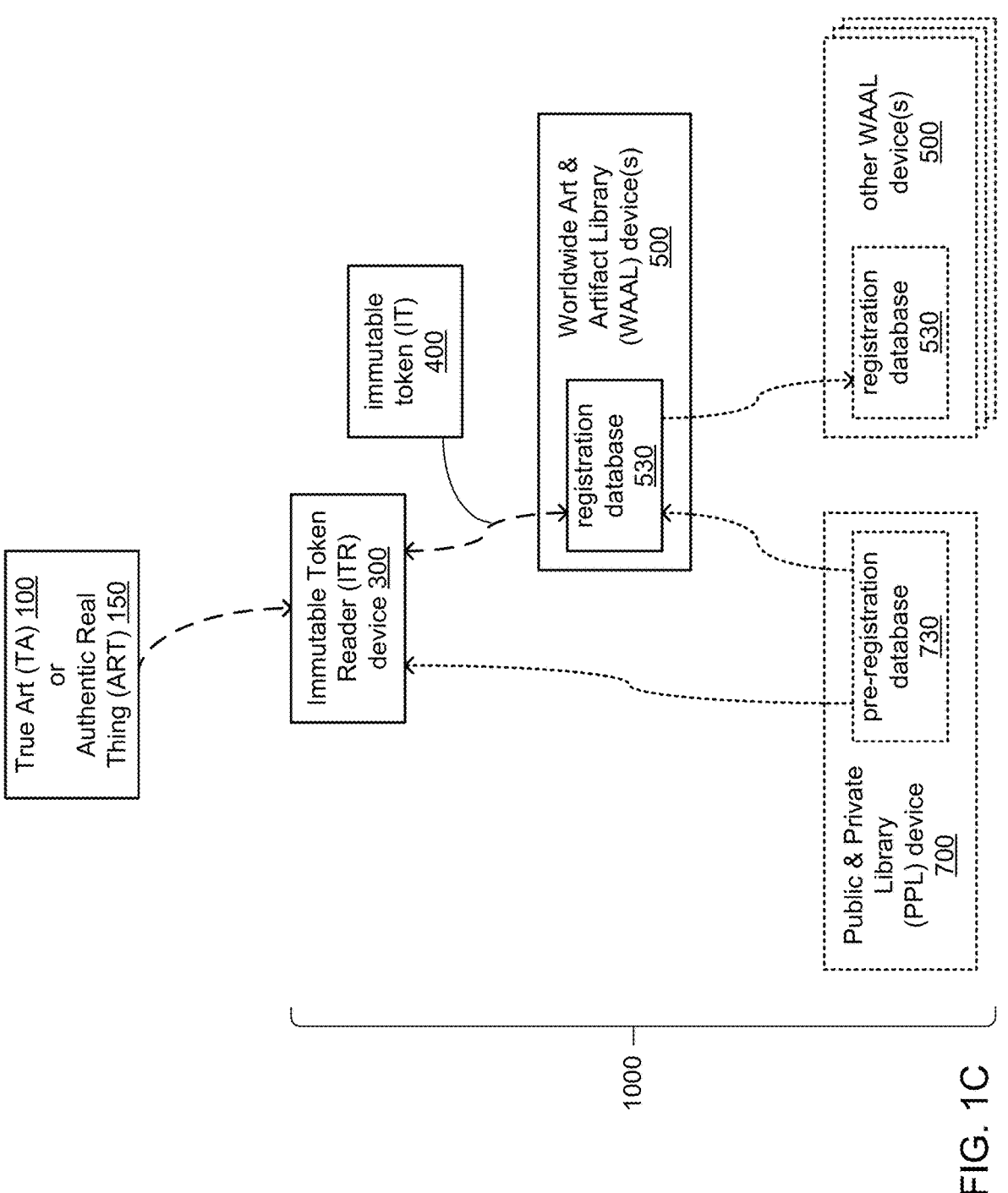

FIG. 1C presents an example embodiment of using the authentication system 1000 to register an object 150 or 100. More specifically, during registration of an object 150 or 100, the pre-registration data that may have been earlier stored for an object 150 or 100 (if there is any such pre-registration data) may be transmitted via the network 999 from the PPL device 700 in which it is stored to the WAAL device 500 that is involved in registering the object 150 or 100. Such pre-registration data (if there is any) may then be combined with other data captured by the ITR device 300 that is also involved in registering the object 150 or 100 to create the registration data that is stored for that object 150 or 100 within a registration database 530 maintained within that WAAL device 500. During that registration, that ITR device 300 and that WAAL device 500 may cooperate through the network 999 to use at least a portion of that registration data to generate an IT 400 for that object 150 or 100, which may then also become part of that registration data.

Still more specifically, and as will be explained in greater detail, such registration data may include data captured by one or more sensors incorporated into the ITR device 300 involved in that registration. Such a sensor may emit a form of energy (e.g., acoustic energy, visible and/or invisible light, a radio signal, a magnetic field, x-rays, etc.) towards the object 150 or 100, thereby causing some form of energy to emanate from the object 150 or 100 that is captured by such a sensor. Such detected energy may then be analyzed and/or decoded in any of a variety of ways to retrieve a data value that may become part of the captured data that is provided to the WAAL device 500 involved in that registration to be included in the registration data. As will also be explained in greater detail, such energy emanating from the object 150 or 100 may be a reflection of a portion of the energy originally emitted towards it from a sensor, and/or may be a form of energy that is triggered thereby to be actively transmitted.

Again, where there is pre-registration data that was earlier stored within a pre-registration database 730 within at least one PPL device 700 of the authentication system 1000 for a particular object 150 or 100, the WAAL device 500 involved in the registration of that object 150 or 100 may retrieve that pre-registration data, and may use the selection of types of descriptive information included within that pre-registration data as guidance in determining what characteristics and/or distinguishing features of that object 150 or 100 are to be included in the registration data. Alternatively, where there is no such pre-registration data associated with the object 150 or 100, that WAAL device 500 may use indications provided concerning the object type of the object 150 or 100 by the operator of the ITR device 300 involved in the registration to determine what characteristics and/or distinguishing features of the object 150 or 100 are to be included in the registration data. Either way, and as will be explained in greater detail, that WAAL device 500 may instruct that ITR device 300 to capture registration data associated with those particular characteristics and/or distinguishing features. Still further, the WAAL device 500 may employ information concerning changes over time in the relative degrees of difficulty of counterfeiting various characteristics and/or distinguishing features to alter what characteristics and/or distinguishing features are to be captured by that ITR device 300.

As will also be explained in greater detail, following the use of one or more sensors of that ITR device 300 to capture data concerning that object 150 or 100 (which, again, may then become part of the registration data for that object 150 or 100), that ITR device 300 and/or that WAAL device 500 may use that data to derive an immutable token (IT) 400 incorporating one or more data values that are indicative of a probability of the object 150 or 100 being authentic. More specifically, the IT 400 may be derived from a combination of 1) data values in the registration data that are each indicative of a characteristic or a distinguishing feature, and 2) corresponding weighting values that are each indicative of a degree of difficulty with which a corresponding one of the characteristics or distinguishing features are able to be counterfeited.

As will further be explained in greater detail, the IT 400 and/or other registration data associated with that object 150 or 100 may also be subsequently propagated to still other WAAL device(s) 500 for storage within the registration database(s) 530 maintained therein, and/or to PPL device(s) 700 for storage within the pre-registration database(s) 730 maintained therein. As a result, multiple copies of such registration information for that object 150 or 100 are caused to become stored in a widely dispersed manner as a measure against loss and/or corruption thereof as a result of malfunctions and/or deliberate malicious acts.

Figure 1D:
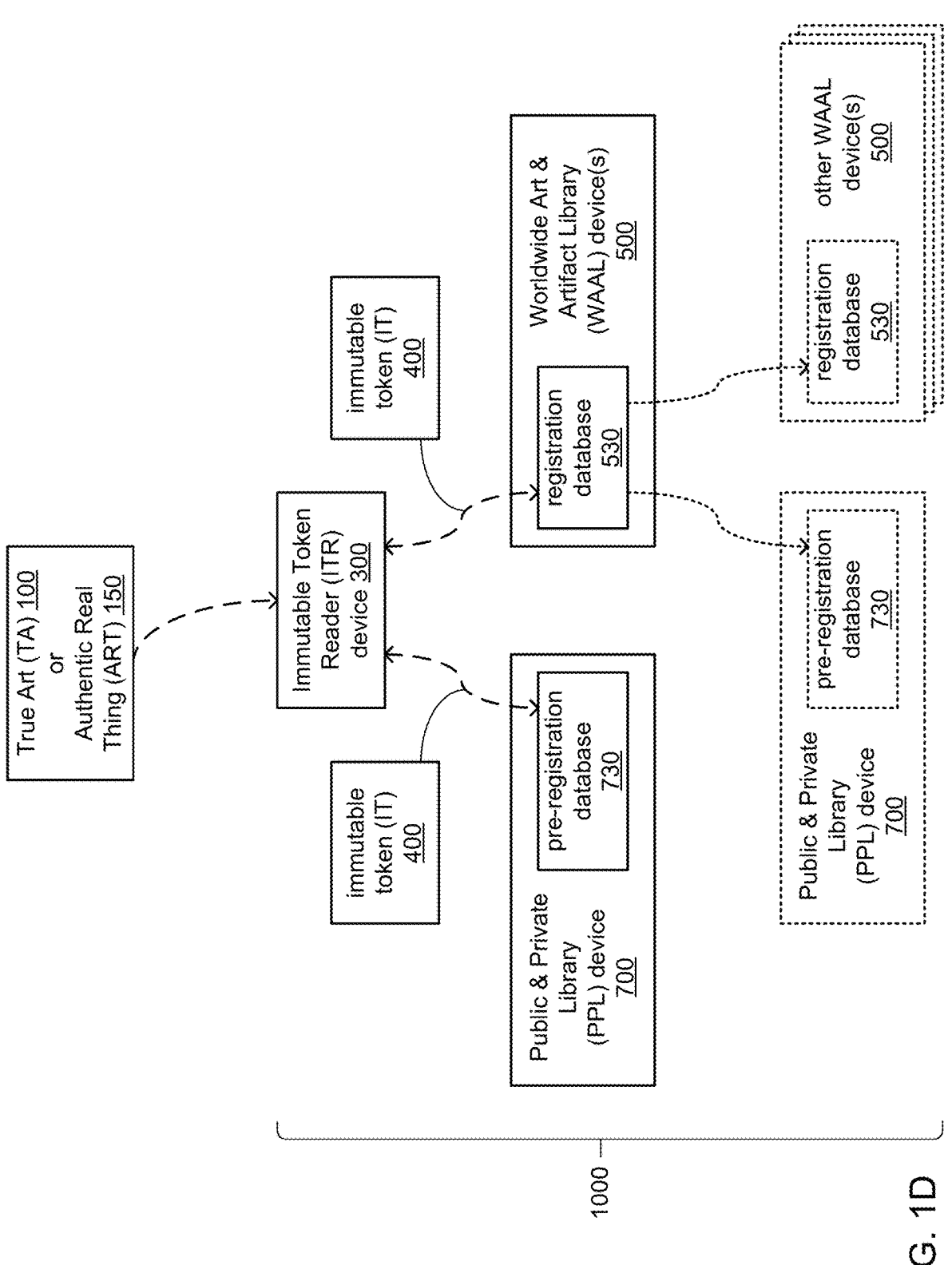

FIG. 1D presents an example embodiment of using the authentication system 1000 to authenticate an object 150 or 100. More specifically, during authentication of an object 150 or 100, a stored IT 400 based on pre-registration data within a PPL device 700 that may have been updated and/or augmented with contents from a copy of registration data, and a stored IT 400 based on registration data within a WAAL device 500 may both be compared, in separate operations performed in separate devices, to an IT 400 generated from data concerning the object 150 or 100 that has been captured by an ITR device 300. During that authentication, the WAAL device 500 and the PPL device 700 may cooperate in making these comparisons to arrive at a single determination of whether the object 150 or 100 is authentic, and then provide an indication of that determination to the ITR device 300 for presentation to an operator thereof.

Still more specifically, and as will be explained in greater detail, such comparisons may entail a determination of whether the newly generated IT 400 and each of the copies of the previously stored IT 400 match closely enough to be within a first threshold, or match somewhat less closely enough to be outside the first threshold, but within a second threshold. If the match is within the first threshold, then the object 150 or 100 may be determined to be authentic without requiring further analysis. If the match is not within either threshold, then the object 150 or 100 may be determined to be counterfeit without requiring further analysis. If the match is not within the first threshold, but is within the second threshold, then the ITR device 300 may be required to capture more types of data concerning the object 150 or 100 for use in another attempt at such a comparison. Following such capture of the additional types of data, such separate comparisons by multiple devices may then be repeated using another IT 400 that is generated with the benefit of the additional types of data.

Presuming that an ultimate determination of the object 150 or 100 being authentic is achieved, then an entirely new IT 400 that is meant to be used to update all of the copies of the registration data for the object 150 or 100 may be generated. Such an entirely new IT 400 may include an updated history of the object 150 or 100 that now includes an indication of the occurrence of this latest instance of being authenticated. Alternatively or additionally, such an entirely new IT 400 may be based on an improved combination of types of data about the object 150 or 100 that are selected to better address changing vulnerabilities of various types of data to being counterfeited. Also, such changing conditions may be taken into account in embodiments in which the ITs 400 are at least partially based on the use of weighting values by updating those weighting values to reflect the current relative degrees of difficulty in counterfeiting different characteristics and/or distinguishing features.

As will be explained in greater detail, the entirely new IT 400 and/or other registration data associated with that object 150 or 100 may also be subsequently propagated to still other WAAL device(s) 500 for storage within the registration database(s) 530 maintained therein, and/or to PPL device(s) 700 for storage within the pre-registration database(s) 730 maintained therein. As a result, multiple copies of such registration information for that object 150 or 100 are caused to become stored in a widely dispersed manner as a measure against loss and/or corruption thereof as a result of malfunctions and/or deliberate malicious acts.

Details of Objects and Authentication System Components

FIGS. 2A, 2B, 2C, 2D, 2E, 2F and 2G, taken together, present various types of objects 100 or 150, and various components of the authentication system 1000 of FIGS. 1A-D in greater detail.

Turning to FIG. 2A, among the objects 100 or 150 that may be authenticated by the authentication system 1000, and/or the methods embodied therein, may be an Authentic Real Thing (ART) 150. As also depicted, an ART 150 may incorporate or be otherwise accompanied by an Added Indelible Marker (AIM) 160.

An ART 150 may be any of a wide variety of things. An ART 150 may be a physical thing that is able to be physically touched (a car, a painting, an antique hand tool, an archeological artifact, etc.), or may be a virtual thing (e.g., words of a novel, lines of code, a digital image, a non-fungible token (NFT), a cryptocurrency coin, real world asset (RWA), etc.) stored by an electronic device. Alternatively or additionally, an ART 150 may be a living thing (e.g., a plant, a single cell organism, a human being, a pet, a farm animal, a zoo animal, etc.; or an organ, limb or other portion thereof), or may be an inanimate thing (an item of clothing, a piece of jewelry, a gold coin, a legal document, etc.). Depending on what a particular ART 150 is, an ART 150 may be acquired or created (e.g., by of hand-crafting or manufacturing), consumed or used, given away or sold, etc., to satisfy a need.

An AIM 160 may be any of a wide variety types of a marker that is added to, applied to, integrally formed with, or otherwise incorporated into, an ART 150 to make that ART 150 more easily identifiable and/or more easily capable of being authenticated. An example of an AIM 160 added to an ART 150 may be an radio-frequency identification (RFID) tag that is attached with a fastener, stitches or adhesive to a surface and/or interior portion of that ART 150. An example of an AIM 160 applied to an ART 150 may be a pattern or text that is printed onto, or laser-engraved into, a surface portion of that ART 150 (e.g., barcode, quick-response (QR) code, watermark, hologram, etc.). An example of an AIM 160 formed integrally with an ART 150 may be a pattern or text that is incorporated into a weaving pattern of that ART 150 or is formed in a layer of a component (e.g., a conductive layer of a PCB) of that ART 150. An example of an AIM 160 otherwise incorporated into an ART 150 may be data encoded into a portion of a data structure of a virtual ART 150, or data encoded into a portion of a genetic sequence of a living ART 150.

An AIM 160 may be a pattern, iconography, a set of characters, or other marking, that is able to read using one or more sensors to obtain a data value that serves as a unique identifier of an ART 150. Such a type of AIM 160 may be passive in that it may very simply reflect a type of energy (e.g., acoustic energy, light, radio waves, x-rays, etc.) that may be emitted towards it by one or more sensors of an ITR device 300. More specifically, portions of such a type of AIM 160 may include portions of a particular material selected to cause such a reflection (e.g., a material that reflects light or radio waves, including particular plastics, inks, dyes, or other surface agents). Alternatively or additionally, portions of such a type of AIM 160 may be fabricated of a material similar to that of immediately surrounding portions of an ART 150, but may be made denser, shaped differently and/or textured differently from those surrounding portions of that ART 150 so as to cause such a reflection.

Alternatively or additionally, an AIM 160 may be an electronic component or other form of component that is able to actively output one or more forms of energy. As will be discussed in greater detail, such active output of one or more forms of energy may be enabled and/or triggered by a form of energy emitted by a sensor of an ITR device 300 towards that AIM 160. For example, an AIM 160 may be an RFID tag that has been attached to or incorporated into an ART 150. As will be familiar to those skilled in the art, a sensor of an ITR device 300 may emit a magnetic field towards an RFID tag, which may provide the electric power needed for that RFID tag to transmit a radio signal therefrom that conforms to near-field communications (NFC) standard(s), and that conveys one or more stored data value.

Among the data values that may be encoded within a passive form of AIM 160, and/or that may be transmitted by an active form of AIM 160, may be a serial number, a batch number, a time and/or date of manufacture, a MAC address, a network IP address, and/or any of a variety of other unchanging data values meant to remain associated with the ART 150. In some embodiments, it may be that the AIM 160 provides both an identifier of itself and an identifier of the ART 150 to which it is attached and/or into which it is incorporated.

As additionally depicted in FIG. 2A, where an ART 150 is a virtual ART 150, the virtual ART 150 may take the form of a data structure, such as a data file that incorporates a header 151, a payload 153 and an AIM 160 (e.g., where the virtual ART 150 is text of a document, is lines of code of a program, etc.). As will be familiar to those skilled in the art, the header 151 may contain information descriptive of various aspects of the virtual ART 150, including and not limited, an indication of a file format and/or manner of organization of data within the virtual ART 150, an indication of size of the virtual ART 150 (e.g., a quantity of bits, bytes, words, etc.), a date of creation and/or of most recent modification of the virtual ART 150, etc. As will be explained in greater detail, data that is stored about an ART 150 may include characteristics thereof, and for such a virtual ART, it may be that the header 151 provides indications of at least a subset of such characteristics.

As will also be familiar to those skilled in the art, the payload 153 of such a data structure as a data file may include the actual data that such a data structure was created to store in the first place. Such data may include, but is not limited to, visual imagery of two or more dimensions, an audio and/or visual recording, an electronic copy of a wide variety of types of document, text data, a reference or description of a physical object with which the virtual ART 150 is associated (e.g., where the virtual ART 150 is an NFT associated with a physical object), etc.

As will be explained in greater detail, for at least a virtual ART 150, the AIM 160 incorporated therein may include one or more data values, and/or a single value that is generated based on multiple data values. Regardless of its exact content, the AIM 160 may be of sufficient size as be statistically highly unlikely to be a duplicate of another AIM 160 of another object such that it is able to be used to uniquely identify the virtual ART 150. Among those data values from which the AIM 160 is generated may be a history of that ART 150 that is added to over time (e.g., locations to which the ART 150 has been moved, changes in ownership, times and/or places at which the ART 150 has been authenticated, etc.). By way of a specific example, and as will be explained in greater detail, it may be that the AIM 160 of a particular virtual ART 150 is repeatedly re-derived to add records or "blocks" to a growing blockchain.

Figure 2B:
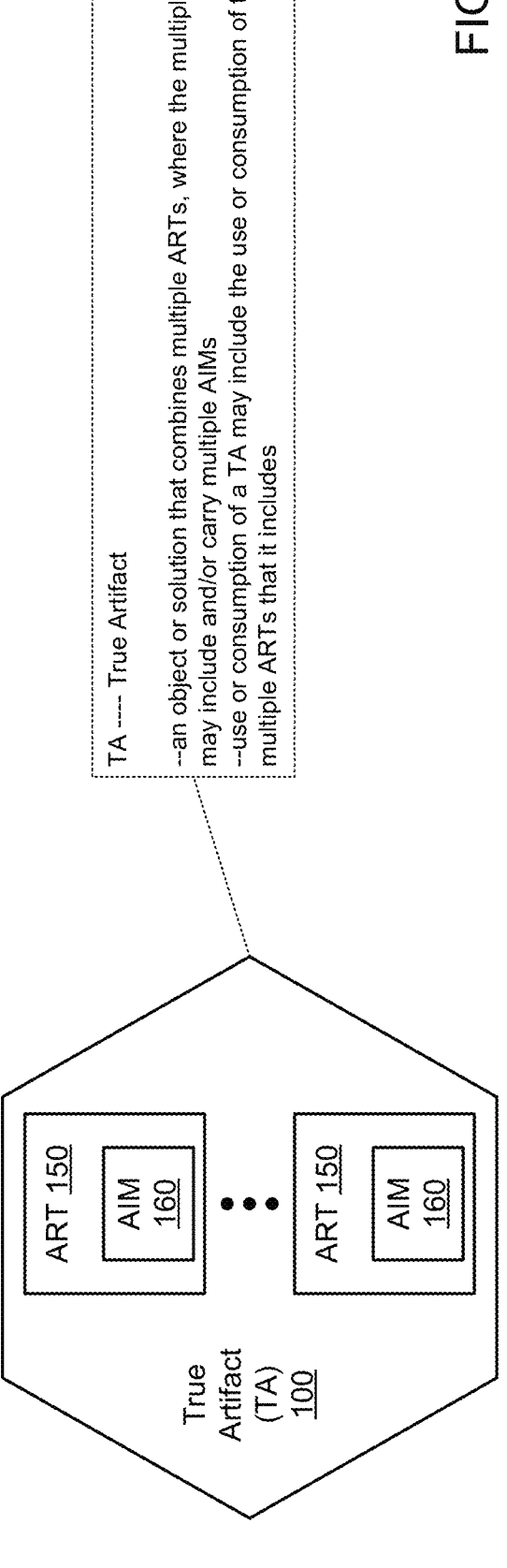

Turning to FIG. 2B, also among the objects that may be authenticated by the authentication system 1000, and/or the methods embodied therein, may be a True Artifact (TA) 100. A TA 100 may also be any of a wide variety of things, but is made up of a combination of multiple ARTs 150. Thus, like a single ART 150, a TA 100 may be a physical or virtual thing, and may be a living or inanimate thing, depending on what are the ARTs 150 that are combined to form that TA 100. As with an ART 150, depending on what a particular TA 100 is, a TA 100 may be acquired or created, consumed or used, given away or sold, etc., to satisfy a need.

As also depicted, each of the ARTs 150 that are included in making up a TA 100 may carry and/or incorporate its own corresponding AIM 160. As will be explained in greater detail, one or more sensors of a single ITR device 300 may be used to capture data encoded into more than one of the multiple AIMs 160 of the multiple ARTs 150 that are combined to form a TA 100.

Figure 2C:
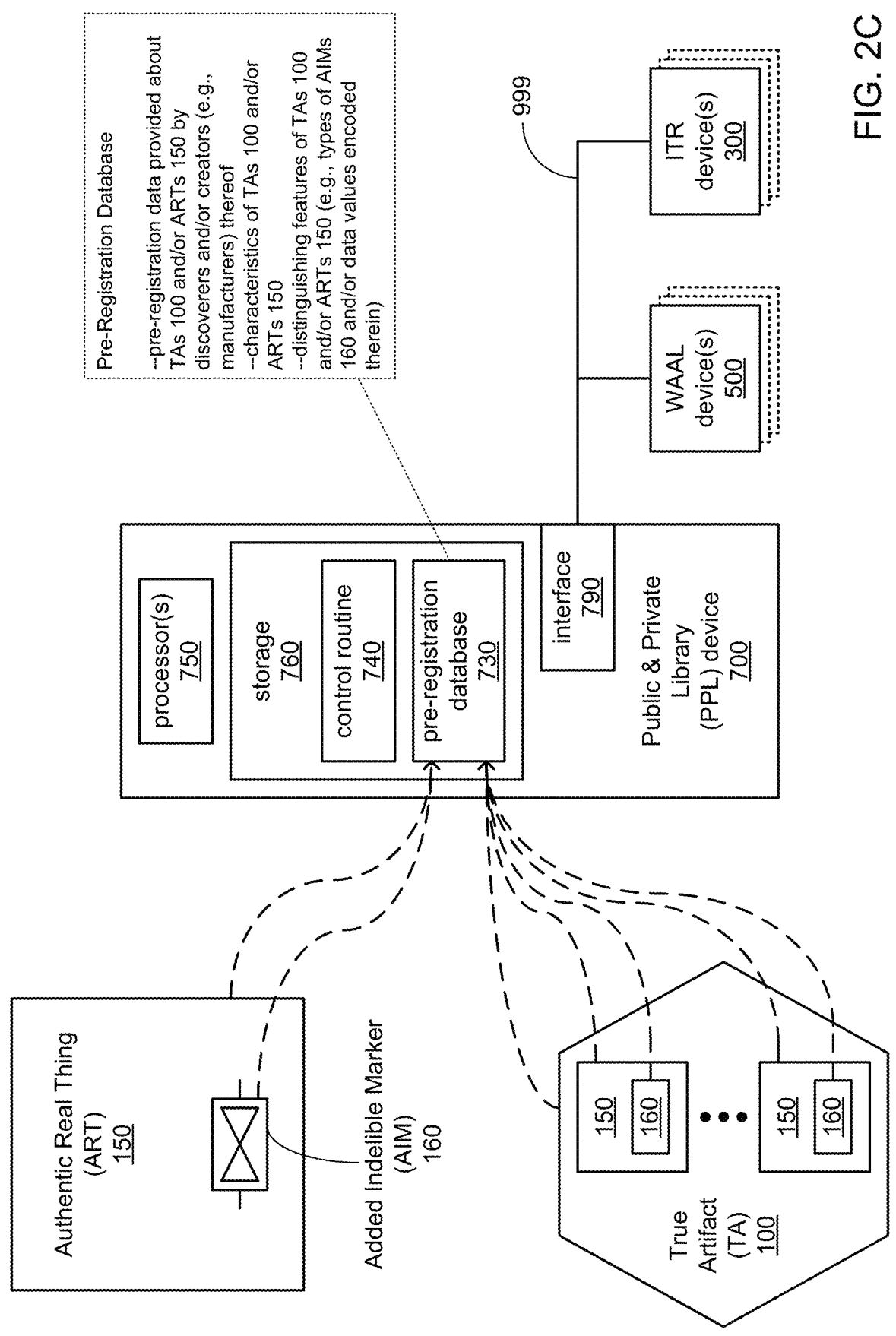

Turning to FIG. 2C, as previously discussed, during pre-registration of an ART 150 or a TA 100, pre-registration data about that object 150 or 100 may be stored within a pre-registration database 730 maintained by a Public & Private Library (PPL) device 700. Again, the pre-registration of such an object 150 or 100 may occur on or about the time that it is discovered or created.

As depicted, a PPL device 700 may include one or more processors 750, a storage 760, and/or an interface 790 to couple the PPL device 700 to the network 999 (e.g., the Internet). The storage 760 and/or the interface 790 may each be communicatively coupled to the processor(s) 750 to exchange executable instructions and/or data therewith through the exchange of electrical, optical, magnetic and/or other signals through one or more buses and/or other form of interconnect within the PPL device 700. The storage 760 may store the pre-registration database 730, and/or a control routine 740 that may include instructions executable by the processor(s) 750 to cause the processor(s) 750 to perform various functions.

The pre-registration database 730 may be implemented as a relational database, and may employ n-dimensional database approaches. In some embodiments, the pre-registration database 730 may be implemented to adopt various industrial and/or governmental standards, including and not limited to, various standards for storage, indexing and/or transmission of data concerning manufactured objects promulgated by GS1 of Brussels, Belgium (e.g., the EPC-Global standard for RFID tags).

The control routine 740 may implement logic for causing the processor(s) 750 to maintain and/or control access to the pre-registration database 730. Following the pre-registration of an object 150 or 100, the processor(s) 750 may be caused by their execution of the control routine 740 to operate the interface 790 to provide the pre-registration data for that object 150 or 100 to one or more WAAL devices 500 to aid in subsequently registering and/or authenticating the object 150 or 100.

Turning to FIG. 2D, as previously discussed, during registration and/or authentication of an ART 150 or a TA 100, an Immutable Token Reader (ITR) 300 device may be used to capture data about that object 150 or 100. Also during such registration and/or authentication, that ITR device 300 and the WAAL device 500 that is also involved in such registration and/or authentication may cooperate to generate an IT 400 for that object 150 or 100.

As depicted, an ITR device 300 may include one or more processors 350, a storage 360, and/or an interface 390 to couple the ITR device 300 to the network 999. As also depicted, an ITR device 300 may include one or more input devices 320 and/or a display 380 to provide a user interface (UI) by which an operator of the ITR device 300 may interact therewith, and/or through which an operator of the ITR device 300 may interact with other devices of the authentication system 1000. As further depicted, an ITR device 300 may include one or more sensors 310 that may be used to capture data concerning an ART 150 or TA 100. The storage 360, the interface 390, the input device(s) 320, the display 380 and/or the sensor(s) 310 may each be communicatively coupled to the processor(s) 350 to exchange executable instructions and/or data therewith through the exchange of electrical, optical, magnetic and/or other signals through one or more buses and/or other form of interconnect within the ITR device 300. The storage 360 may store an Art & Artifact Validation Program (AAVP) 340 that may include instructions executable by the processor(s) 350 to cause the processor(s) 350 to perform various functions. The storage 360 may also store an Immutable Token (IT) 400 that may be generated within the ITR device 300.

As additionally depicted, the ITR device 300 may be implemented as having multiple, physically separate casings, such as the depicted physically separate casings 301 and 302. In such implementations, it may be that the one or more sensors 310 are distributed among such multiple casings, or it may be that all of the one or more sensors 310 are incorporated into a separate casing (e.g., the depicted casing 302) from the casing into which the processor(s) 350, the storage 360, the interface 390, the input device(s) 320 and/or the display 380 are incorporated (e.g., the depicted casing 301). Regardless of the exact manner in which the components of the ITR device 300 may be distributed among such multiple casings, such multiple casings may be interconnected via electrical, optical and/or another form of cabling 303, and/or may be interconnected via any of a variety of wireless communications (e.g., acoustic, radio, optical and/or magnetic transmissions).

In some embodiments, any of a wide variety of devices that include a variety of the sensors 310 may become an ITR device 300 as a result of installing the AAVP 340 thereon. Among such devices may be smartphones, tablet computing devices, FOBs, smart cards incorporating near-field communications capabilities, retail checkout devices, etc. The AAVP 340 may provide an application programming interface (API) by which one or more application routines present on the ITR device 300 may be able to interact with the AAVP 340 to improve the ease with which ITR device 300 may be used efficiently.

The sensors 310 incorporated into the ITR device 300 may include any of a wide variety of types of sensor based on any of a wide of technologies for capturing data. As previously discussed, one or more sensors 310 may be passive in nature in that such sensors may not actively transmit a form of energy towards an ART 150 or TA 100. Such a sensor 310 may include a microphone, a camera, an RF receiver, etc. that may still receive various forms of energy from an ART 150 or TA 100 (e.g., light, magnetic fields, sound waves, etc.) from an unrelated source that may be reflected by the ART 150 or TA 100 towards such a sensor 310. As also previously discussed, one or more sensors 310 may be active in nature in that such sensors may actively emit a form of energy towards an ART 150 or TA 100 (e.g., light, heat, radio waves, X-rays, acoustic energy, etc.) towards an ART 150 or TA 100. Such a sensor 310 may rely upon such an emitted form of energy to be reflected back towards it by the ART 150 or TA 100 to thereby afford an opportunity to capture data about that ART 150 or TA 100 based on an analysis of that reflected energy. Alternatively or additionally, such a sensor 310 may rely upon such an emitted form of energy to trigger an active component of an ART 150 or TA 100 to transmit a form of energy that can be detected by that sensor 310 (e.g., an AIM 160 in the form of an RFID tag that is provided with electrical power by magnetic energy being directed towards it from a sensor 310 to enable it to actively engage in near-field communications (NFC) with that sensor 310 to transmit data to that sensor 310). Also by way of example, it may be that a sensor 310 includes (or otherwise incorporates) such a sophisticated analysis device as an magnetic resonance imaging (MRI) device, an X-ray machine, etc. that enables an analysis of an ART 150 or TA 100 at an atomic or sub-atomic particle level.

The AAVP 340 may implement logic for causing the processor(s) 350 of the ITR device 300 to cooperate with a WAAL device 500 through the network 999 to authenticate an operator of the ITR device 300. More specifically, and as will be explained in greater detail, during registration and/or authentication of an ART 150 or TA 100, the processor(s) 350 may be caused to operate the input device(s) 320, the display 380 and/or the interface 390 to cooperate with a WAAL device 500 to prompt an operator of the ITR device 300 to enter information needed to authenticate that operator to use the authentication system 1000. Alternatively, where that operator has not been previously registered as an authorized user of the authentication system 1000, then the processor(s) 350 may be caused to operate the input device(s) 320, the display 380 and/or the interface 390 in cooperation with that WAAL device 500 to prompt that operator through entering information needed for them to become so registered.

The AAVP 340 may implement logic for causing the processor(s) 350 of the ITR device 300 to operate various one(s) of the sensor(s) 310 to capture data concerning an ART 150 or a TA 100. More specifically, in some embodiments, during registration and/or authentication of an object 150 or 100, the processor(s) 350 may be caused to operate a preselected set of one or more sensors 310 to capture a preselected set of one or more type(s) of data concerning an object 150 or 100. Alternatively or additionally, the processor(s) 350 may be caused to operate the interface 390 to receive indications, from the WAAL device 500 that is also involved in the registration and/or authentication of that object 150 or 100, of which type(s) of data concerning the object 150 or 100 are to be captured, and may then operate particular sensor(s) 310 to capture those indicated type(s) of data. Also, the processor(s) 350 may be caused by execution of the AAVP 340 to perform any of a wide variety of forms of data processing and/or analysis of the data that is captured by the one or more sensors 310 to decode the data that is captured and/or otherwise prepare the data that is captured for use. By way of example, where a camera is used as a sensor 310 to capture an image of an ART 150 or TA 100, the captured image may be processed in a wide variety of ways to obtain insights that may become part of the captured data (e.g., color correction, filtering, assemblage of multiple images to form a three-dimensional view or model, object identification, text reading, barcode decoding, optical character recognition, pattern detection and/or recognition, measuring of physical dimensions, etc.). In so doing, any of a wide variety of processing technologies may be employed, including and not limited to, mathematical modeling and/or information theory, pattern recognition algorithms, various forms of artificial intelligence or machine learning, search and classification, fuzzy logic, edge detection algorithms, spectrum analysis, digital spectroscopy, etc.

The AAVP 340 may implement logic for causing the processor(s) 350 of the ITR device 300 to cooperate with a WAAL device 500 through the network 999 to generate an IT 400 for an ART 150 or a TA 100. More specifically, and as will be explained in greater detail, during registration and/or authentication of an object 150 or 100, the processor(s) 350 may be caused to operate the interface 390 to transmit captured data concerning the object 150 or 100 to the WAAL device 500 that is also involved in the registration and/or authentication of that object 150 or 100 to enable that WAAL device to generate an IT 400 for that object 150 or 100. Alternatively or additionally, the processor(s) 350 may be caused to operate the interface 390 to receive indications of weighting values to be applied to the various types of captured data to be used in generating the IT 400 for that object 150 or 100. The processor(s) 350 may then be caused to use those weighting values to do so, and then operate the interface 390 to transmit the resulting IT 400 to that WAAL device 500. As will be explained in greater detail, each weighting value may be indicative of the relative degree to which a corresponding characteristic or distinguishing feature represented by a data value in the captured data is able to be counterfeited.

The AAVP 340 may implement logic for causing the processor(s) 350 of the ITR device 300 to cooperate with a WAAL device 500 through the network 999 to compare ITs 400 for an ART 150 or a TA 100. More specifically, and as will be explained in greater detail, during authentication of an object 150 or 100, the processor(s) 350 may be caused to operate the interface 390 to transmit an IT 400 generated within the ITR device 300 for that object 150 or 100 to the WAAL device 500 that is also involved in the authentication of that object 150 or 100 to enable that WAAL device 500. Within that WAAL device 500, that received IT 400 may be compared to an earlier stored IT 400 for that object 150 or 100 to determine whether that object 150 or 100 is authentic. Alternatively or additionally, the processor(s) 350 may be caused to operate the interface 390 to receive the earlier stored IT 400 for comparison to the IT 400 generated within the ITR device 300. The processor(s) 350 may then be caused to perform that comparison to make that determination.

As previously discussed, during registration of an ART 150 or a TA 100, if that object 150 or 100 had been pre-registered, then a PPL device 700 that stores the resulting pre-registration data for that object 150 or 100 may provide it to the WAAL device 500 involved in such registration. Again, it may be that the types of information that are included in such pre-registration data may be used as a guide for determining what types of data should be captured by the ITR device 300 that is involved in such registration. Otherwise, if that object had not been pre-registered, then information concerning what that particular object 150 or 100 is may be used as a guide for determining what data should be captured by the ITR device 300. Either way, the ITR device 300 involved in such registration may be instructed through the network 999 concerning what data is to be captured.

Turning to FIG. 2E, as previously discussed, it may be that, during registration for an ART 150 or a TA 100, registration data about that ART 150 or a TA 100 may be stored within multiple registration databases 530, each of which may be maintained by a separate one of multiple Worldwide Art and Artifact Library (WAAL) devices 500. As previously discussed, such registration data may be based on data captured by an ITR device 300 during registration and/or on earlier provided pre-registration data concerning that object 150 or 100. Subsequently, and as also previously discussed, such registration data may be used to authenticate that object 150 or 100.

As depicted, a WAAL device 500 may include one or more processors 550, a storage 560, and/or an interface 590 to couple the WAAL device 500 to a network 999. The storage 560 and/or the interface 590 may each be communicatively coupled to the processor(s) 550 to exchange executable instructions and/or data therewith through the exchange of electrical, optical, magnetic and/or other signals through one or more buses and/or other form of interconnect within the WAAL device 500. The storage 560 may store a system curator (SC) routine 540 that may include instructions executable by the processor(s) 550 to cause the processor(s) 550 to perform various functions. The storage 560 may also store the registration database 530.

In some embodiments, a WAAL device 500 may be built on a scalable computing platform such as a cloud computing environment to ensure provision of sufficient storage and processor power. In some of such embodiments, a WAAL device 500 may be implemented as a single physical server, or as multiple physical servers. Alternatively or additionally, within the single physical server or within at least one of the multiple physical servers, a WAAL device 500 may be implemented as multiple virtual servers. Regardless of the exact manner in which a WAAL device 500 is implemented, it may be presented on the network 999 as a single device. By way of example, a WAAL device 500 may be presented on the network 999 as a single portal, at a single IP address, and/or with a single API by which the registration data of the registration database 530 may be made accessible to other device, such as ITR device(s) 300, other WAAL device(s) 500 and/or PPL device(s) 700.

Turning to the registration database 530, like the pre-registration database 730, the registration database 530 may be implemented as a relational database, and may employ n-dimensional database approaches. Also, in some embodiments, the registration database 530 may implement a class of data structures that allow for a field/name and/or field/value pair or combination to be stored so as to allow for relatively rapid and dynamic addition of new forms of validation of ARTs 150 and/or TAs 100 with new types of parameters that may be captured by ITR devices 300 that may employ newer types of sensor 310. Alternatively or additionally, the registration database 530 may be implemented to adopt various industrial and/or governmental standards, including and not limited to, various standards for storage, indexing and/or transmission of data concerning manufactured objects promulgated by GS1. Accordingly, communications between a WAAL device 500 and other devices via the network 999 may employ such industrial and/or governmental standards in the exchange of data to be added to the registration database 530 and/or to be shared therefrom. Also alternatively or additionally, various open standards protocols may be used in such communications.

A separate entry may be created within the registration database 730 for each ART 150 and for each TA 100. The information stored therein may be built up over time from pre-registration data provided by a PPL device 500 during the pre-registration of an object 150 or 100, and/or from one or more ITR devices 300 during the registration thereof and each subsequent authentication thereof. Thus, the information stored within the registration database 730 for a single object 150 or 100 may include indications of characteristics and/or distinguishing features thereof that were stored within the pre-registration database 730 maintained by a PPL device 700 during the pre-registration of that object 150 or 100 on or about the time of its discovery or creation. Also, the information stored within the registration database 730 for that object 150 or 100 may include indications of data captured by various sensors 310 of ITR devices 300 during registration and/or subsequent authentications thereof about characteristics and/or distinguishing features thereof, including captures of manually entered data and/or of data provided by one or more AIMs 160. Further, the information stored within the registration database 730 for that object 150 or 100 may include each IT 400 generated during registration and/or subsequent authorizations thereof.

In addition to storing data about ARTs 150 and/or TAs 100, the registration database 730 may also be employed to store information about users of the authentication system 1000. Again, in some embodiments, operators of ITR devices 300 may be prompted to provide data indicative of various aspects and/or distinguishing characteristics of themselves. It may be that the types of data that they are prompted to provide are chosen to enable those operators to be individually distinguishable from each other, while not prompting them to become personally identifiable. It may further be that such types of data are then used to generate a variant of IT for each such operator, thereby enabling a form of authentication of operators of ITR devices 300 such that they become authenticated to use the authentication system 1000. The ability to distinguish among such operators may then be associated with types of objects 150 and/or 100 that each such operator demonstrates a tendency to be associated with registering and/or authenticating. By way of example, the ability to distinguish among operators of ITR devices 300 may be used as a guide for preemptively retrieving pre-registration data and/or registration data for the types of objects 150 and/or 100 that they have registered and/or authenticated in the past, and/or preemptively retrieving such data for those particular previously registered and/or authenticated objects 150 and/or 100. It should be noted that such operators of ITR devices 300 may, alternatively, register themselves through other computing devices than an ITR device 300.

Turning to the SC routine 540, the SC routine 540 may implement logic for causing the processor(s) 550 of a WAAL device 500 to maintain and/or control access to the registration database 530 stored therein. The processor(s) 550 may be caused by execution of the SC routine 540 to operate the interface 590 to cooperate with one or more other WAAL devices 500, with one or more ITR devices 300 and/or with one or more PPL devices 700 to augment, update and/or share registration data stored within the registration database 530 via exchanges of data through the network 999. More specifically, the processor(s) 550 may be caused to cooperate with the one or more PPL devices 700 and/or ITR devices 300 to exchange data to aid in registering and/or authenticating ARTs 150 and/or TAs 100. Also, the processor(s) 550 may be caused to cooperate with one or more other WAAL devices 500 to propagate registration data for ARTs 150 and/or TAs 100 as a measure for ensuring that updated data (e.g., new entries for new objects 150 or 100, and/or updated ITs 400 derived objects 150 or 100 already stored within a registration database 530) is made widely available relatively quickly, and/or for preventing corruption of that registration data. As will be readily recognized by those skilled in the art, such maintenance of data coherency among multiple copies of such widely distributed registration data may be required to support the use of multiple copies of ITs 400 for authenticating objects 150 or 100, as will be explained in greater detail.

In some embodiments, the processor(s) 550 may be caused by execution of the SC routine 540 to instantiate a portal on the network 999 that enables access to the registration database 530 through an application programming interface (API). The API may enable access to individual records associated with individual objects 150 or 100 within the registration database 530, and/or may enable bulk access to numerous records to support bulk registrations and/or bulk authentications of numerous objects 150 and/or 100.

In some embodiments, the processor(s) 550 may be caused by execution of the SC routine 540 to implement any of a wide variety of forms of machine learning to improve the generation of ITs 400 for various types of object 150 or 100. It may be that the API provided at the portal provides a mechanism by which information concerning successes and/or failures in previous determinations of authenticity of objects 150 and/or 100 may be received, and/or by which successes and/or failures of relying on particular types of captured data may be received. Such received information may be used to add histories of successes and/or failures in authenticating individual objects 150 and/or 100, or in authenticating types of objects 150 and/or 100 to the registration database 530. Alternatively and/or additionally, such received information may be used to adjust relative weightings that are applied to particular types of data captured concerning objects 150 and/or 100, especially in response to received indication of an increasing degree to which a particular characteristic or distinguishing feature of a type of object 150 or 100 is able to be counterfeited.

In some embodiments, the processor(s) 550 may be caused by execution of the SC routine 540 to derive predictions of expected changes in patterns of behavior associated with objects 150 and/or 100. By way of example, events such as disasters, economic and/or marketing trends, etc. may be used as input to identify individual objects 150 or 100, and/or to identify types of objects 150 and/or 100 that may become more likely to be geographically relocated, and/or more like to be bought and sold. This may enable the processor(s) 550 to provide indications to various individuals and/or other entities to expect an increase in the use of the authentication system 1000 to authenticate various objects 150 and/or 100, and/or to authenticate various types of objects 150 and/or 100. Such provided indications may also serve as a notice to manufacturers of those objects 150 and/or 100, and/or of those types of objects 150 and/or 100 of the need to strengthen their measures to improve the accuracy of authentication thereof.

The SC routine 540 may implement logic for causing the processor(s) 550 of the WAAL device 500 to cooperate with an ITR device 300 through the network 999 to authenticate an operator of that ITR device 300. More specifically, and as will be explained in greater detail, during registration and/or authentication of an ART 150 or TA 100, the processor(s) 550 may be caused to operate the interface 590 to cooperate with an ITR device 300 to prompt an operator of that ITR device 300 to enter information needed to authenticate that operator to use the authentication system 1000. Alternatively, where that operator has not been previously registered as an authorized user of the authentication system 1000, then the processor(s) 550 may be caused to operate the interface 590 to cooperate with that ITR device 300 to prompt that operator through entering information needed for them to become so registered. Again, as a result of such cooperation, a variant of an IT for each such operator may be generated, and then stored within the WAAL device 500 for each registered operator to enable their authentication each subsequent time they make use of the authentication system 1000.

The SC routine 540 may implement logic for causing the processor(s) 550 of the WAAL device 500 to cooperate with an ITR device 300 through the network 999 to use various one(s) of the sensor(s) 310 of that ITR device 300 to capture data concerning an ART 150 or a TA 100. More specifically, in some embodiments, during registration and/or authentication of an object 150 or 100, the processor(s) 550 may be caused to operate the interface 590 to transmit indications, to the ITR device 300 that is involved in the registration and/or authentication of that object 150 or 100, of which type(s) of data concerning the object 150 or 100 are to be captured. As will be explained in greater detail, the selection of types of data that are so indicated may be based on relative degrees to which various characteristics and/or distinguishing features of that object 150 or 100 is able to be counterfeited. In embodiments in which weighting values are used (e.g., in embodiments employing machine learning or AI), it may be that the weighting values are indicative of such relative degrees and are at least able to be updated based on such machine learning or AI. Also, as previously discussed, the processor(s) 550 may be caused by execution of the SC routine 540 to perform any of a wide variety of forms of data processing and/or analysis of the data that is captured by the one or more sensors 310 of the ITR device 300 to decode the data that is captured and/or otherwise prepare the data that is captured for use. Again, for example, where a camera is used as a sensor 310 to capture an image of an ART 150 or TA 100, the captured image may be processed in a wide variety of ways to obtain insights that may become part of the captured data.

The SC routine 540 may implement logic for causing the processor(s) 550 of the WAAL device 500 to cooperate with an ITR device 300 through the network 999 to generate an IT 400 for an ART 150 or a TA 100. More specifically, and as will be explained in greater detail, during registration and/or authentication of an object 150 or 100, the processor(s) 550 may be caused to operate the interface 590 to receive captured data concerning the object 150 or 100 from the ITR device 300 that is involved in the registration and/or authentication of that object 150 or 100. The processor(s) 550 may then be caused to use the various types of data captured by that ITR device 300 together with corresponding weighting values to generate the IT 400 for that object 150 or 100. Alternatively or additionally, the processor(s) 550 may be caused to operate the interface 590 to transmit those weighting values to that ITR device 300 to enable that ITR device to so generate that IT 400. Again, each weighting value may be indicative of the relative degree to which a corresponding characteristic or distinguishing feature represented by a data value in the captured data is able to be counterfeited.

The SC routine 540 may implement logic for causing the processor(s) 550 of the WAAL device 500 to cooperate with an ITR device 300 through the network 999 to compare ITs 400 for an ART 150 or a TA 100. More specifically, and as will be explained in greater detail, during authentication of an object 150 or 100, the processor(s) 550 may be caused to operate the interface 590 to receive an IT 400 generated within the ITR device 300 that is involved in the authentication of that object to 150 or 100. The processor(s) 550 may then be caused to compare that received IT 400 to an earlier stored IT 400 for that object 150 or 100 to determine whether that object 150 or 100 is authentic. Alternatively or additionally, the processor(s) 550 may be caused to operate the interface 590 to transmit that earlier stored IT 400 to that ITR device 300 to enable that ITR device 300 to perform that comparison to make that determination.

Again, as previously discussed, during registration of an ART 150 or a TA 100, if that object 150 or 100 had been pre-registered, then a PPL device 700 that stores the resulting pre-registration data for that object 150 or 100 may provide it to the WAAL device 500. Again, it may be that the types of information that are included in such pre-registration data may be used as a guide for determining what types of data should be captured by the ITR device 300 that is also involved in such registration. Otherwise, if that object had not been pre-registered, then information concerning what that particular object 150 or 100 is may be used as a guide for determining what data should be captured by the ITR device 300. Either way, the processor(s) 550 of the WAAL device 500 may be caused to operate the interface 590 to transmit indications of what types of data are to be captured by that ITR device 300 for such registration.

Registration of Objects for Subsequent Authentication

FIGS. 3A, 3B, 3C, 3D, 3E, 3F, 3G, 3H, 3I, 3J, 3K, 3L and 3M, taken together, present various aspects of the use of embodiments of authentication system 1000 of FIGS. 1A-D to register objects 150 or 100 in preparation for subsequent authentications using the authentication system 1000.

Figure 3A:
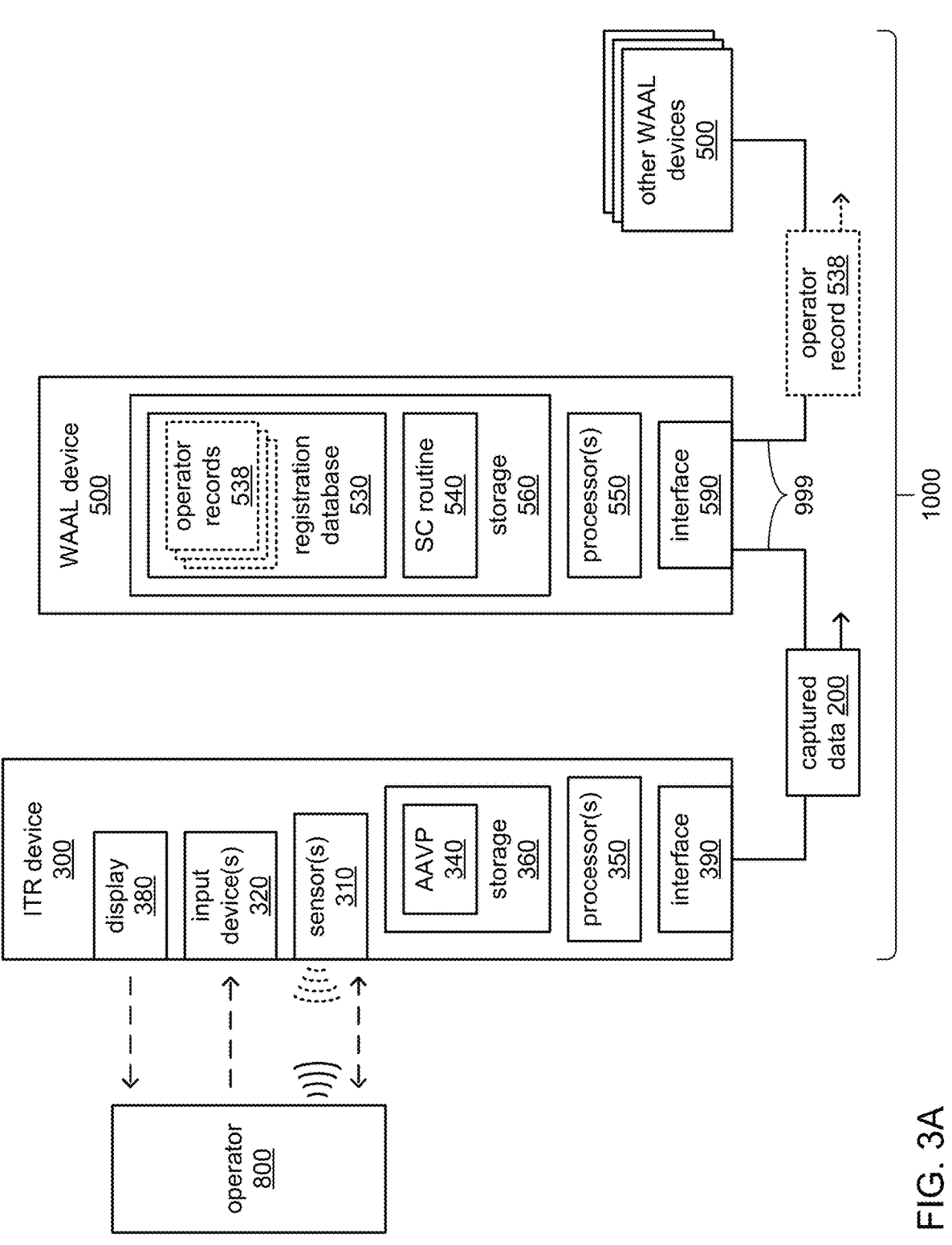

Turning to FIG. 3A, as previously discussed, prior to using the authentication system 1000 to authenticate an object 150 or 100 (i.e., an ART 150 or a TA 100), that object 150 or 100 may need to be registered therewith. However, as also previously discussed, prior to being permitted to use an ITR device 300 to either register or authenticate an object 150 or 100, the operator 800 of that ITR device 300 needs to be registered as an authorized user of the authentication system 1000. As previously discussed, the manner in which an operator 800 is registered and/or subsequently authenticated as being authorized to use the authentication system 1000 may resemble the manner in which objects 150 and/or 100 are so registered and subsequently authenticated.

Thus, to register the depicted operator 800 of the depicted ITR device 300 as an authorized user of the authentication system 1000, that ITR device 300 may cooperate with a WAAL device 500 to capture one or more preselected types of data concerning the operator 800. Such capturing of data concerning the operator 800 may entail the use of the depicted display 380 and/or input device(s) 320 to provide a UI that includes prompts to the operator 800 to provide answers to one or more questions about themselves. Alternatively or additionally, such capturing of such data may entail the use of one or more sensors 310 of the ITR device 300 capture data indicative of various characteristics of the operator 800 (e.g., physical dimensions, weight, 2D and/or 3D images, etc.), and/or distinguishing features of the operator 800 (e.g., tattoos, jewelry worn, driver's license or other ID card, ID badge, etc.).

The ITR device 300 may transmit such captured data 200 to the WAAL device 500 via the network 999. Within the WAAL device 500, the captured data 200 may be used to attempt to identify the operator 800 as one of the previously authorized users of the authentication system 1000 for whom such data has already been stored within one of multiple operator records 538. In some embodiments, such records may be included within the registration database 530.

Presuming that the operator 800 has not been found to have been previously registered as one of such authorized users, the WAAL device 500 may then use the captured data 200 received from the ITR device 300 to at least begin generating a new operator record 538 for the operator 800. The WAAL device 500 may transmit an indication to the ITR device 300 of one or more further particular types of data to be captured concerning the operator 800. In some embodiments, such indications of particular types of data to be captured may be based on past practices of what types of data are to be captured for authorized persons, and it may be that such practices may change over time as new types of such data are devised and/or become deemed to be necessary to thwart ever changing efforts at counterfeiting characteristics of persons and/or distinguishing features of persons. Again, it may be that the types of data that are captured concerning the operator 800 are selected to allow the operator 800 to be distinguished from other operators 800, as well as from other persons not authorized to use the authentication system 1000, while also avoiding capturing types of data that would enable the operator 800 to become personally identifiable.

Regardless of the exact types of data that are selected to be captured, the new operator record 538 for the operator 800 may be completed with such data. As previously discussed, such data stored within that new operator record 538 may then be used to generate of a variant of immutable token for the operator 800 in a manner that may resemble the generation of ITs 400 for objects.

Figure 3B:
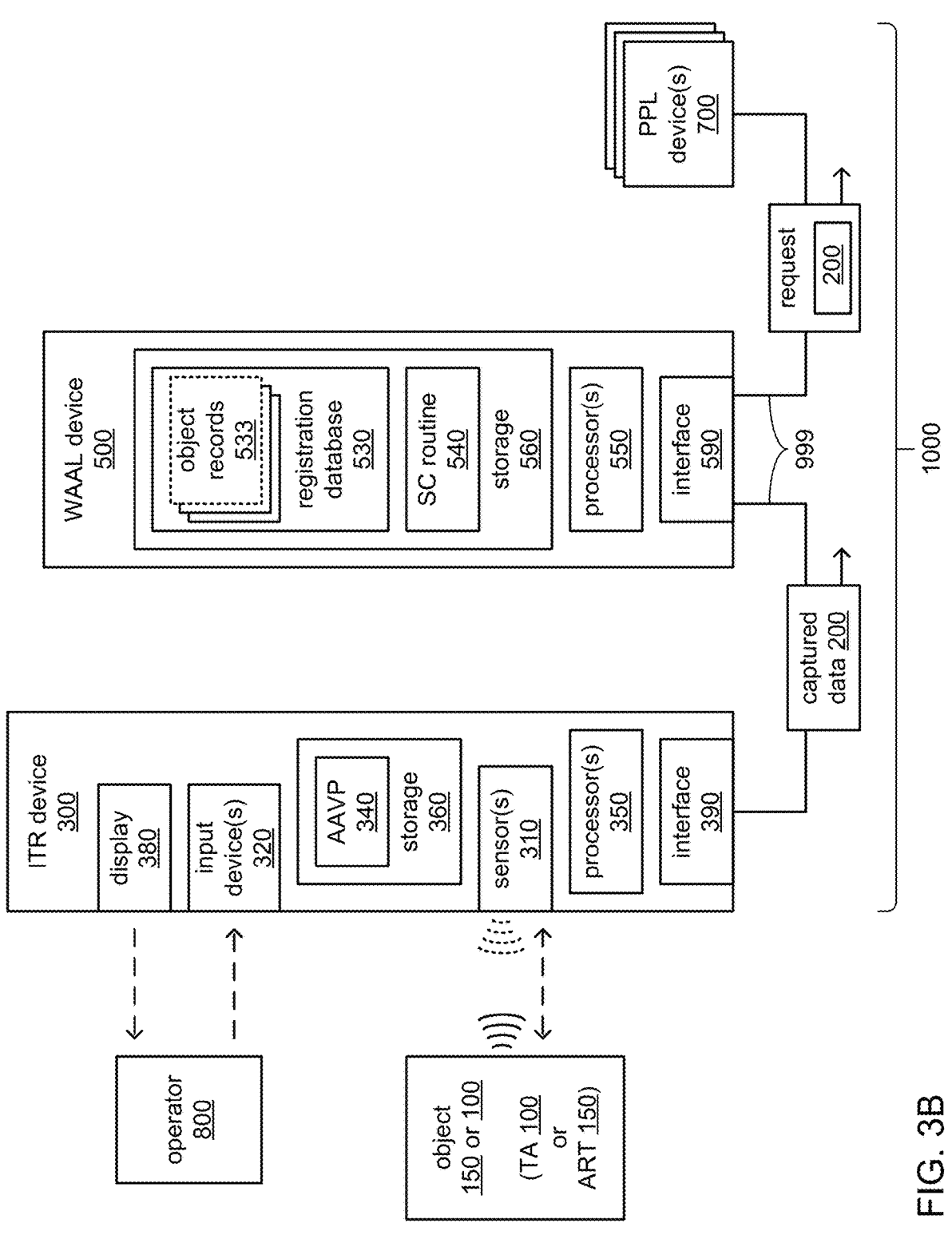
Figure 3C:
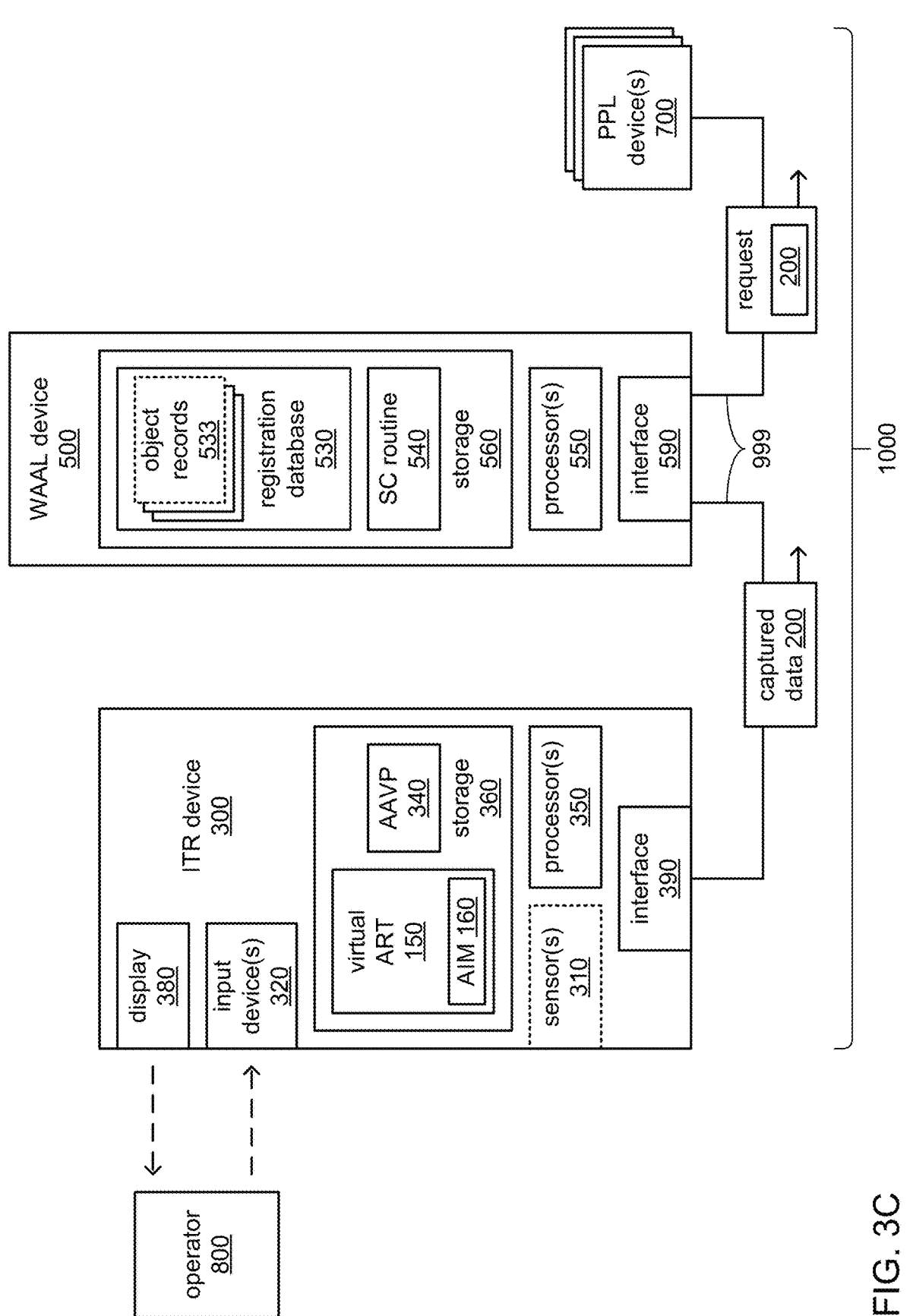

Turning to FIGS. 3B and 3C, with the operator 800 authorized to use the authentication system 1000 (regardless of whether they were already authorized or had to be registered to become authorized), registration of the depicted object 150 or 100 may begin with the capturing of one or more preselected types of data concerning it.

Where the object 150 or 100 is a physical object, as depicted in FIG. 3B, one or more sensors 310 may be used to capture data concerning it. Since it initially may not be known what type of object the object 150 or 100 is, it may be that the preselected types of data were chosen to include data types that were deemed most likely to be useful in identifying what type of object the object 150 or 100 is or is not. Alternatively or additionally, since, in some embodiments, the ITR device 300 may be any of a wide variety of types of portable electronic device, it may be that the preselected types of data were chosen to include data types that were deemed most likely to be able to be captured using the type(s) of sensor 310 that were deemed mostly likely to be incorporated into that wide variety of types of portable electronic device.

However, where the object is a virtual ART 150, as depicted in FIG. 3C, it may be that any sensors 310 that may be incorporated into the ITR device 300 cannot be used to capture data concerning it. Instead, as depicted, it may be necessary to import or otherwise load the virtual ART 150 into the storage 360 of the ITR device 300 in order to capture data concerning it. In some embodiments, the virtual ART 150 may be loaded into the same storage device in which other data and/or the AAVP 340 may be stored. However, in other embodiments, the virtual ART 150 may be stored in a removable storage device (not specifically shown), such as a removable non-volatile memory card (e.g., an SD card or USB memory stick). Regardless of the exact type of storage device in which the virtual ART 150 is stored, as will be familiar to those skilled in the art, such storage of the virtual ART 150 may provide the processor(s) 350 of the ITR device 300 with access to the entirety of the data file or other form of data structure of the virtual ART 150 (see FIG. 2A, for example), thereby allowing various characteristics and the AIM 160 therein to be accessed and/or analyzed.

Referring to both FIGS. 3B and 3C, regardless of the type or form of the object 150 or 100, the ITR device 300 may transmit the data captured concerning the object 150 or 100 to the WAAL device 500 as the depicted captured data 200 via the network 999. Upon receiving the captured data 200 concerning the object 150 or 100, the processor(s) 550 of the WAAL device 500 may be caused to use that data to attempt to identify the object type of the object 150 or 100. In so doing, the processor(s) 550 may be caused to compare at least a subset of the captured data 200 to object records 533 already stored within the registration database 530 maintained within the WAAL device 500 for previously registered objects to find a match deemed to be close enough for purposes of identifying an object type. Alternatively or additionally, the captured data 200 received from the ITR device 300 may include manual input that the operator 800 was prompted to provide and/or that was captured from an AIM 160 of the object 150 or 100 that explicitly identifies its object type.

Regardless of the exact manner in which the object type of the object 150 or 100 is identified, upon being identified to the degree possible in view of the what data is included in the captured data 200, the WAAL device 500 may use the identification of that object type to select one or more particular PPL devices 700 as the one(s) to which the WAAL device 500 transmits a request for more information concerning objects of that identified object type via the network 999. As previously discussed, individual PPL devices 700 may be maintained by particular manufacturers and/or other creators of particular types of objects, and/or by experts and/or entities having a focus on particular types of objects.

The request may include some or all of the captured data 200 received from the ITR device 300 to enable each PPL device 700 to which the request is directed to further narrow the search within its pre-registration database 730 to particular object type(s) and/or to identify the particular object 150 or 100 that is to be registered.

Figure 3D:
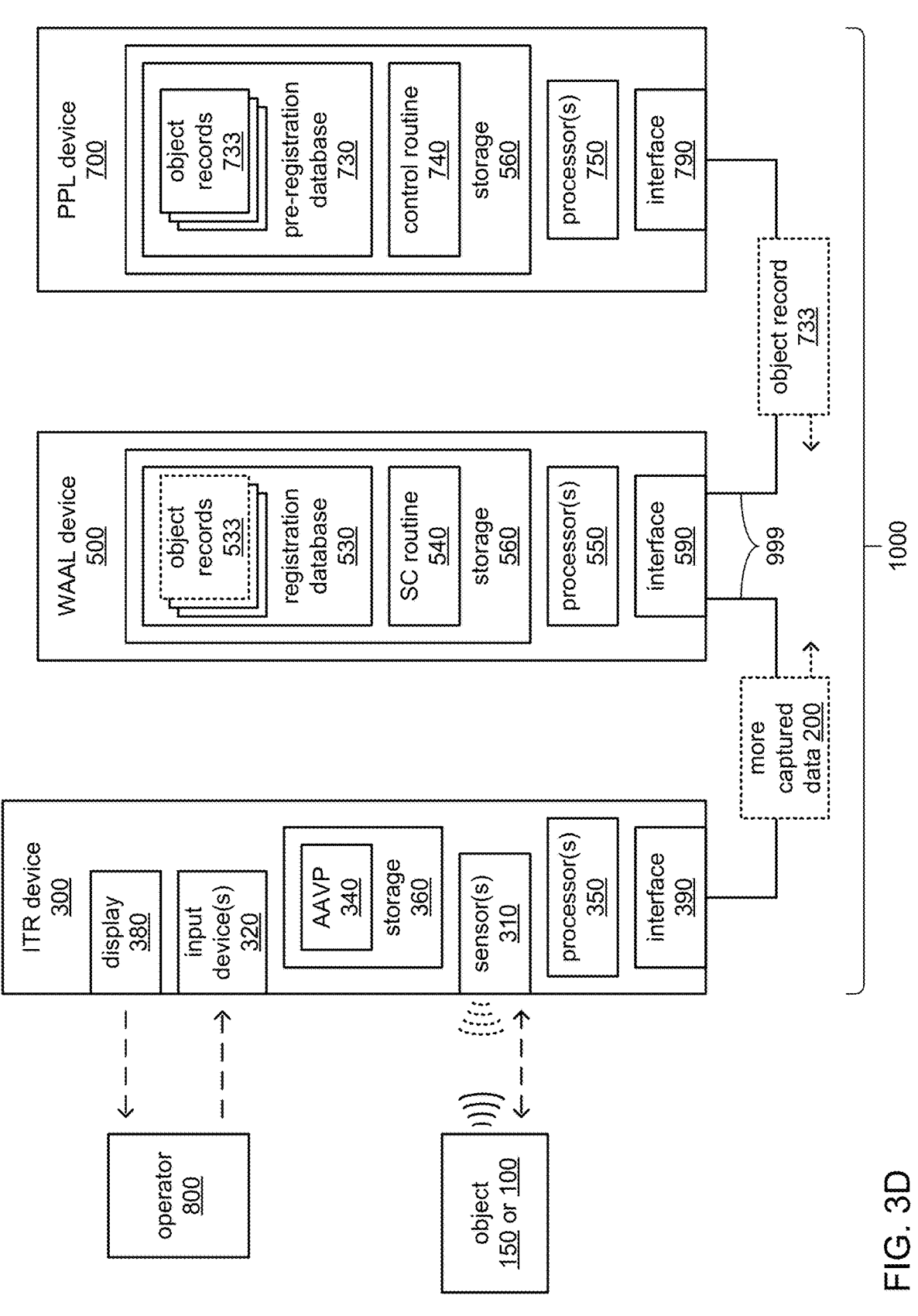

Turning to FIG. 3D, in response to such a request, one or more of the PPL device(s) 700 to which the request was directed may transmit one or more object records 733 corresponding to the particular object type(s) and/or to the particular object(s) that are deemed a close enough match to the object 150 or 100.

Upon receiving such object record(s) 733 from at least one PPL device 700, and as previously discussed, the processor(s) 550 of the WAAL device 500 may be caused to use the types of data that are included in the received object record(s) 733 as a guide in determining if there are any additional types of data that should be captured by the ITR device 300 beyond what was included in the preselected set of data types. If there are further types of data to be captured, then the WAAL device 500 may provide indications to the ITR device 300 of those additional types of data to be captured, and as depicted, this may cause more captured data 200 to be provided to the WAAL device 500 by the ITR device 300 via the network 999.

As will be readily recognizable by those skilled in the art, there may be one or more types of data that may be deemed desirable and/or necessary to capture, but which may require some form of security credential to do so. By way of example, it may be that the object 150 or 100 includes an AIM 160 that must be provided with a security key or other credential before it will provide data that can be captured by a sensor 310 of the ITR device 300. An example of such an AIM 160 may be a secure RFID tag to which a security key must be transmitted by the magnetic field used to provide power or by an NFC radio signal that is transmitted along with such a magnetic field. In such embodiments, a PPL device 700 may include such information as that security key in the object record 733 that it may transmit to the WAAL 500 in response to the request.

Alternatively, where the object 150 or 100 may not have been pre-registered such that there may be no PPL device 700 that stores any information concerning the object 150 or 100, it may be that the WAAL device 500 does not receive any object records 733 from any PPL device 700 in response to the request. In response, the processor(s) 550 of the WAAL device 500 may search the object records 533 within its registration database 530 to identify one or more other objects 150 and/or 100 that have been previously registered, and that are of the same and/or sufficiently similar type, and may use indications of the types of data captured for those other objects as a guide in determining if there are any additional types of data that should be captured by the ITR device 300 beyond what was included in the preselected set of data types.

As still another alternative, it may be that the object records 533 within the registration database 530 include records of known counterfeit objects 150 or 100. Such object records 533 may include indications of various approaches to how such counterfeits are able to be distinguished from their authentic counterparts. Alternatively or additionally, such object records 533 may include indications of which types of data that may be captured concerning an object 150 or 100 have been rendered less reliable as a result of a discovered ability to recreate one or more characteristics, and/or one or more distinguishing features that may have once been deemed to provide reliable ways to distinguish authentic objects 150 or 100 from counterfeits. The processor(s) 550 of the WAAL device 500 may use such information within such object records 533 as guidance in determining what types of data are no longer as useful to capture as they may have been at an earlier time.

Regardless the exact manner in which the fuller set of types of data to be captured concerning the object 150 or 100 is selected, the processor(s) 550 may use all of those selected types of data within the captured data 200 to generate an object record 530 for the object 150 or 100.

It should be noted that, although not specifically shown in FIG. 3C, where the object is a virtual art 150, such additional types of data may be captured by further accessing the data file or other type of data structure used to implement that virtual art 150.

Figure 3E:
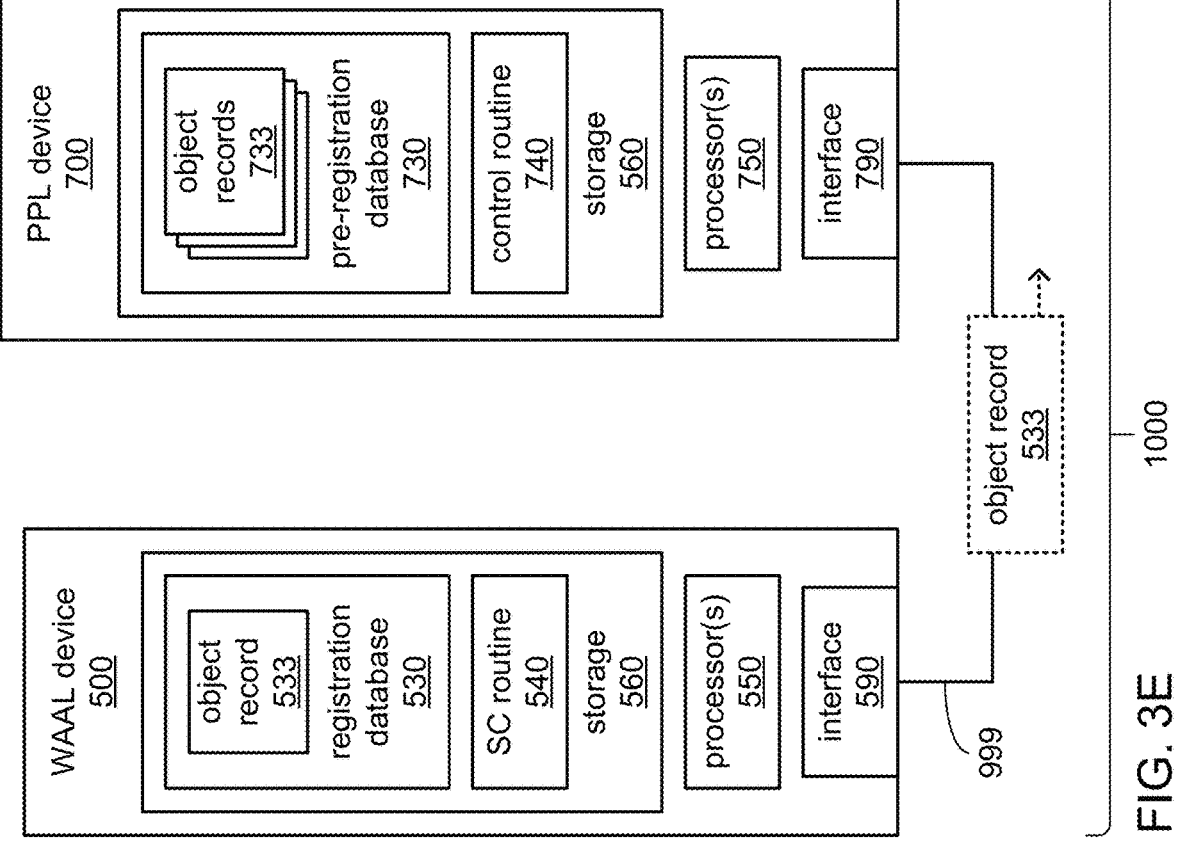
Figure 3F:
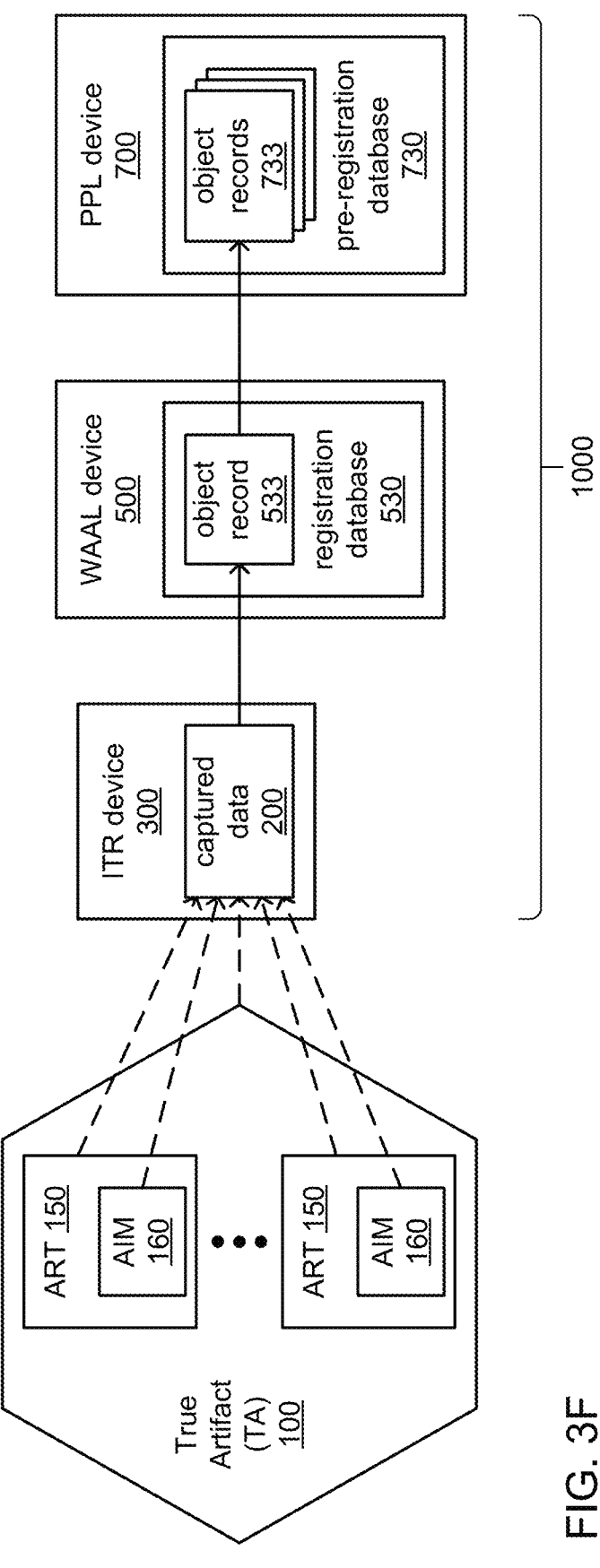

Turning to FIGS. 3E and 3F, as previously discussed, where the object is a TA 100 that includes multiple ARTs 150, and where the WAAL device 500 did receive at least one object record 733 from a PPL device 700, it may be that the types of data included in the captured data 200 that is ultimately received by the WAAL device 500 from the ITR device 300 reveals a combination of particular ARTs 150 that is not reflected in that object record 733. In response, the processor(s) 550 of the WAAL device 500 may respond to a PPL device 700 that provided such an object record 733 from its pre-registration database 730 by transmitting a copy of at least a portion of the object record 533 generated within the registration database 530 to provide that PPL device 700 with data indicative of the complete set of ARTs 150 that have been identified in the captured data 200 as being present within that TA 100.

In this way, the processor(s) 750 of a PPL device 700 that receives such data from the WAAL device 500 may use it to update one or more of its object records 733 to indicate that at least one corresponding ART 150 has been combined with one or more other ARTs 150 to form a TA 100. In so doing, such an updated object record 733 may be caused to include portions of the captured data about the one or more other ARTs 150 and/or about the TA 100. This, in turn, may cause improved guidance to be provided to another WAAL device

500 of what types of data should be captured if the same TA 100, or same type thereof, is encountered again at a subsequent time when it is being authenticated.

Figure 3G:
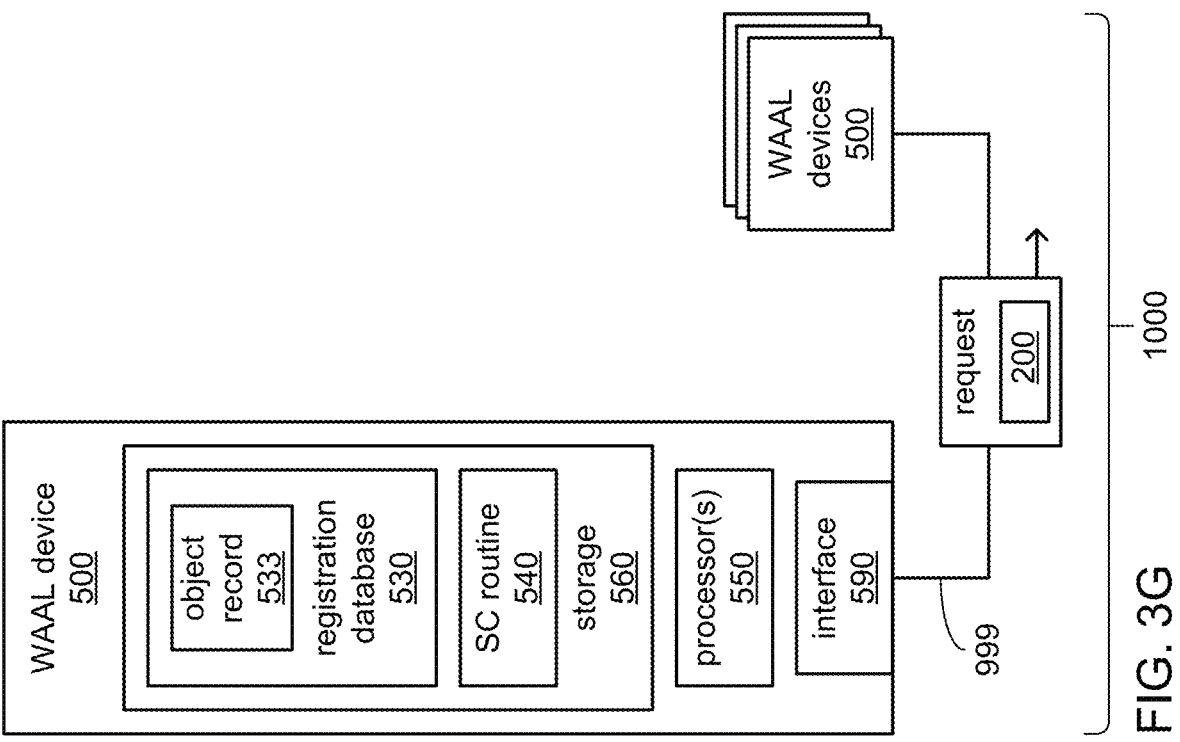

Turning to FIG. 3G, with the object record 533 generated for the object 150 or 100 now including the full set of data types of the data captured therefrom, the processor(s) 550 of the WAAL device 500 may prepare for the generation of an IT 400 for that object 150 or 100 by determining what weighting values are to be used for the different characteristics and/or distinguishing features described by that captured data 200. As previously discussed, it may be that, within each WAAL device 500, any of a variety of types of machine learning may be used to repeatedly derive and/or update the various weighting values used in deriving ITs 400 for each object that has been registered such that there is a corresponding object record 533 within one or more of the registration databases 530 maintained by the multiple WAAL devices 500 of the authentication system 1000.

More specifically, and as previously discussed, the weighting values used in generating an IT 400 for an object may be based on the relative degree to which each characteristic and distinguishing feature of that object is able to be counterfeited. Accordingly, as circumstances change over time such that various characteristics and/or distinguishing features become more or less able to be counterfeited, the weighting values associated therewith may be changed over time to reflect such changes.

Therefore, as part of determining what the weighting values should be for generating the IT 400 for the object 150 or 100, the processor(s) 550 may be caused to transmit a request to other WAAL devices 500 of the authentication system 1000 to provide suggested weighting values 535. Not unlike the earlier request discussed in reference to FIG. 3B, this request may also include at least a portion of the captured data 200 to enable each WAAL device 500 to which the request is directed to further narrow the search within its registration database 530 to particular object type(s).

Figure 3H:
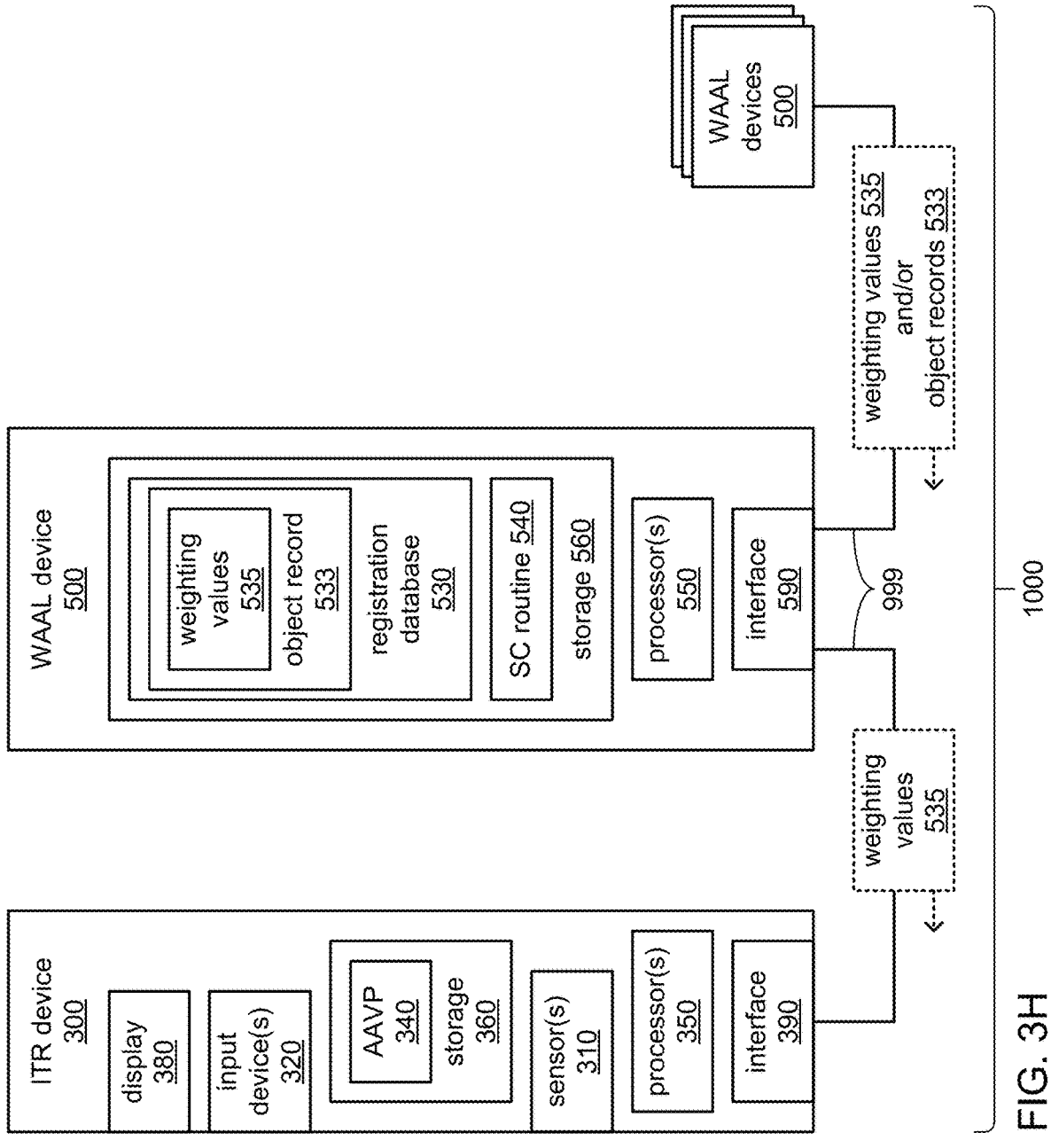
Figure 31:
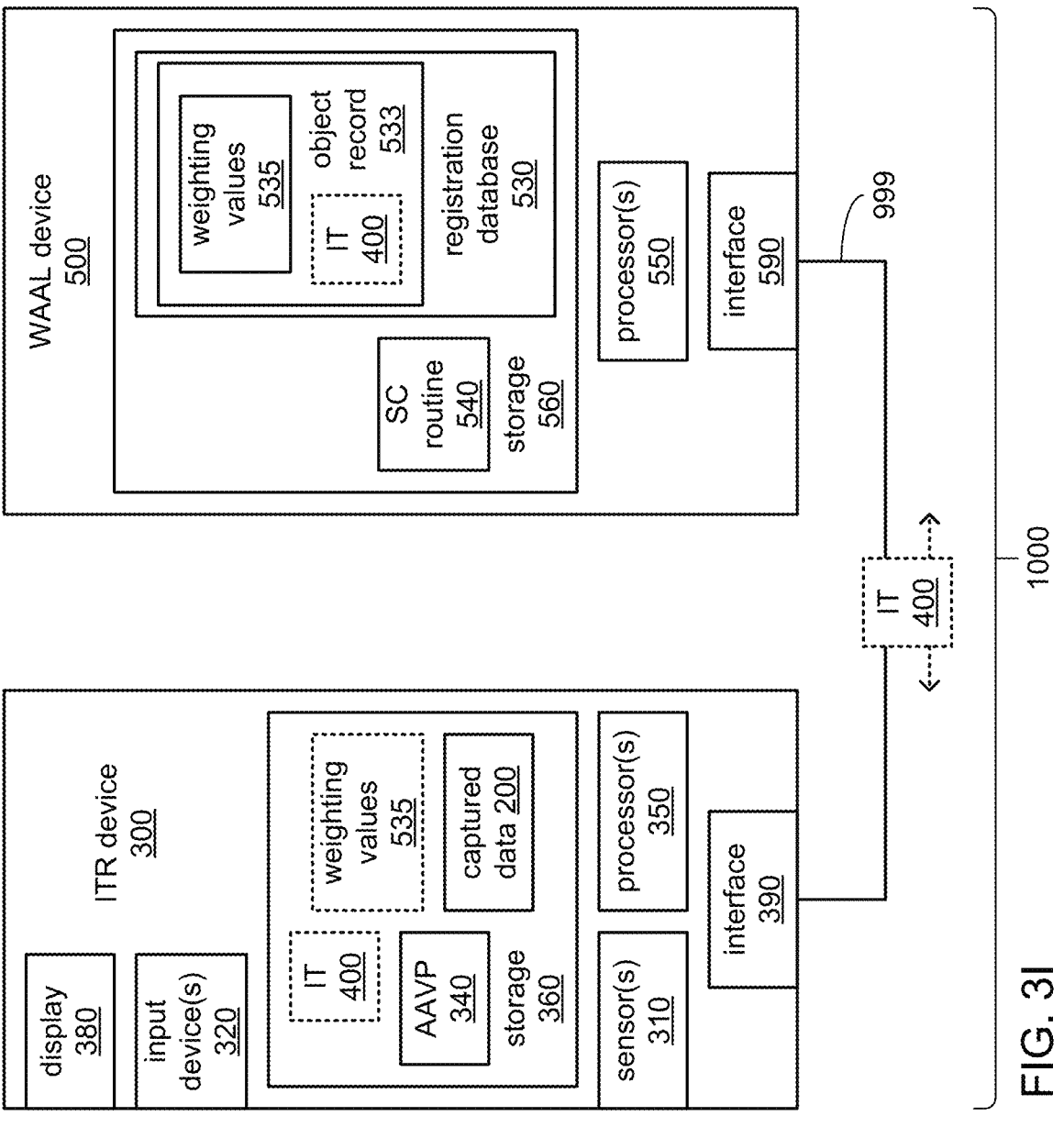

Turning to FIG. 3H, in response to such a request, one or more of the WAAL device(s) 500 to which the request was directed may transmit sets of weighting values 535 from object records 533 that correspond to object(s) of the particular object type(s), and/or to the particular individual object(s), that are deemed a close enough match to the object 150 or 100. Alternatively, in response to such a request, copies of those records 533 may be transmitted by such WAAL device(s) 500.

Upon receiving such multiple sets of weighting values 535 from other WAAL device(s) 500, and as previously discussed, the processor(s) 550 of the WAAL device 500 may be caused to use the received weighting values 535 as guidance to derive a single set of weighting values 535 for use in generating an IT 400 for the object 150 or 100. In various embodiments, differing factors may play a role in the processor(s) 550 selecting a set of weighting values 535 that are to be so used. For example, such factors may include determining which of the received sets of the weighting values 535 is the one most recently derived by one of the WAALs 500 from which it is received. As has been discussed, it may be that one or more weighting values 535 used in generating an IT 400 are adjusted based on the receipt of an input indicative of an event in which the degree to which a characteristic or distinguishing feature relied upon for a type of object has changed. Such an event may be a situation in which one of a type of object was incorrectly determined to be authentic or incorrectly determined to be counterfeit.

Regardless of the exact manner in which a set of weighting values 535 is generated for the object 150 or 100, that set of weighting values 535 may be stored as part of (or otherwise associated with) the object record 533 for that object 150 or 100 within the registration database 530. As previously discussed, in various different embodiments, it may be either the WAAL device 500 or the ITR device 300 that is involved in registering the object 150 or 100 that may generate the IT 400 therefor. In embodiments in which it is the ITR device 300 that does so, the set of weighting values 535 that are determined for generating that IT 400 may be transmitted to the ITR device 300 via the network 999.

Turning to FIG. 3I, as just discussed, in various different embodiments, the IT 400 for the object 150 or 100 may be generated either by the processor(s) 350 within the ITR device 300, or by the processor(s) 550 within the WAAL device 500. Regardless of which of these two devices 300 or 500 the IT 400 for the object 150 or 100 is generated within, a copy of that IT 400 may then be transmitted to the other of these two devices via the network 999.

Figure 3J:
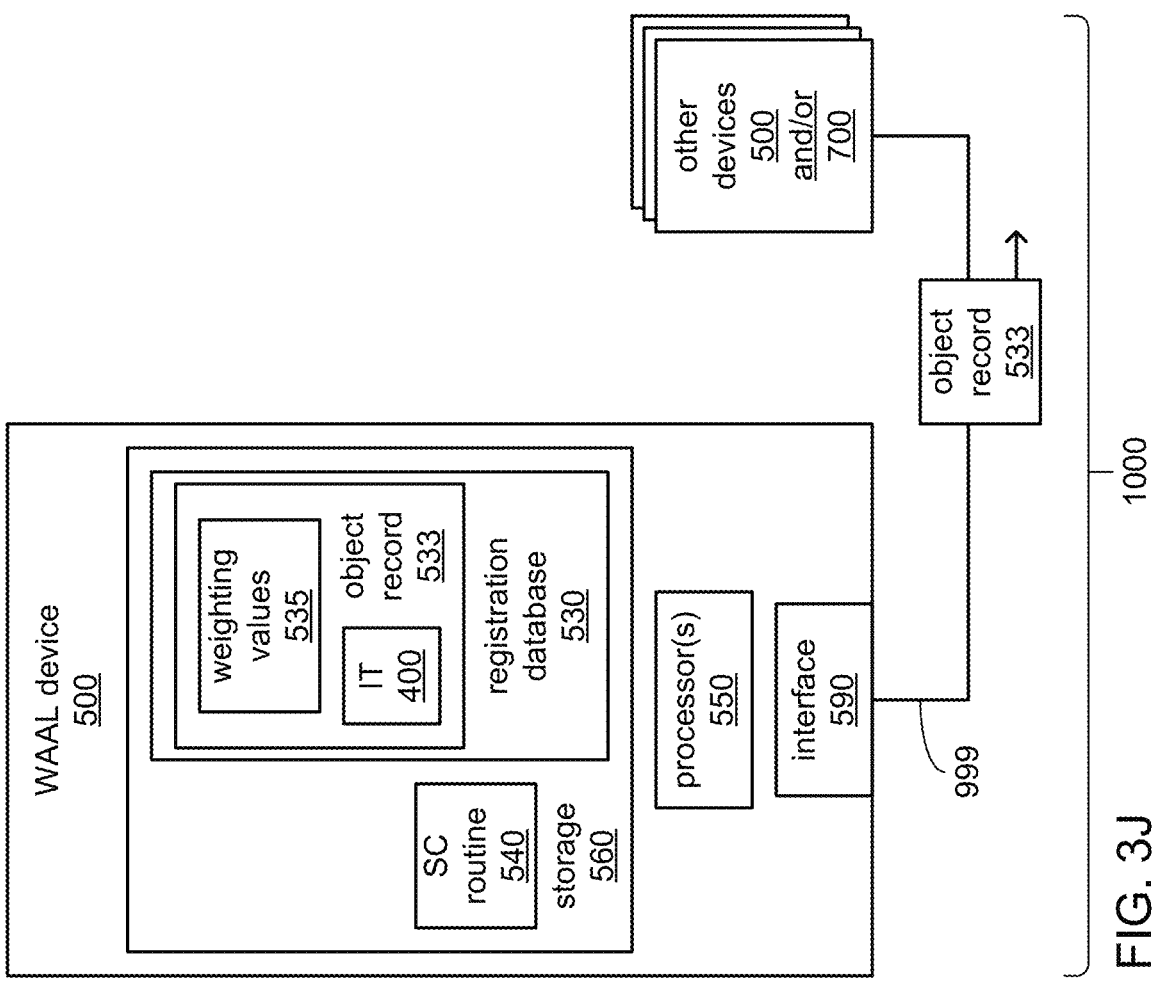

Turning to FIG. 3J, as previously discussed, the WAAL devices 500 of the authentication system 1000 may exchange data about registered objects on a recurring basis. This may be done as part of maintaining coherency in the distributed storage of such data among those WAAL devices 500. However, as also previously discussed, this may be done as a measure against corruption of such data caused either by malfunctions of hardware and/or software, or by malicious acts. As will be readily recognized by those skilled in the art, such malicious acts may be motivated by seeking to aid in the counterfeiting of an object, seeking to add data for a counterfeit object to cause the authentication system 1000 to provide incorrect determinations that the counterfeit object is authentic, etc.

Figure 3K:
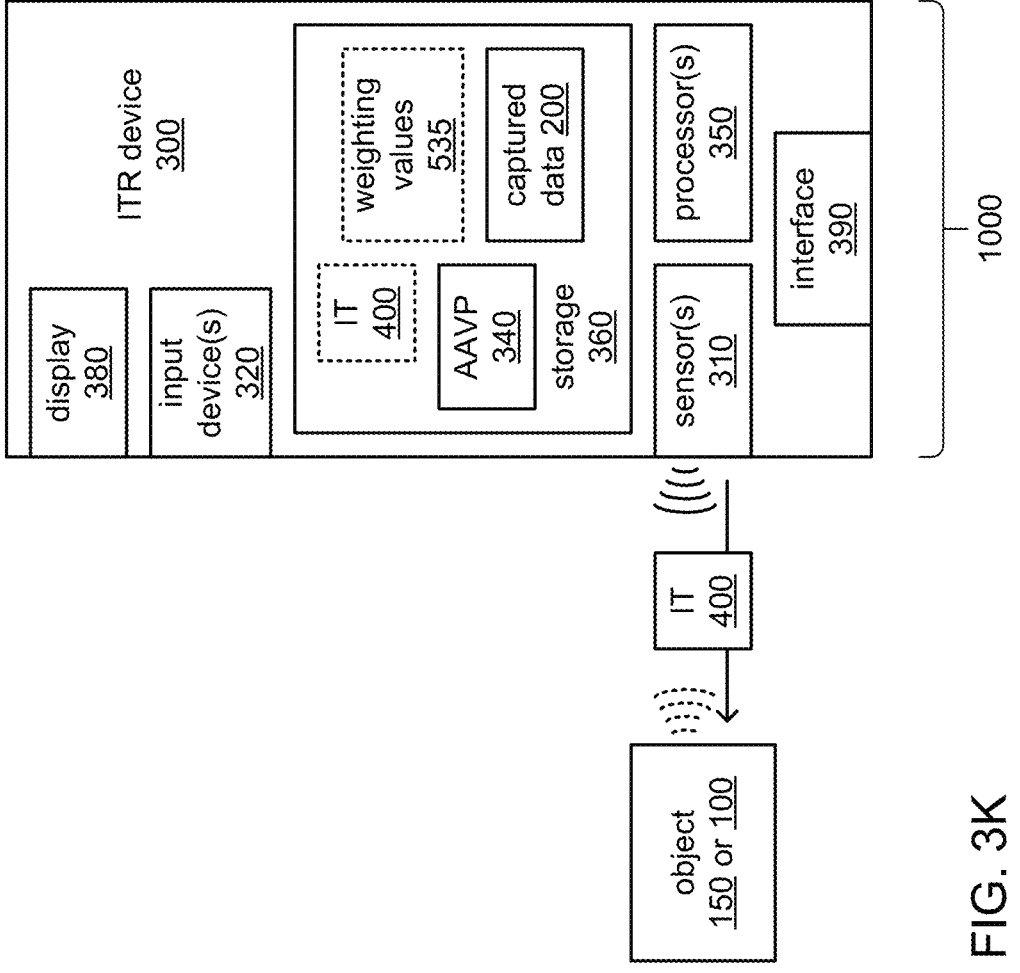
Figure 3M:
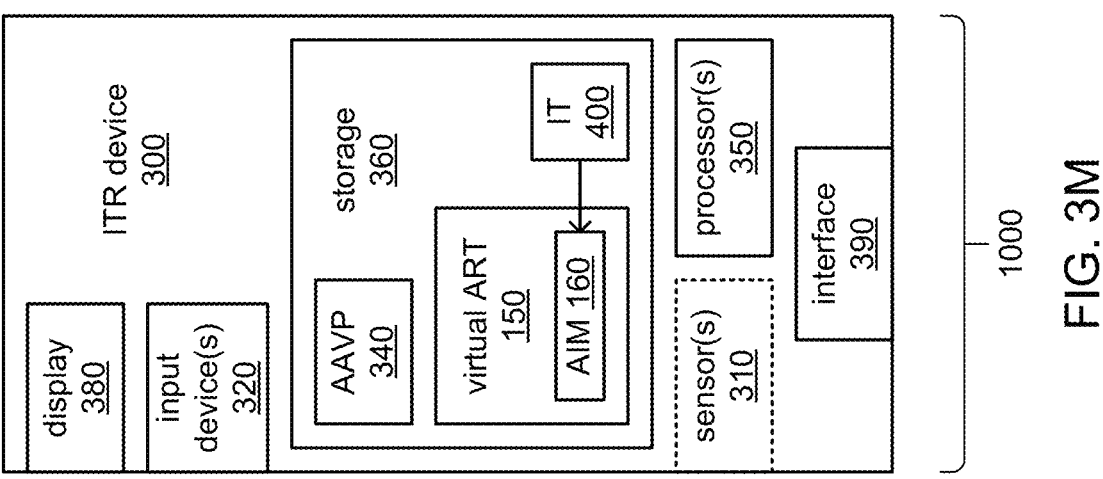
Figure 3L:
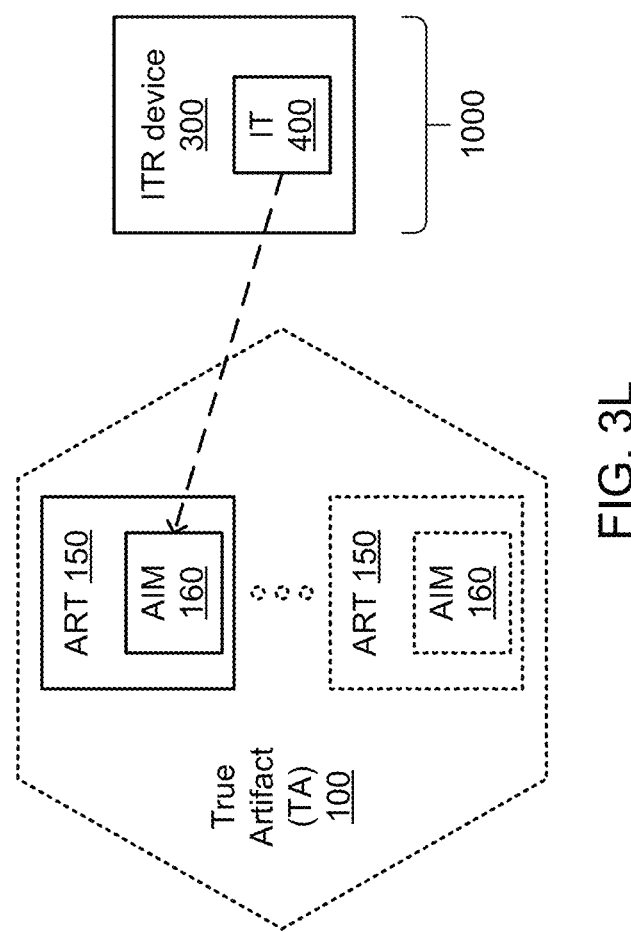

Turning to FIGS. 3K, 3L and 3M, as previously discussed, in some embodiments, it may be that an AIM 160 of the object 150 or 100 is or includes a copy of the IT 400 for that object 150 or 100.

Where the object 150 or 100 is a physical object, as depicted in FIGS. 3K and 3L, and by way of example, it may be that such an AIM 160 is implemented as an RFID tag that is capable of enabling at least a portion of its stored contents to be augmented and/or rewritten with new data. Still more precisely, such an RFID tag may also store an inalterable identifier of the RFID tag, itself, and may transmit both that inalterable identifier and the rewritable data when powered with electromagnetic energy from an appropriate type of sensor 310. Thus, as depicted, and following the generation of the IT 400 (whether within the ITR device 300 or within the WAAL device 500), processor(s) 350 of the ITR device 300 may operate such a sensor 310 to again emit a magnetic field to power such an RFID tag serving as an AIM 160, and to accompany that magnetic field with a transmission of the IT 400 (either in the magnetic field, or in an accompanying radio signal). In such an embodiment, the IT 400 may then become a distinguishing feature of the object 150 or 100. Still further, it may be that over time, on each occasion on which the object 150 or 100 is authenticated, a new IT 400 may be generated and transmitted to the object 150 or 100 to either replace the preceding IT 400 stored therein, or to be added to a growing chain of ITs 400 stored therein.

However, where the object is a virtual ART 150, as depicted in FIG. 3M, it may be that at least a portion of the AIM 160 thereof is accessed within the data file or other data structure used to implement the virtual ART 150 to write the IT 400 as the AIM 160 or into the AIM 160.

Authentication of Objects

FIGS. 4A, 4B, 4C, 4D, 4E, 4F, 4G, 4H and 4I, taken together, present various aspects of the use of embodiments of authentication system 1000 of FIGS. 1A-D to authenticate objects 150 or 100 using the authentication system 1000, and information stored therein as a result of earlier pre-registration and/or registration of those objects 150 or 100, as described above.

More specifically, FIGS. 4A-I, taken together, present an example of a seller offering an object 150 or 100 to a potential buyer. In anticipation of such a transaction and/or as part of such a transaction, one of them becomes an operator 800 of the depicted ITR device 300 to use the authentication system 1000 to authenticate the object 150 or 100.

Figure 4A:
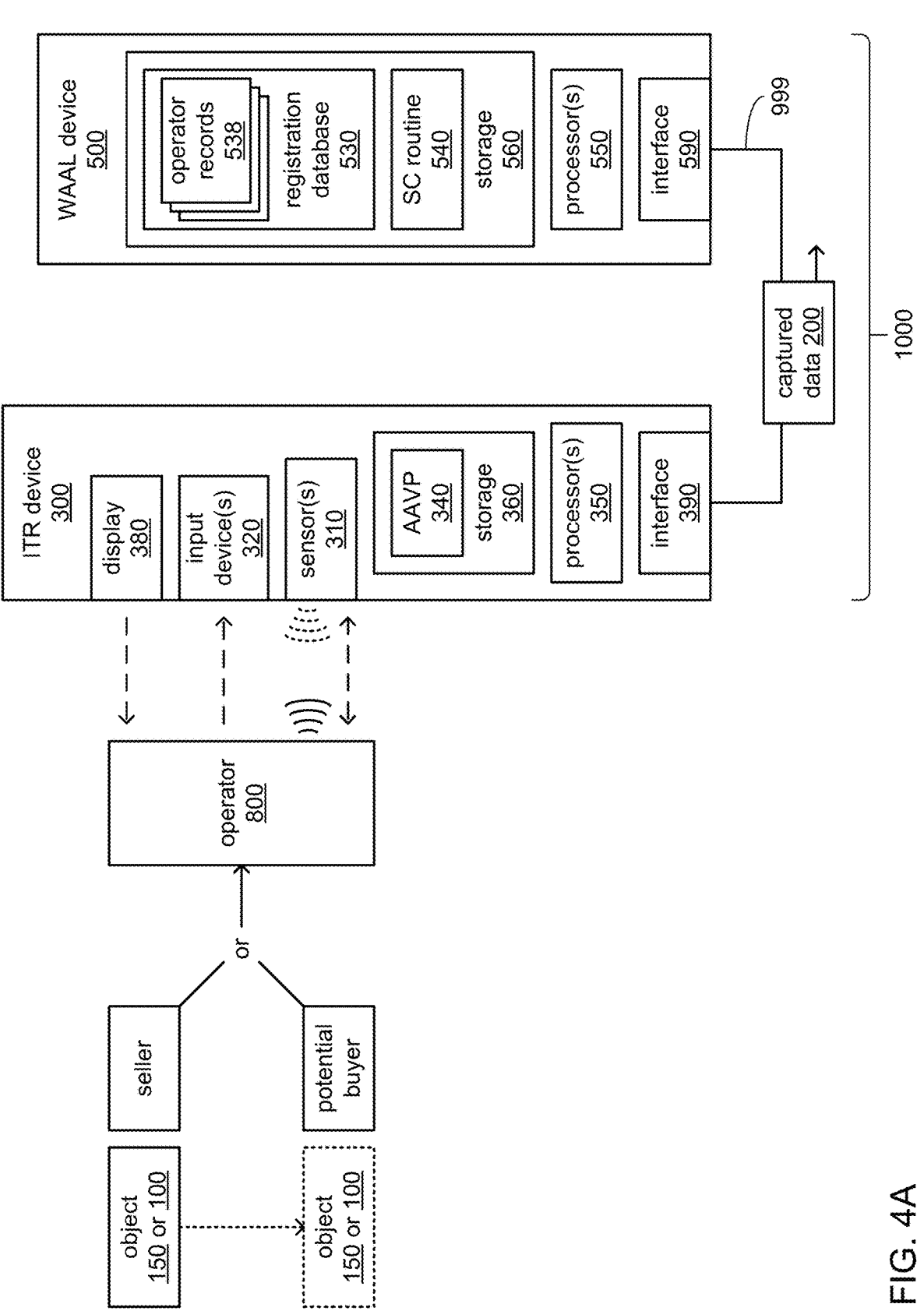
FIGS. 4A, 4B, 4C, 4D, 4E, 4F, 4G, 4H and 4I, together, provide a more detailed presentation of use of an embodiment of the authentication system of FIGS. 1A-D to authenticate embodiments of objects.

Turning to FIG. 4A, as previously discussed, prior to being permitted to use an ITR device 300 to either register or authenticate an object 150 or 100, the operator 800 of that ITR device 300 needs to be registered as an authorized user of the authentication system 1000. As discussed above in detail in reference to FIG. 3A, the manner in which an operator 800 is registered and/or subsequently authenticated as being authorized to use the authentication system 1000 may resemble the manner in which objects 150 and/or 100 are so registered and subsequently authenticated.

Thus, presuming that the depicted operator 800 was previously registered as an authorized user of the authentication system 1000, the processor(s) 350 of the ITR device 300 may be caused, by execution of the AAVP 340 to capture data concerning the operator 800 to authenticate the operator 800. Such capturing of data may entail using the display 380 and/or input device(s) 320 of the ITR device 300 to provide a UI that includes prompts to the operator 800 to provide answers to one or more questions about themselves. Alternatively or additionally, such capturing of such data may entail the use of one or more sensors 310 of the ITR device 300 capture data indicative of various characteristics of the operator 800 (e.g., physical dimensions, weight, 2D and/or 3D images, etc.), and/or distinguishing features of the operator 800 (e.g., tattoos, jewelry worn, driver's license or other ID card, ID badge, etc.).

The ITR device 300 may transmit such captured data 200 to the WAAL device 500 via the network 999. Within the WAAL device 500, the captured data 200 may be used to attempt to identify the operator 800 as one of the previously authorized users of the authentication system 1000 for whom such data has already been stored within one of multiple operator records 538. Again, in some embodiments, such records may be included within the registration database 530.

Presuming that the operator 800 has been previously registered as one of such authorized users, the WAAL device 500 may then use the captured data 200 received from the ITR device 300 to retrieve an operator record 538 previously generated for the operator 800. The WAAL device 500 may transmit an indication to the ITR device 300 of one or more further particular types of data to be captured concerning the operator 800. Again, such indications of particular types of data to be captured may be based on past practices of what types of data are to be captured for authorized persons, and it may be that such practices may change over time as new types of such data are devised and/or become deemed to be necessary to thwart ever changing efforts at counterfeiting characteristics of persons and/or distinguishing features of persons. Regardless of the exact types of data that are selected to be captured, and regardless of whether more data is requested to be captured, the captured data 200 may be used to generate a new IT for the operator 800 that is compared to the IT that may have been previously generated and stored for the operator to authenticate the operator 800 as authorized to use the authentication system 1000.

Figure 4B:
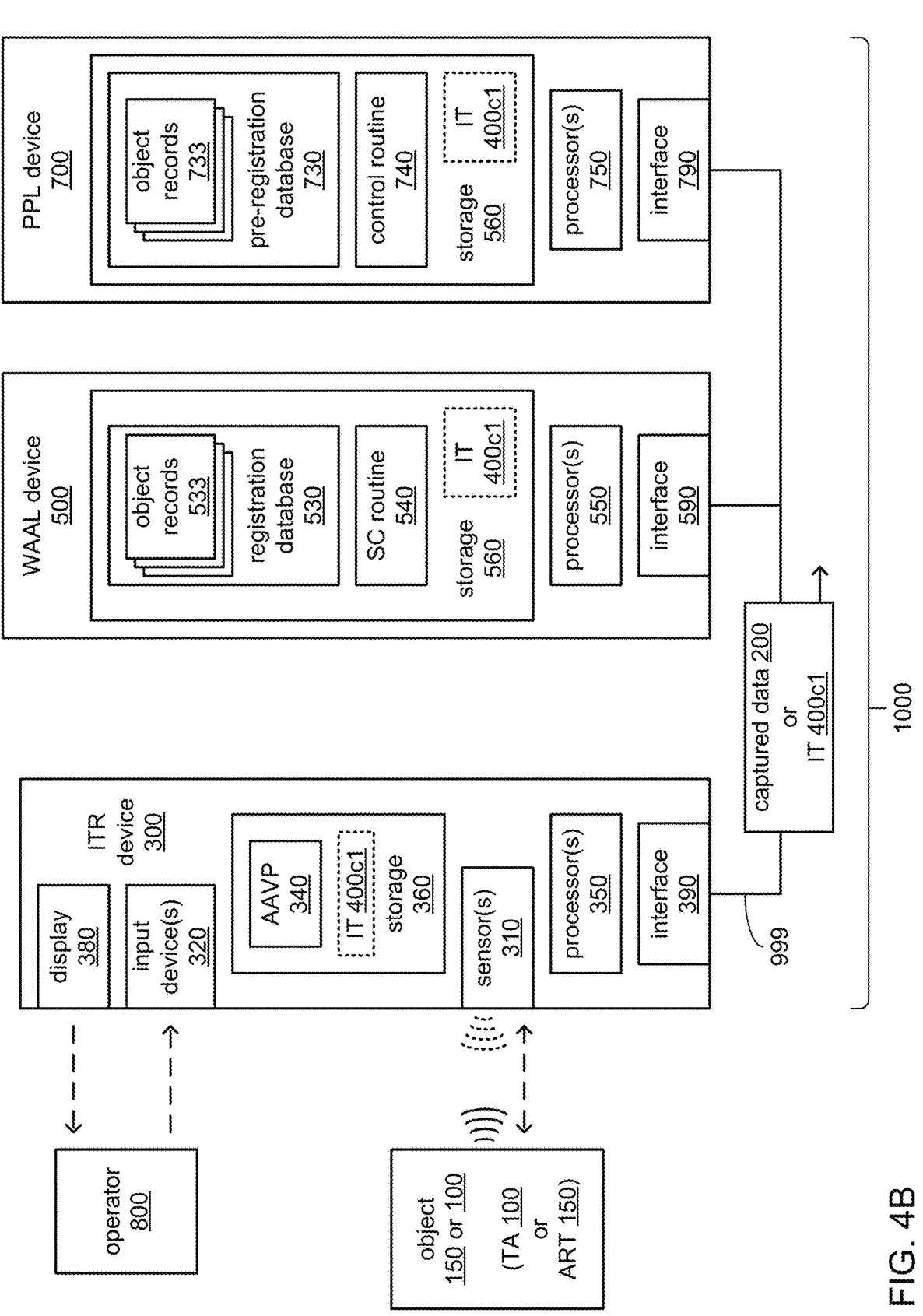
Figure 4C:
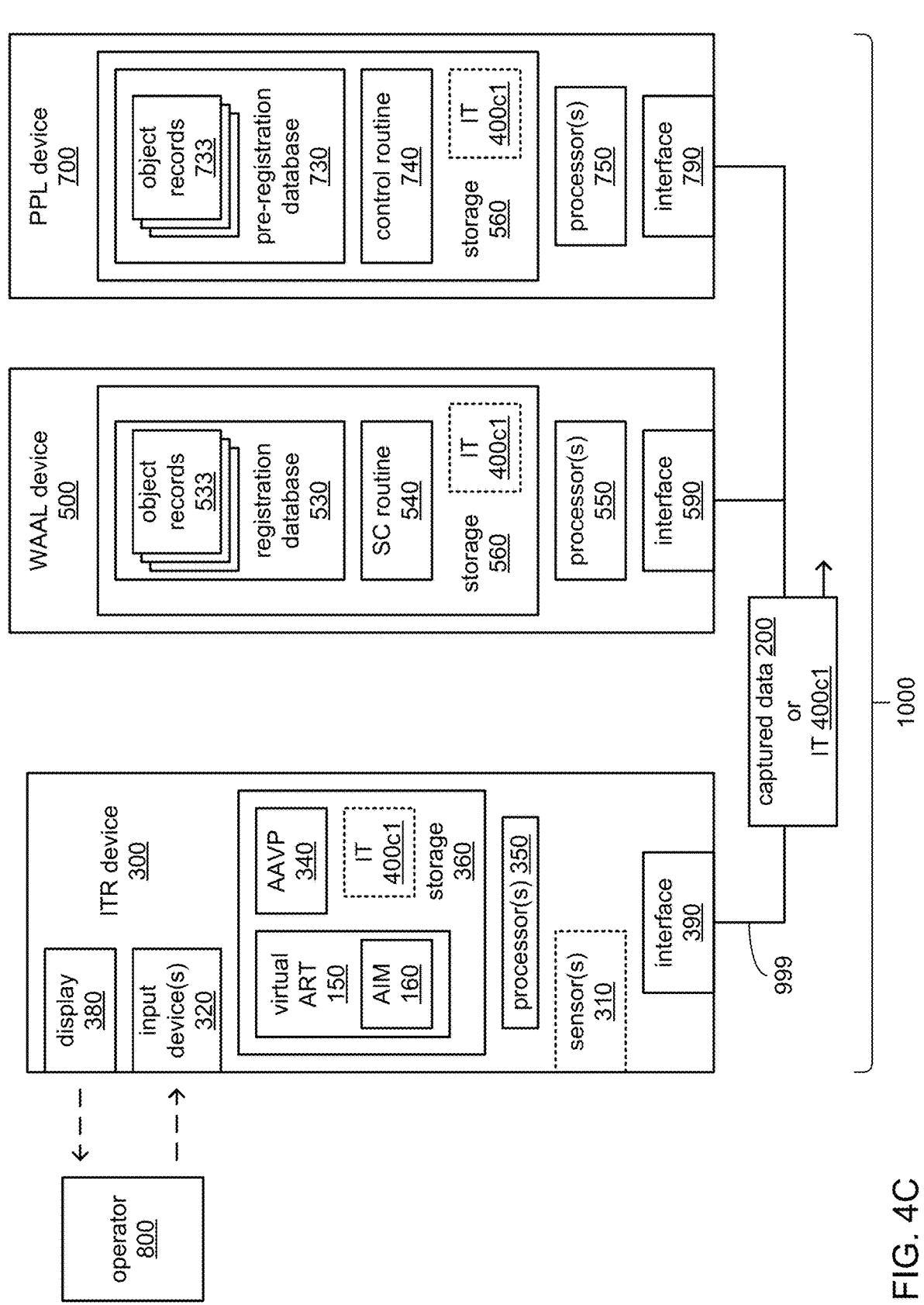

Turning to FIGS. 4B and 4C, with the operator 800 authorized to use the authentication system 1000 (regardless of whether they were already authorized or had to be registered to become authorized), authentication of the depicted object 150 or 100 may begin with the capturing of one or more preselected types of data concerning it.

Where the object 150 or 100 is a physical object, as depicted in FIG. 4B, one or more sensors 310 may be used to capture data concerning it. Again, since it initially may not be known what type of object the object 150 or 100 is, it may be that the preselected types of data were chosen to include data types that were deemed most likely to be useful in identifying what type of object the object 150 or 100 is or is not. Alternatively or additionally, since, in some embodiments, the ITR device 300 may be any of a wide variety of types of portable electronic device, it may be that the preselected types of data were chosen to include data types that were deemed most likely to be able to be captured using the type(s) of sensor 310 that were deemed mostly likely to be incorporated into that wide variety of types of portable electronic device.

However, where the object is a virtual ART 150, as depicted in FIG. 4C, it may be that any sensors 310 that may be incorporated into the ITR device 300 cannot be used to capture data concerning it. Again, as depicted, it may be necessary to import or otherwise load the virtual ART 150 into the storage 360 of the ITR device 300 in order to capture data concerning it. In some embodiments, the virtual ART 150 may be loaded into the same storage device in which other data and/or the AAVP 340 may be stored. However, in other embodiments, the virtual ART 150 may be stored in a removable storage device (not specifically shown), such as a removable non-volatile memory card (e.g., an SD card or USB memory stick). Regardless of the exact type of storage device in which the virtual ART 150 is stored, as will be familiar to those skilled in the art, such storage of the virtual ART 150 may provide the processor(s) 350 of the ITR device 300 with access to the entirety of the data file or other form of data structure of the virtual ART 150 (see FIG. 2A, for example), thereby allowing various characteristics and the AIM 160 therein to be accessed and/or analyzed.

Referring to both FIGS. 4B and 4C, regardless of the type or form of the object 150 or 100, the ITR device 300 may transmit the data captured concerning the object 150 or 100 to multiple other devices via the network 999 (e.g., one or both of the depicted WAAL device 500 and the depicted PPL device 700) as the depicted captured data 200 via the network 999. It should be noted that it may be that the captured data 200 is received by one of these devices 500 or 700, and is then relayed onward to the other.

As an alternative to transmitting such captured data 200 to other devices, or in addition to doing so, in some embodiments, the ITR device 300 may generate an IT 400 for the object 150 or 100 (i.e., the depicted IT 400c1) based on the captured data 200. This may be done to reduce workloads imposed on WAAL devices 500 and/or PPL devices 700.

In embodiments in which different weighting values are given to different types of the captured data based on relative degrees of difficulty of counterfeiting different characteristics and/or distinguishing features of objects, it may be that the ITR device 300 employs such weighting values in generating the IT 400c1. In such embodiments, it may be that the weighting values that are used by the ITR device 300 are ones that were stored from previous use by the ITR device 300 in generating previous ITs 400 for objects previously encountered by the ITR device 300 that may be of similar object type to the object 150 or 100 being presented to it by the operator 800, presuming that sufficient data has been captured by the ITR device 300 to enable the object type of the object 150 or 100 to be identified. Alternatively, it may be that the ITR device 300 employs a default set of weighting values that may be generated within the ITR device 300 and/or provided thereto in any of a variety of ways.

Regardless of exactly what information is transmitted by the ITR device 300 to other device(s) via the network 999, such information may be accompanied with a request to authenticate the object 150 or 100.

Figure 4D:
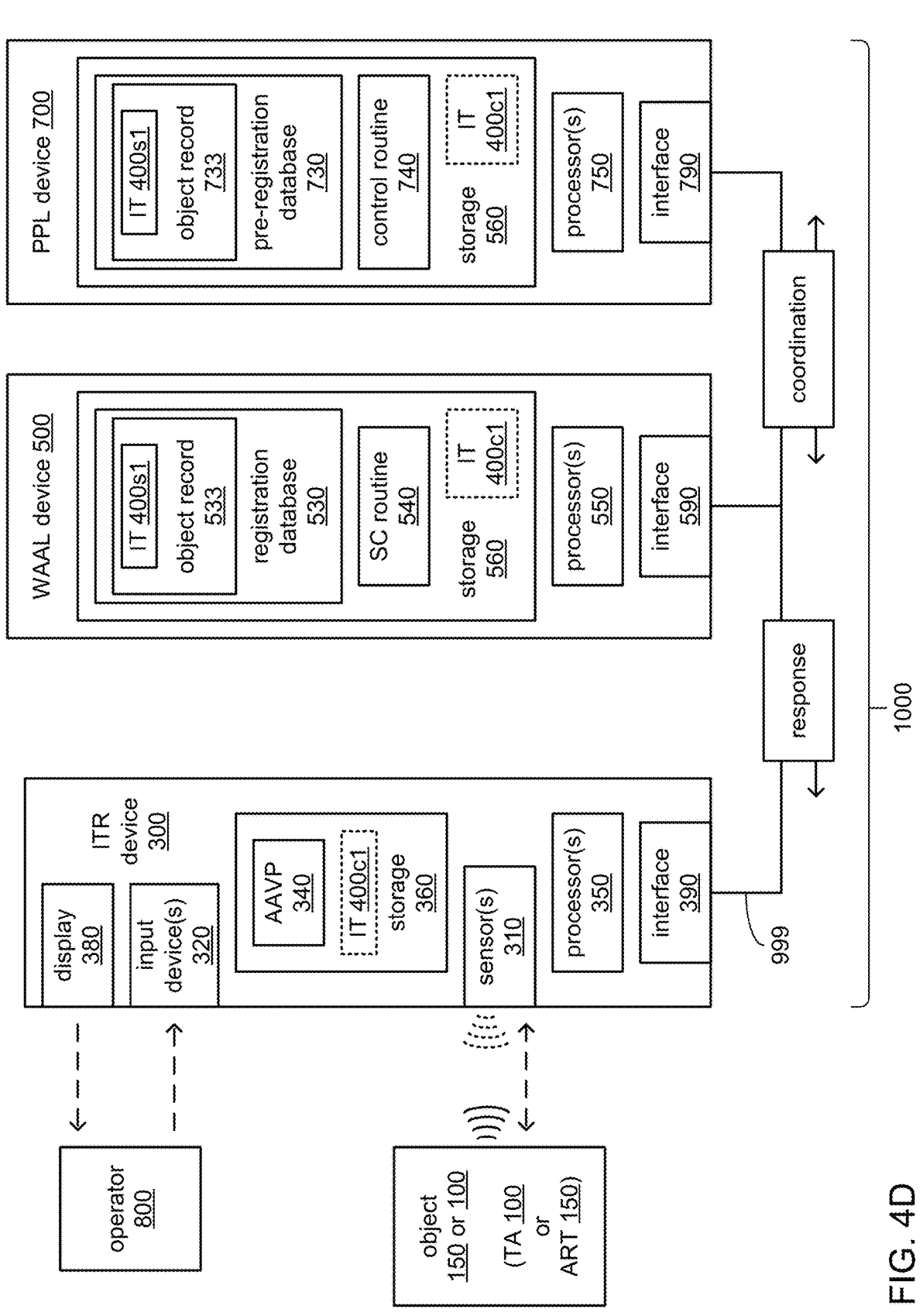

Turning to FIG. 4D, within each device 500 and/or 700 that receives the captured data 200 and/or the IT 400c1, along with the request to authenticate the object 150 or 100 associated with that information via the network 999, the receipt of such a request and/or such information may trigger the comparison of the IT 400c1 to IT values that are stored within object records 533 and/or 733 (i.e., the depicted ITs 400s1) that are stored within databases 530 and/or 730, respectively.

In embodiments in which the ITR device 300 does not, itself, generate and provide the IT 400c1 based on the captured data 200, it may be that each device 500 and/or 700 that receives the captured data 200 independently generates the IT 400c1, itself. In embodiments in which different weighting values are given to different types of the captured data based on relative degrees of difficulty of counterfeiting different characteristics and/or distinguishing features of objects, it may be that each device 500 or 700 employs such weighting values in its independent generation of the IT 400c1. In such embodiments, it may be that the weighting values that are used by each device 500 or 700 are ones that were stored from previous use in generating previous ITs 400 for objects previously encountered that may be of similar object type, presuming that sufficient data is received from the ITR device 300 to enable the object type of the object 150 or 100 to be identified. Alternatively, it may be that each such device 500 or 700 employs a default set of weighting values that may be generated therein and/or provided thereto in any of a variety of ways.

In some embodiments, such comparisons of IT values may be made directly by comparing the IT 400c1 directly to the IT 400s1 stored within each object record 533 or 733. In other embodiments, the IT 400c1 may be hashed and/or encrypted using any of a variety of hashing and/or encryption techniques, and a comparison may then be made of the resulting hash value to a hash table derived from hash values generated from the stored ITs 400s1. In differing ones of such embodiments, such use of a hash value may be to at least reduce the number of direct comparisons of IT values that must be made to at least reduce the number of object records 533 and/or 733 that need to be accessed, or such use of a hash value may be to entirely preclude making such direct comparisons.

In some embodiments, regardless of whether hash values generated from IT values are used, and presuming there is sufficient data received from the ITR device 300 to enable an object type of the object 150 or 100 to be identified, the identification of the type of the object may be used to limit which ones of the object records 533 and/or 733 are to be included in the effort to match the IT 400c1 to an IT 400s1 within a database 530 and/or 730, respectively.

Regardless of the exact manner in which the IT 400c1 is generated and compared to the IT 400s1 stored within each object record 533 of a registration database 530 and/or is compared to the IT 400s1 stored within each object record 733 of a pre-registration database 730, if the degree of difference found between the IT 400c1 and an IT 400s1 stored within an object record 533 or 733 falls within a first range of degree of difference, then the IT 400c1 may be deemed to have been matched to that stored IT 400s1. Such a determination that such a match has been identified may result in the generation and transmission of a response to the ITR device 300 via the network 999 indicating that the object 150 or 100 is deemed to have been authenticated. In so doing, an indication of the degree of difference may be communicated to the ITR device 300, thereby enabling the ITR device 300 to present a visual or other indication of that degree of difference. In this way, an operator of the ITR device 300 may be provided with some indication of how much confidence there is in the indication of there being a match.

However, if the degree of difference found between the IT 400c1 and each IT 400s1 stored within an object record 533 or 733 falls outside of both the first range of degrees of difference and a second range of degree of difference that is larger than the first, then the IT 400c1 may be deemed to have no matches within the database 530 or 730, respectively. Such a determination that no match has been identified may result in the generation and transmission of a response to the ITR device 300 via the network 999 indicating that the object 150 or 100 is deemed to have not been authenticated. This may further lead to a determination that the object 150 or 100 is fake, or that the object 150 or 100 was not previously registered with the authentication system 1000 such that it cannot be authenticated thereby.

Figure 4E:
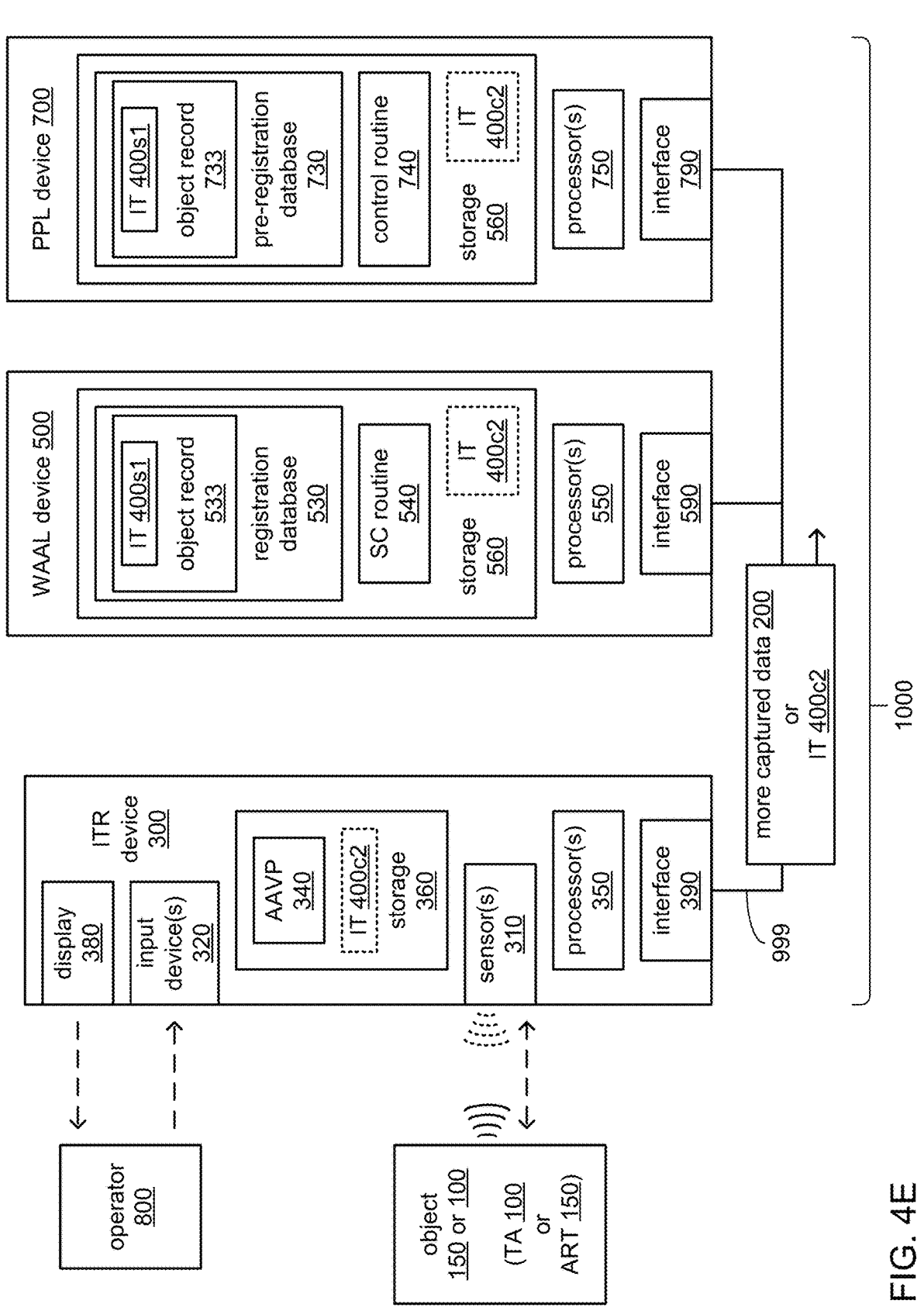

However, if the degree of difference found between the IT 400c1 and an IT 400s1 stored within an object record 533 or 733 falls outside the first range of degree of difference, but falls within the second range of degree of difference, then the IT 400c1 may be deemed to be close enough to that stored IT 400s1 to warrant further analysis. Such a determination may result in the generation and transmission of a response to the ITR device 300 via the network 999 conveying a request to the ITR 300 to capture more types of data concerning the object 150 or 100. As depicted in FIG. 4E, this may lead to the ITR device 300 providing more captured data 200 and/or generating another IT 400 with the benefit of such additional captured data (e.g., the depicted IT 400c2). In some of such embodiments, and presuming there is sufficient data received from the ITR device 300 to enable an object type of the object 150 or 100 to be identified, the request for more of such data to be captured may specify particular additional types of data that are to be captured, and such specification of such types may be based on the types of data that were previously captured and stored within the object record 533 or 733 that stores the particular IT 400s1. Upon receipt of the additional captured data 200 and/or the IT 400c2, the comparison of IT values described above may be repeated within each device 500 and/or 700 to which the additional captured data 200 and/or the IT 400c2 is provided.

It should be noted that, although not specifically as in FIG. 4C, where the object is a virtual art 150, such additional types of data may be captured by further accessing the data file or other type of data structure used to implement that virtual art 150.

Referring back to FIGS. 4B-C in addition to FIG. 4D, as previously discussed, there may be one or more types of data that may be deemed desirable and/or necessary to capture, but which may require some form of security credential to do so. Again, by way of example, it may be that the object 150 or 100 includes an AIM 160 that must be provided with a security key or other credential before it will provide data that can be captured by a sensor 310 of the ITR device 300. Again, an example of such an AIM 160 may be a secure RFID tag to which a security key must be transmitted by the magnetic field used to provide power or by an NFC radio signal that is transmitted along with such a magnetic field. In such embodiments, one or more devices 500 and/or 700 may include such information as that security key in an object record 533 or 733 that at least corresponds to the object type of the object 150 or 100. Thus, in such embodiments, it may be that the ITR device 300 initially transmits a subset of the captured data 200 to other devices 500 and/or 700 along with a request for a security credential for a particular type of data that cannot yet be captured without that security credential. In response, one or more of such devices 500 and/or 700 may use that subset of the captured data 200 to identify one or more records 533 and/or 733 that may stored the needed security credential, and may then transmit that security credential to the ITR device 300.

Figure 4F:
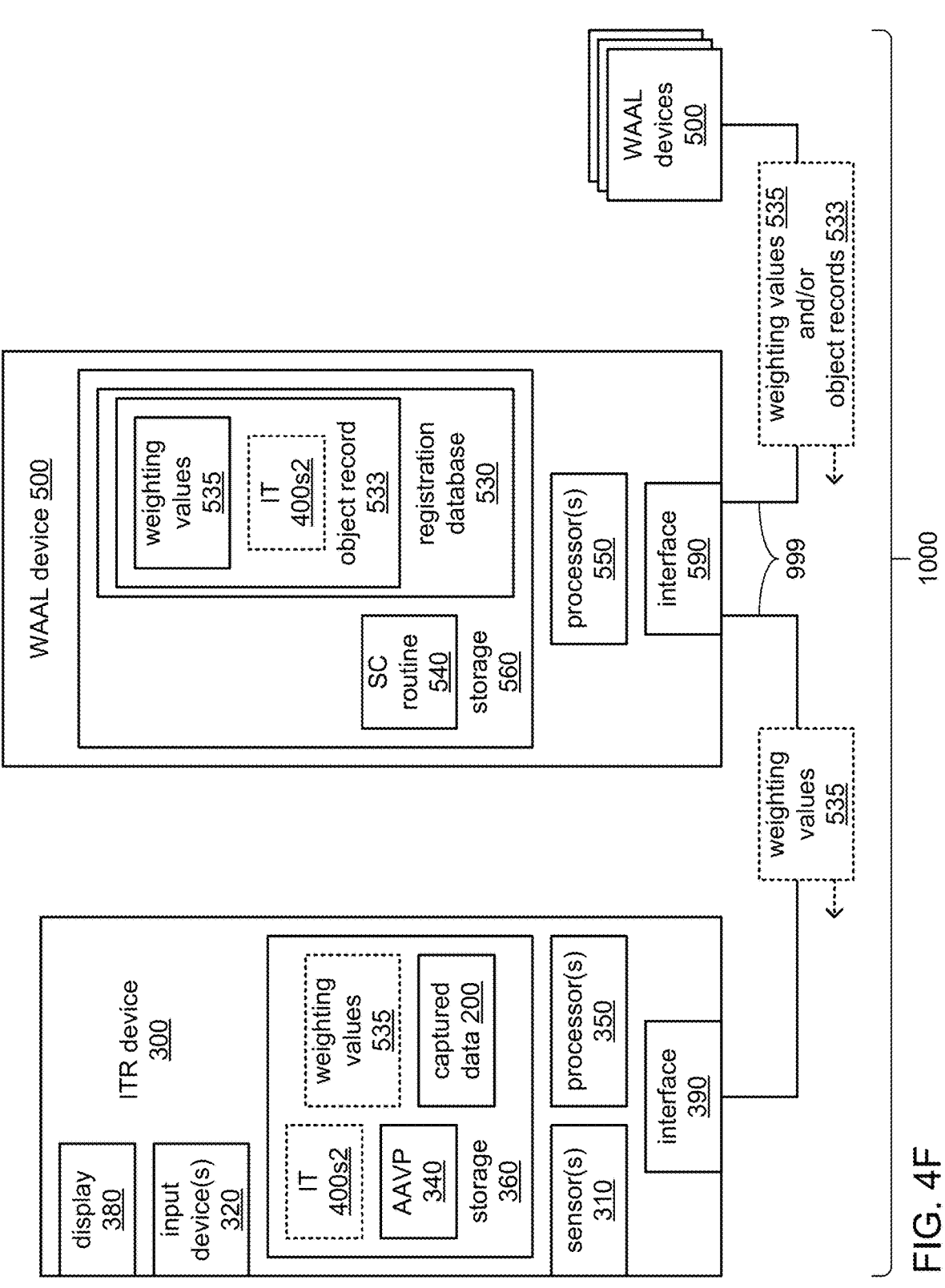

Turning to FIG. 4F, if the object 150 or 100 has been deemed to be authenticated, it may be that such a successful authentication triggers the generation of a new version of the IT 400 that is to be stored in object records 533 and/or 733 for that object (i.e., the depicted IT 400*s*2). More specifically, within at least one WAAL device 500 that was involved in authenticating the object 150 or 100, the processor(s) 550 may be caused, by execution of the SC routine 540, to generate the IT 400*s*2 for the object 150 or 100 to gain the benefit of one or more improvements over the previously stored IT 400*s*1. Again, in generating a new version of the IT 400, an indication of the history of the object 150 or 100 (e.g., chain of custody and/or ownership, a record of another instance of the system 1000 encountering the object 150 or 100, etc.).

As previously discussed, improvements to the manner in which ITs 400 are generated to take into account new information gained over time about changes that have occurred concerning counterfeiting various characteristics and/or distinguishing features of objects. Again, in so doing, any of a variety of types of machine learning may be used.

Among the improvements that may be made may be changes to what types of data are captured for a particular type of object. More specifically, it may be that the new IT 400*s*2 that is to be stored for the object 150 or 100 is to include a different combination of types of captured data that is more resistant to counterfeiting efforts by at least adding a type of captured data that is deemed to be harder to counterfeit than others, and/or by removing a type of captured data that is deemed to be all too easy to counterfeit. As previously discussed, lessons may be learned from instances of counterfeit objects having been mistakenly determined to be authentic. More specifically, it may be that such instances reveal that a particular characteristic or distinguishing feature that had once been considerably difficult to counterfeit has since become significantly easier to counterfeit. Again, in so doing, any of a variety of types of machine learning may be used.

Also among the improvements that may be made may be changes to the weighting values applied to different types of data that are captured for a particular type of object in embodiments in which such weighting values are employed in generating ITs. More specifically, it may be that the new IT 400*s*2 that is to be stored for the object 150 or 100 is to be generated using one or more weighing values that have been changed to better reflect which types of captured data are more resistant to counterfeiting efforts than others. Again, such changes may be prompted by lessons learned from changes to the degree of difficulty with which one or more characteristics and/or distinguishing features of a type of object may be counterfeited, thereby improving the ability of the system 1000 to distinguish between authentic objects 150 or 100, and counterfeits, over time.

As part of determining whether to make such changes to what types of captured data are to be included and/or to what weighting values are to be used for generating the IT 400*s*2 for the object 150 or 100, the processor(s) 550 may be caused to transmit a request to other WAAL devices 500 of the authentication system 1000 to provide suggested weighting values 535. This request may also include at least a portion of the captured data 200 to enable each WAAL device 500 to which the request is directed to further narrow the search within its registration database 530 to particular object type(s). As depicted, in response to such a request, one or more of the WAAL device(s) 500 to which the request was directed may transmit sets of weighting values 535 from object records 533 that correspond to object(s) of the particular object type(s), and/or to the particular individual object(s), that are deemed a close enough match to the object 150 or 100. Alternatively, in response to such a request, copies of those records 533 may be transmitted by such WAAL device(s) 500.

Upon receiving such multiple sets of weighting values 535 from multiple other WAAL devices 500, and as previously discussed, the processor(s) 550 of the WAAL device 500 may be caused to use the received multiple sets of weighting values 535 as guidance to derive a single set of weighting values 535 for use in generating the IT 400*s*2 for the object 150 or 100. In various embodiments, differing factors may play a role in the processor(s) 550 selecting a set of weighting values 535 that are to be so used. For example, such factors may include determining which of the received sets of the weighting values 535 is the one most recently derived by one of the WAALs 500 from which it is received. As has been discussed, it may be that one or more weighting values 535 used in generating an IT 400 are adjusted based on the receipt of an input indicative of an event in which the degree to which a characteristic or distinguishing feature relied upon for a type of object has changed.

Apart from improvements that may be made in response to changing circumstances, among the improvements that may be made may be the addition of new captured data that adds to a history of the object 150 or 100 that is meant to be reflected in the IT 400 that is to be maintained for object 150 or 100 within the authentication system 1000. More specifically, the fact that the object 150 or 100 has again been encountered by the authentication system 1000 and/or the fact of a change is occurring and/or has occurred in status, location, ownership and/or other characteristics of the object 150 or 100 may be reflected in new data that is added to the captured data 200 on which the generation of the new IT 400*s*2 is to be based. Thus, in this example where a seller is offering the object 150 or 100 to a potential buyer, aspects of this attempted and/or completed transaction may be caused to be reflected in the new IT 400*s*2 through the addition of data indicative of those aspects. Alternatively or additionally, aspects of the current status of the object 150 or 100, regardless of whether the transaction occurs, may be caused to be reflected though such an addition of such data.

Either way, and as previously discussed, the new IT 400s2 may be generated to be an updated version that includes such new information.

Again, in various different embodiments, the IT 400s2 for the object 150 or 100 may be generated either by the processor(s) 350 within the ITR device 300, or by the processor(s) 550 within the WAAL device 500. Regardless of which of these two devices 300 or 500 the IT 400s2 for the object 150 or 100 is generated within, a copy of the IT 400s2 may then be transmitted to the other of these two devices via the network 999.

Figure 4G:
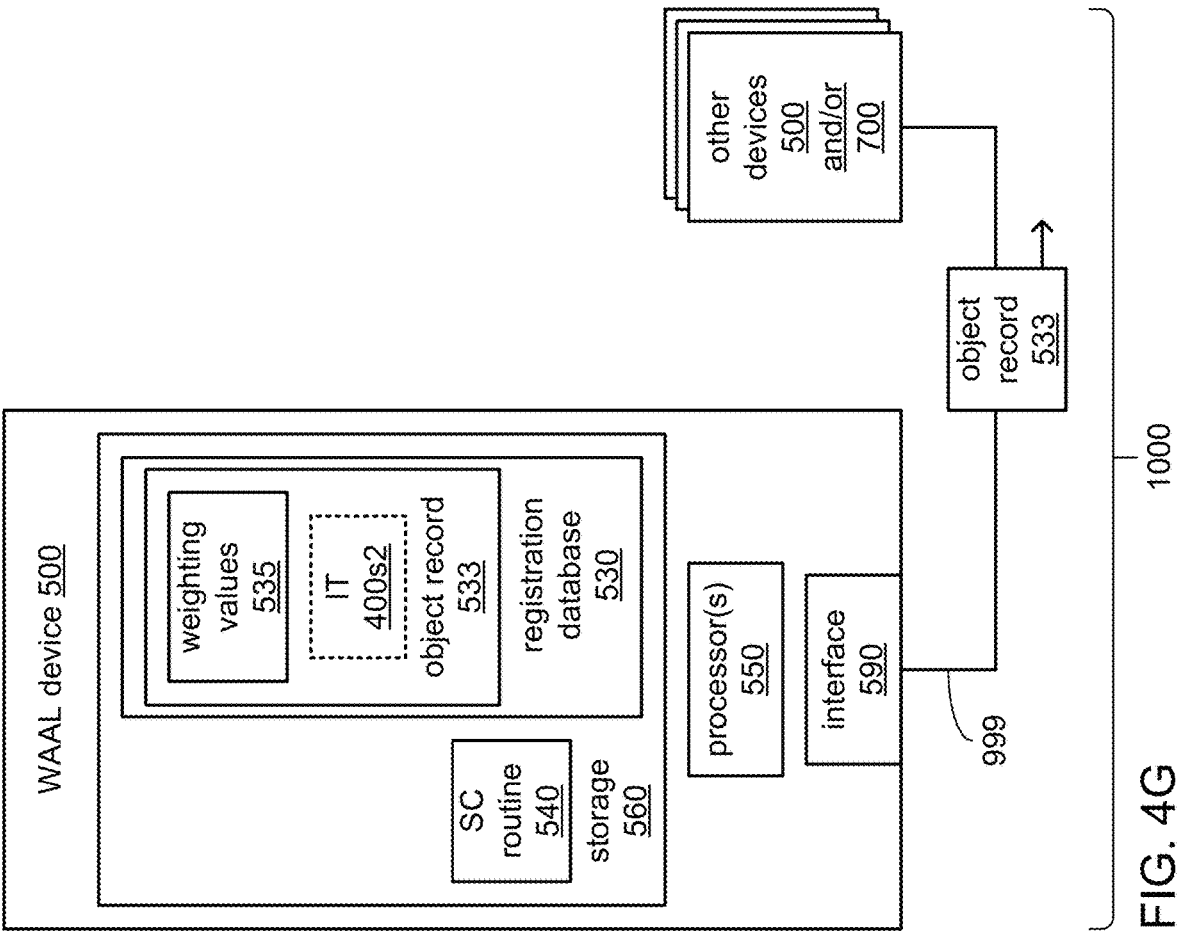

Turning to FIG. 4G, as previously discussed, the WAAL devices 500 of the authentication system 1000 may exchange data about registered objects on a recurring basis. Again, this may be done as part of maintaining coherency in the distributed storage of such data among those WAAL devices 500. However, as also previously discussed, this may be done as a measure against corruption of such data caused either by malfunctions of hardware and/or software, or by malicious acts. As will be readily recognized by those skilled in the art, such malicious acts may be motivated by seeking to aid in the counterfeiting of an object, seeking to add data for a counterfeit object to cause the authentication system 1000 to provide incorrect determinations that the counterfeit object is authentic, etc.

Figure 4H:
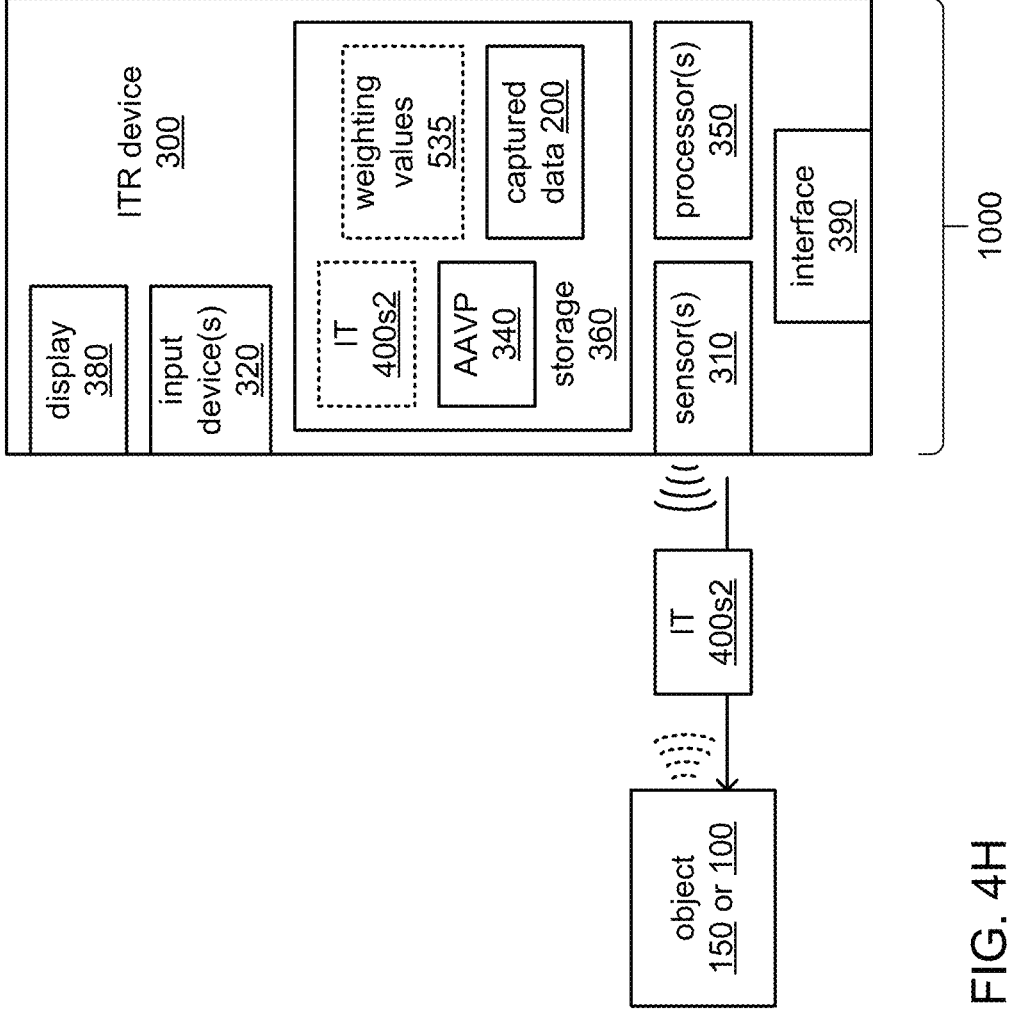
Figure 4I:
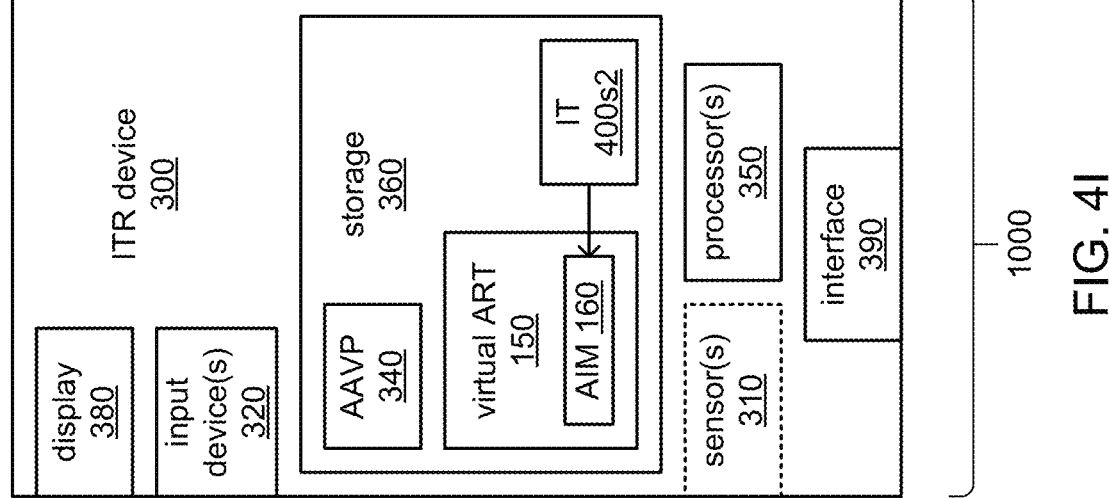

Turning to FIGS. 4H and 4I, as previously discussed, in some embodiments, it may be that an AIM 160 of the object 150 or 100 is or includes a copy of the IT 400 for that object 150 or 100.

Where the object 150 or 100 is a physical object, as depicted in FIG. 4H, and again by way of example, it may be that such an AIM 160 is implemented as an RFID tag that is capable of enabling at least a portion of its stored contents to be augmented and/or rewritten with new data. Again, such an RFID tag may also store an inalterable identifier of the RFID tag, itself, and may transmit both that inalterable identifier and the rewritable data when powered with electromagnetic energy from an appropriate type of sensor 310. Thus, as depicted, and following the generation of the IT 400s2 (whether within the ITR device 300 or within the WAAL device 500), processor(s) 350 of the ITR device 300 may operate such a sensor 310 to again emit a magnetic field to power such an RFID tag serving as an AIM 160, and to accompany that magnetic field with a transmission of the IT 400s2 (either in the magnetic field, or in an accompanying radio signal). In such an embodiment, the IT 400s2 may then become a distinguishing feature of the object 150 or 100. Again, in this way, it may be that over time, on each occasion on which the object 150 or 100 is authenticated, a new IT 400 may be generated and transmitted to the object 150 or 100 to either replace the preceding IT 400 stored therein, or to be added to a growing chain of ITs 400 stored therein.

However, where the object is a virtual ART 150, as depicted in FIG. 4I, it may be that at least a portion of the AIM 160 thereof is accessed within the data file or other data structure used to implement the virtual ART 150 to write the IT 400s2 as the AIM 160 or into the AIM 160.

APPENDIX A—REPRODUCTION OF U.S. PROVISIONAL PATENT APPLICATION NO. 61/496,772

FIGS. 5A, 5B, 5C, 5D, 5E, 5F, 5G, 5H, 5I, 5J, 5K, 5L, 5M, 5N, 5O, 5P, 5Q, 5R, 5S and 5T, along with the text below, are reproduced from U.S. Provisional Patent Application No. 61/496,772. In this present application, these reproduced figures from the aforementioned provisional application have been modified only to better comply with formal drawing requirements for non-provisional applications, and to add reference numerals that align with those presented in the earlier figures of this present application. Also, in this present application, the text reproduced from the aforementioned provisional application has been modified only to add references to specific ones of the figures from that provisional application, and to add reference numerals that align with those presented in the earlier figures of this present application.

Concept

Real may be defined in many ways. The disclosed systems and methods enable the validation of the authenticity of an object.

Figure 5A:
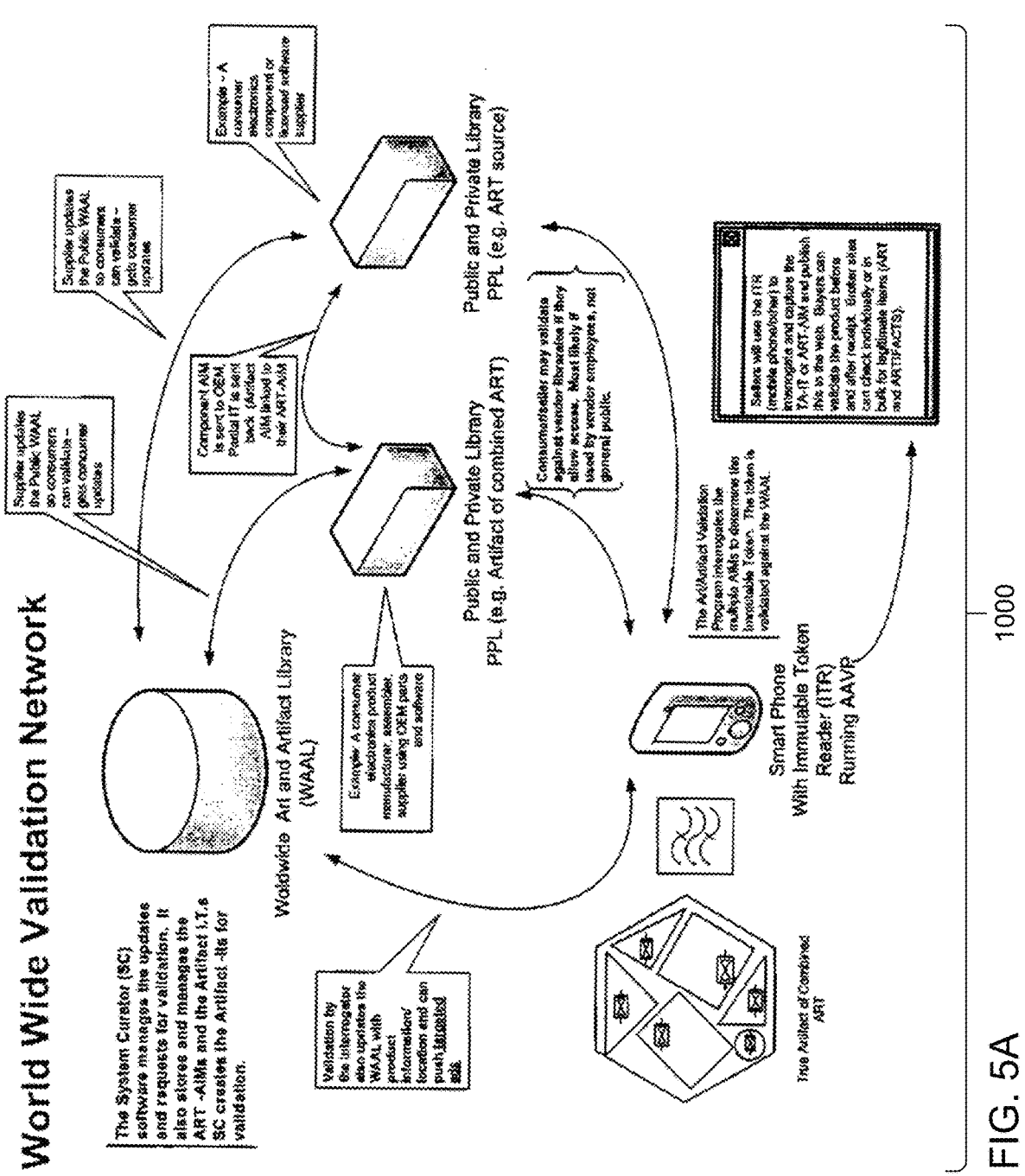

FIG. 5A shows the high level picture of the system and transmission of data through the system.

Conventions Defined

Figure 5D:
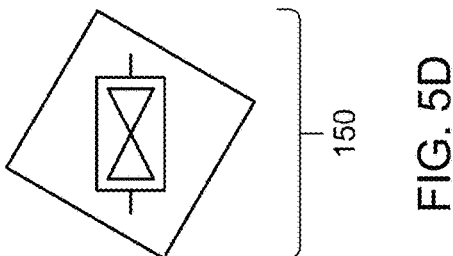
Figure 5C:
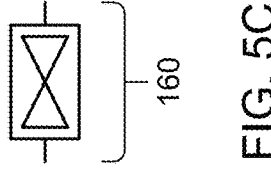
Figure 5F:
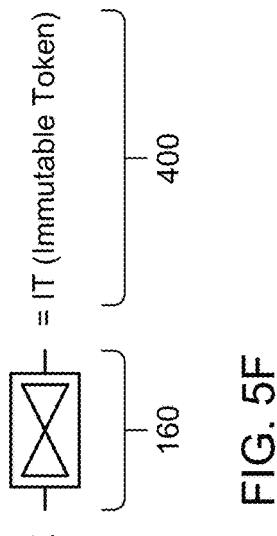
Figure 5B:
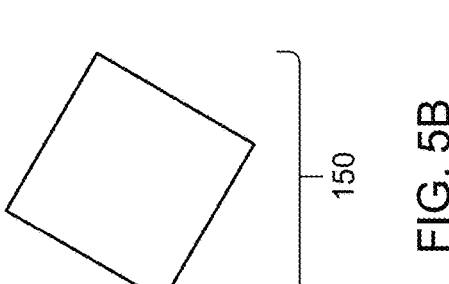

1. Referring to FIG. 5B, Authentic Real Thing (ART) 150: ART as used herein means a thing, be it a physical item consumed or used alone or with another part. A written or electronic creation of words or software or like virtual thing. ART may be acquired, created and offered as the genuine article for which a person or persons seeks to use, give, buy or sell to satisfy a need.

2. Referring to FIGS. 5C and 5D, Added Indelible Marker (AIM) 160: as disclosed herein means an added indelible key or marker may be added to the ART. This unchanging, unique, serialized identifier is unchanging through the life of an ART. AIM is recognizable and precisely identifiable by us with the aid of technology (Radio Frequency Identification or RFID, Near Field Communications, Audible sensor, Optical Sensor). Examples of AIMs include, but are not limited to, AIMS can include RFID transponder IDs, net card MAC addresses, secure RFID tags (optionally to only respond with the appropriate keyed signal message), batch numbers, serial numbers, broad spectrum markers, radio sensitive materials (plastics, inks, dyes, surface agents), light sensitive markers.

Figure 5E:
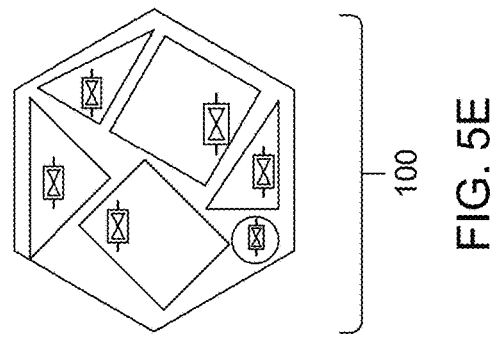
Figure 51:
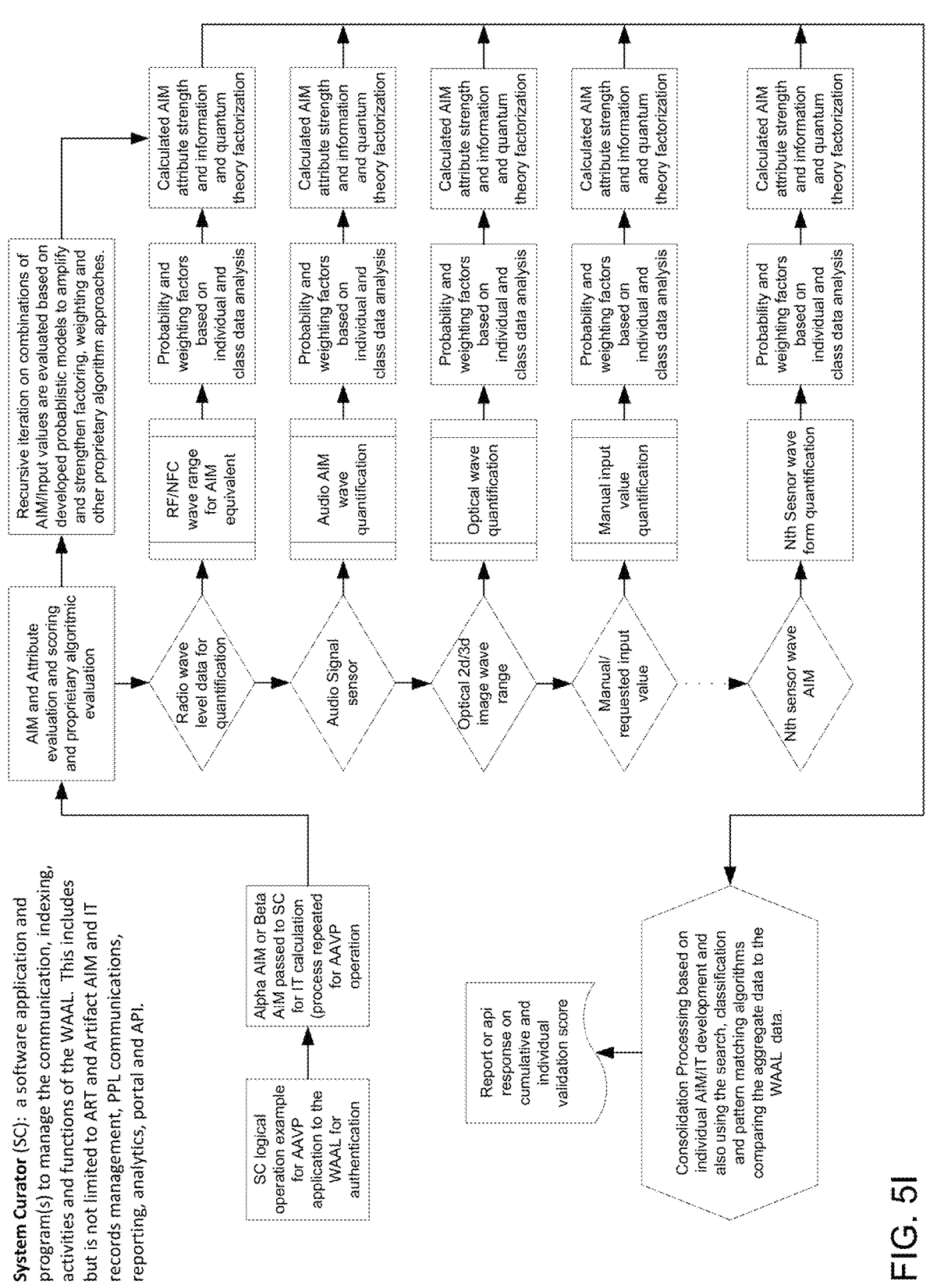

3. Referring to FIG. 5E, True Artifact (TA) 100: an object or solution of combined ART, possessing multiple AIMs.

4. Referring to FIG. 5F, Immutable Token (IT) 400: The combined, discernable, encoded, decoded, traceable and permanent key to a True Artifact. In a singular or homogenous piece of ART, the AIM may be the IT. The sum or combination of the AIMs, along with other characteristics of the ART, form the Immutable Token, a compound key, "fingerprint" or "DNA" of the TA.

5. Referring to FIG. 5G, Immutable Token Reader (ITR) 300: means a device of radio, magnetic, optical or combination of wave sensitive devices able to read, see, interrogate and interpret one or more AIMs and calculate, derive, or determine an IT. In some embodiments, an IT may be software embedded encrypted key, an RFID tag physically embedded in an object or a permanent barcode or physical marker that an ITR can read. In the case of a software key, it may be assigned to or combined with the ART, and may require specific decoding to see individually. AIMs and keys may be combined and provided to the "Libraries" for comparison in validating the IT. The derived IT may include one or more AIMs, physical, optical, audio, or programmatic/software keys. An RFID reader and/or Near Field Communication ("NFC") device, along with the optical camera, in a Smartphone are used to determine the AIMs and compute an IT. All or 100% of the possible AIMs are not required to form an IT, and special programming will allow this to perform the validation with a calculated probability of certainty. In some embodiments, a device reads or determines the unique, serialized, signature or ART or Artifacts, and the added AIMs may be omitted.

6. Referring to FIG. 5H, Worldwide ART & Artifact Library (WAAL) 500: means an electronic system and network based library to store, disseminate, index and manage the ART and Artifact AIMs and ITs. The WAAL supports the history, information, lineage, and other details about an ART and Artifacts for validation and tracking. The WAAL may be accessible via a network, such as the Internet. In some embodiments, a WAAL is cloud computer based to provide broad access and scalability. Today, the GS1 and EPC Global organizations set forth a standard on which the WAAL may be based or with which the WAAL may be compatible, e.g., the EPCIS 1.01 specification from EPCglobal/GS1.

7. Public & Private Library (PPL) 700 (see FIG. 5J) means a library for ART or Artifacts. The PPL may be operated by a public or private entity. The PPL manages information about ART or Artifacts they offer or produce. PPL is configured to communicate with the WAAL for sharing ART and Artifact AIMs and information. (An Object-Event Repository is equivalent to a PPL).

8. Referring to FIG. 5I, System Curator (SC) 540: means a software application and program(s) configured to manage the communication, indexing, activities and functions of the WAAL. This includes, but is not limited to, ART and Artifact AIM and IT records management, PPL communications, reporting, analytics, portal and API.

9. ART & Artifact Validation Program (AAVP) 340 (see FIG. 5G): means a software application for mobile computing devices including, but not limited to, Smartphones, Smartpads, tablet personal computers or net book, which will interrogate the AIMs, computers, communicate with the WAAL and SC to validate the authenticity of the ART or Artifact. The AAVP may also display other information about the objects in question, including, history, status or location. The AAVP will include or integrate with a Radio-Audio-Optical-electronic (Raotronic) fingerprinting software or solution in the mobile device. The AAVP will be able to communicate with both the WAAL and PPLs to provide the ability for public, private or restricted users to validate the authenticity of ART or Artifacts.

10. Radio Audio Optical Electronic (Raotronic) 310 (see FIG. 5K): as used herein means a software solution that utilizes one or more wave sensitive devices provided in the mobile device (e.g. Smartphone, Smartpad) and enables the ITR for the purpose of computing or deriving the IT (fingerprint or DNA) of the ART or Artifact in question. A Smartphone equipped with an RFID Reader, NFC device, digital camera and audio microphone interrogates the ART or Artifact and enables the calculation or derivation of an IT. The AIMs and characteristics observable are only limited by the frequency and wavelengths of the devices hardware. The AIMS and characteristics may be external or internal to the ART or Artifact. A combination of the AIMs will establish a "Fingerprint" or "DNA" of the object. This may include color, shape, optical, optical, tone response, radio response, RFID tags and other AIMs or keys. The Raotronic fingerprinting enables the AAVP to identify the object and execute its validation in connection with data from the WAAL. Previously downloaded data stored in the mobile device from the WAAL may be used to validate anticipated ART or Artifacts. The AAVP and Raotronic solutions employ advanced analytical techniques to develop a probabilistic match and degree of certainty of the authenticity of the ART or Artifact. The algorithms may employ any number of advanced mathematical techniques to accurately and rapidly, with great precision, validate the authenticity of an object. A probably degree of certainty, with the ability to consider specific weights of AIMs and other characteristics. Abstractly, the sum or combination of the wave signatures of all the components of the ART or Artifact make it unique and create its physical and digitally represented fingerprint or DNA.

The technological approaches available to create the AAVP and Raotronic solution include but are not limited to advanced mathematical modeling algorithms, pattern recognition software, artificial intelligence, search and classification, fuzzy logic, information theory, edge detection algorithms, spectrum analysis methods, digital spectroscopy and others.

11. Referring again to FIG. 5A, World Wide Validation Network (WWVN) 1000: as used herein means the collection of systems and devices including but not limited to the WAAL, PPLs, mobile devices, suppliers, consumers, ART and Artifacts that participate in the network for the purpose of validation of objects and related activities.

The Worldwide Art & Artifact Library (WAAL) 500

Referring again to FIG. 5H, the WAAL 500 is the central instance of a repository solution for the purposes of storing, managing, pushing, and pulling the data and information necessary to support the WWVN. The WAAL is built on a scalable solution such as a cloud computing environment to provide sufficient storage and processor power. In some embodiments, the WAAL may be a single physical or otherwise powerful computing platform such as by using one or more servers or other computing devices. In some embodiments, the WAAL may include multiple physical computing platforms. The data may be viewed homogenously as on the WAAL, but may in fact be distributed or span multiple WAAL servers.

The WAAL may use a relational databases management system, and may also employ higher level, n-dimensional database approaches. The WAAL employs an advanced database management systems (DBMS)).

Notes

WAAL driven by increasing data gathered and algorithms to constantly improve the probability calculations of authentication.

Assume minimal lag in bandwidth communications, so validation may return a request to activate another sensor test, add some information manually, activate the object in question to observe certain characteristics (sounds, action) or perform special tests (may be supplied by the manufacturer).

Targeted add engine

Token management

Validation of item to mfg, and then optional near matches in decreasing order. Provides shopper feedback, reviews directly or indirectly.

May add an internet price comparison link.

Website displaying a validated tag—click on it to go to WAAL—validates the product, vendor standards, when. When, by who, where.

The WAAL/SC registration solution will not require the user to give personal identification (no email/SSN, other). Our technology will request their "profile", whereby the unique profile values they provide will constitute a soft collection of AIMs and allow us to develop an IT for registrants. The user will register through the mobile device and AAVP program, or may access the WAAL internet portal through a personal computer web browser. The registration program will request basic information about the user and their personal preferences. The WAAL registration program will quantify and assign numeric values and other factors to their personal responses, and created a unique key based on the sum combination of those responses, equivalent to the formulation of an Immutable Token value. The user will be assigned the IT and it will be provided for use in accessing the system and for reporting and analysis in the reporting engine like demographic values. This IT will be used to have "authenticated" users, and allow this in combination with the product IT to build targeted market reporting without needing personal identification. This will insure the privacy of the users and registrants. The quantification of the profile parameters will be leveraged for the identification and targeting. Personal demographics and details will integrate with this.

API

The WAAL will support an API for access and bulk processing of massive number of records and requests. The federated model will allow the WAAL to distribute information across multiple WAALs as needed.

Structures for user IT development in place of requiring user connected personal information parameters. In some embodiments, the engine is configured to develop a user profile scored on the same probabilistic approaches of the IT and AIMs. Quantification of profile attributes, scoring and information theory based scoring will created a representative unique profile key for each user.

The WAAL will implement a class of structures to allow field/name and field/value pair dynamic extension to rapidly extend validation and new parameters of the ART and Artifact attributes needed for validation and other scenarios.

Special structures of the database will be implemented to support quantum parametric relationships and quantum computing algorithms using proprietary algorithms that operate on quantified information extracted from ART and Artifacts.

WAAL stores registrant profile information (no personal unique identifiers) to develop user IT patterns for correlation and marketing/ad functions Integration interface through dynamic SOA and open standards protocols. Access to the WAAL will be controlled by the SC security executive.

The System Curator (S.C.) 540

Referring to FIG. 5I, advanced analytics based on combinations of techniques including but not limited to information quantification based approaches, pattern matching, artificial intelligence, optical recognition, key marking, fuzzy logic and quantum physics, chaos theory and entropic intelligence networks. The IT is a calculated pattern to match with probability against the WAAL database.

The SC is configured to use the data collected including from the captured or interrogated by NFC capability of the smart device to return to the AAVP with a secure tag unlock code, and submit that to prompt secure RFID tags to respond. In some embodiments, ultra-Secure RFID tags do not respond to readers (i.e., do not broadcast) unless the proper code/signal is sent to them. If the proper code/signal is received, then the tag will broadcast back the identification (and optionally Transponder ID) to be used for validation.

The combination knowledge of the RFID tag, transponder ID, indelible serial number of the products, unique combination of the specific product and any doping agents in the product will provide a unique identifier that may be stored in the WAAL. A PPL of the manufacturer may keep some of these AIMs secure and only available on demand to the SC/WAAL when validation is needed.

The SC is configured to control access to the WAAL through a variety of technologies. In some embodiments, the AAVP application is configured to interact with the SC to use the WAAL data. In some embodiments, API with access control and data utilization capabilities is configured to exploit the WAAL data with the SC features and more. This API enables operations such as bulk validation, integrated systems uses and third party application uses.

The SC utilizes analytical techniques to dynamically quantify information gathered by the AAVP and interactively with the AAVP develop the IT of the ART or Artifact. The SC will be configured to use analytical techniques and algorithms to score and weight the various individual attributes of the IT (combination of AIMs and other calculated and quantified information about the ART or Artifact. The SC software may iteratively and recursively optimizes the IT with higher order combinations of AIMs and attributes by computing probabilities of likely combinations of attributes or AIMs. This scoring model may be adjusted based on the system and validation levels required in a particular request. The SC is configured to develop its own weighting based on the ever increasing history failures and successes of the system. The SC is configured to continually "learn" to validate, track, extrapolate and interpolate. External user success and failure reporting or data may be fed into the SC through the API or designated interface to teach or improve the classification and matching/scoring/validation and more power of the SC.

The AAVP is configured to pass images and image data to the SC. The SC uses image recognition software that uses specifically developed algorithms to evaluate the image attributes and developed a quantified serialization value of the image. This enables images, both 2D and 3D, to be quantified to generate an equivalent AIM value. This feature also enables images captured by sensor to convert an intrinsically analog attribute into a digitally operable attribute.

In some embodiments, a sensor is configured to sense and discriminate atomic or sub atomic attributes, including but not limited to spin, entanglement and other quantum level values such that physical imperfection or contamination, accidental or intentional will uniquely identify stuff.

The SC is configured to evaluate probable and improbable occurrences and upon validation or other actions to the SC/WAAL, learn and react and perform or report questionable or improbable combination using GPS, geospatial, GIS and relative time data. Historical evaluation of the SC and WAAL and regression against such stored data provides powerful predictive information that may be integrated into logic networks to perform and alert for things such as fraud prevention, disaster prediction, harmful or illegal outcomes or events. Based on the historical progression of learned attributes, and the outcomes of validation success or failure, the system is able to evaluate the successive pattern of validation and other queries to "predict" evolution of ART and Artifact movement or history that, based on probabilistic values, lead to a negative or positive future. The application of BI and reporting activities, and information through the SC and the WAAL may support identification of critical events or alert on the proliferation of events that may lead to an undesirable or illegal situation occurring such as identifying a significant theft of goods, contamination of supply chain or market disruption. In such instances, the information may also be employed to evaluate economic and market trends and predictions. Also, the learning and value of attributes may be used to help ART and Artifact manufacturers to better strengthen the control, integrity and serialization of their products and components. The SC and WAAL is configured to "teach" what the best ways to secure ART and Artifacts are for the purposes of location, validation and integrity of the object being authenticated/verified.

The Art & Artifact Validation Program (AAVP) 340

AAVP Definition

The Art & Artifact Validation Program (AAVP) is a software application for mobile computing devices including but not limited to Smartphones, Smartpads, tablet personal computers or net book, which will interrogated the AIMs, compute ITs, It's, and communicate with the WAAL and SC to validate the authenticity of the ART or Artifact. The AAVP may also display other information about the objects in question, including history, status or location. The AAVP may include or integrate with the Raotronic (Radio Audio Optical electronic) fingerprinting software or solution in the mobile device. The AAVP will be able to communicate with both the WAAL and PPLs to provide the ability for public, private or restricted users to validate the authenticity of ART or Artifacts.

The AAVP can be installed on a mobile computing device and be executed by a user looking to authenticate the ART or Artifacts. The mobile computing device is configured to provide a user interface for prompting the user through the workflow steps of authentication.

The AAVP can be installed on a machine-to-machine computing device such as, for example, NFC enabled smart cards, payment cards (credit, debit or rebate), a key fob security token or automated retail checkout station, to name a few possibilities, which are configured to interrogate the AIMs, construct the Immutable Token (IT), communicate with the WAAL and SC to validate the authenticity of the ART or Artifact.

The AAVP provides an application programming interface (AP!) including a particular set of rules and specifications enabling a software program to access and make use of the services and resources provided by another particular software program that implements the API. The API serves as an interface between different software programs and facilitates their interaction.

The AAVP is configured to integrate with a third-party software application to provide the ART-AIMs to the AAVP. The AAVP can accept both a single and high volume API calls from the third party software application, validate the authenticity of the ART or Artifact and return the authenticity status. The AAVP provides a verification standard to which product presented for retail sale can be certified. Retail sale includes but is not limited to, brick and mortar retailers, internet retailers, auction internet sites, and online marketing sites that bring buyers and sellers together. Certification may be enabled via communicate with both the WAAL and PPLs to provide the ability for public, private or restricted users to validate the authenticity of ART or Artifacts.

The Radio Audio and Optical Electronic (Raotronic) Fingerprinting

The combination of observable and communicated information, whereby characteristics and attributes are classified, weighted and continually adjusted by probability and statistics as the system utilization increases. The database and analytical engine enables the development, comparison and application of ever improving calculation of the Immutable Tokens, and continually strengthen the Raotronic fingerprint.

Method, algorithms and operations to develop and calculate the Raotronic fingerprint As portable Raotronic sensors increase in power and resolution, so does fingerprinting capability Probability weighted calculations Validation parameters include IT and AIM weighting of both qualitative and quantitative values, factoring based on:

Number of AIMs

Types of AIMs

Frequency of AIM accuracy and precision

Number of records

Weighting factors by manufacturer

Number of validation attempts on one or more items

Comparison and factoring of scoring models

Time to validate

Number and history of item movement, location data.

Embodiment

Figure 5J:
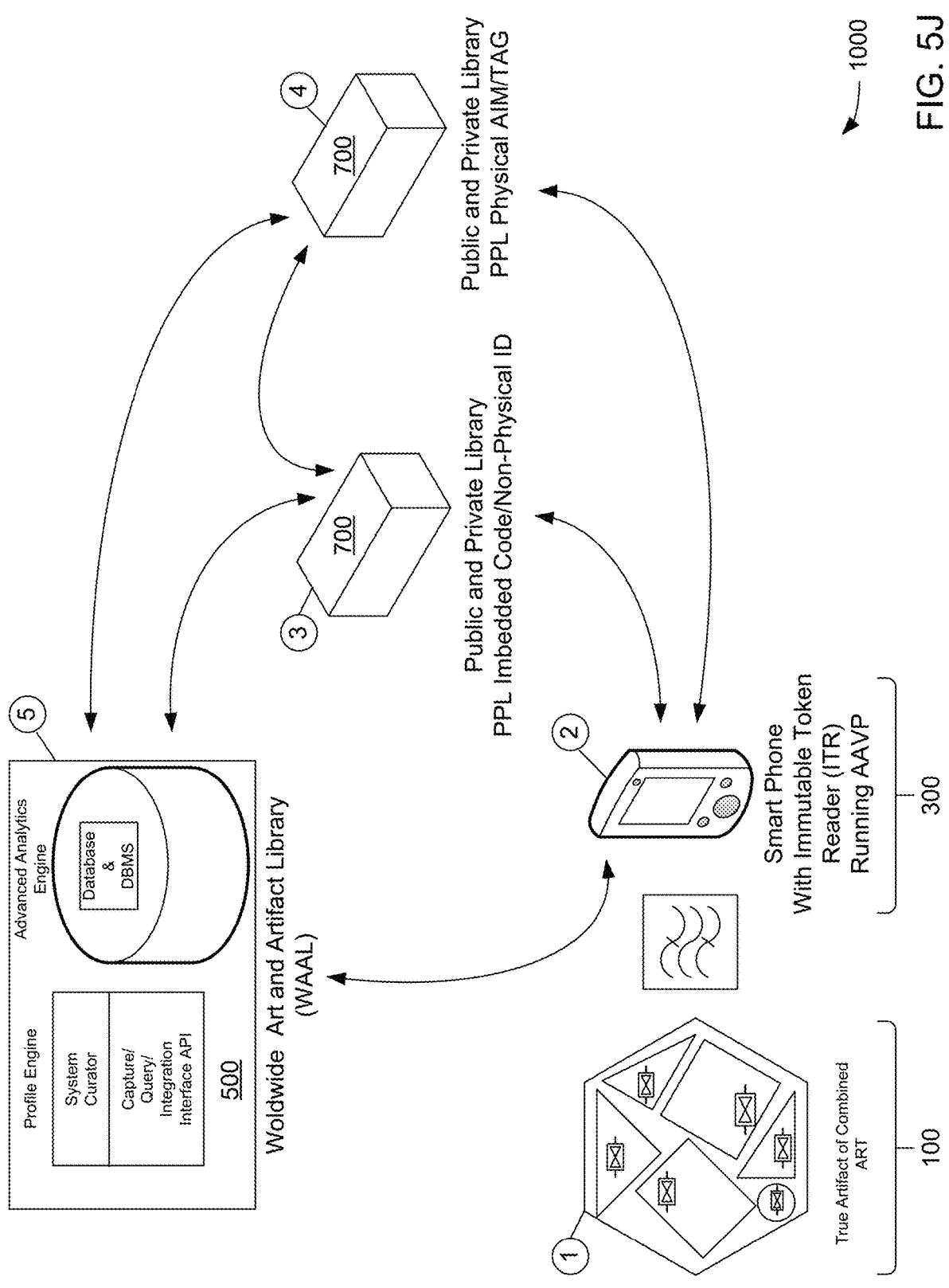
Figure 5N:
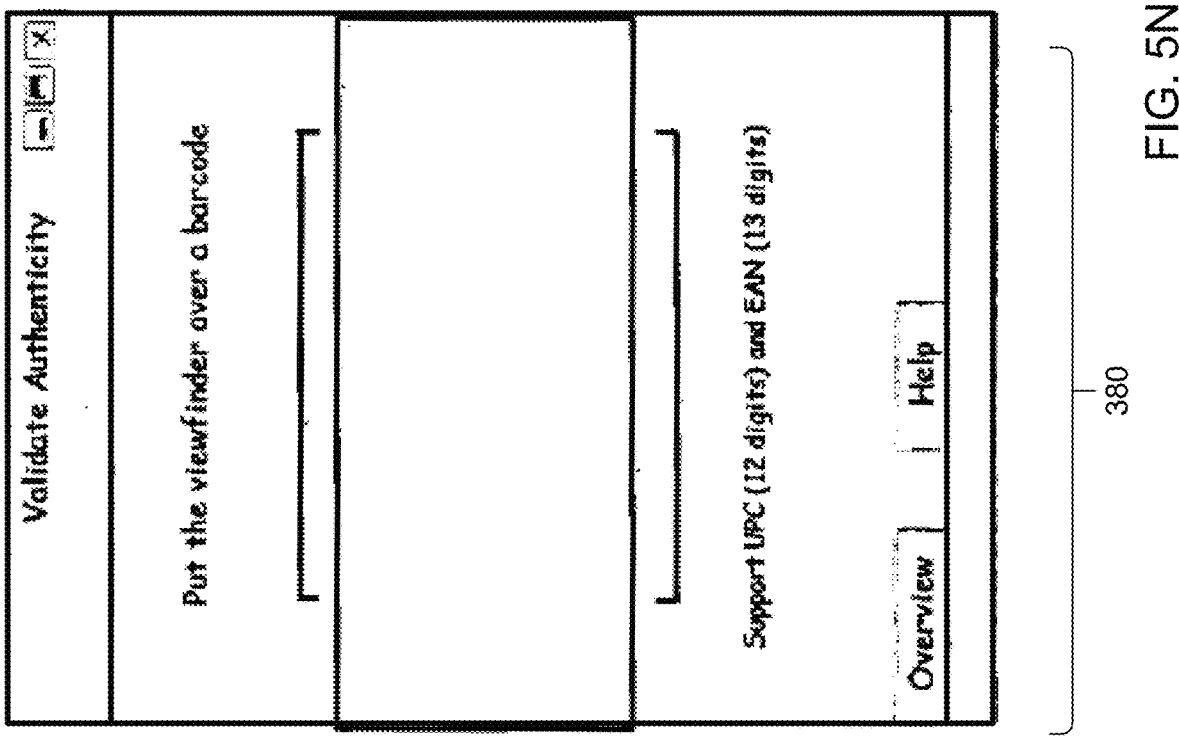
Figure 5M:
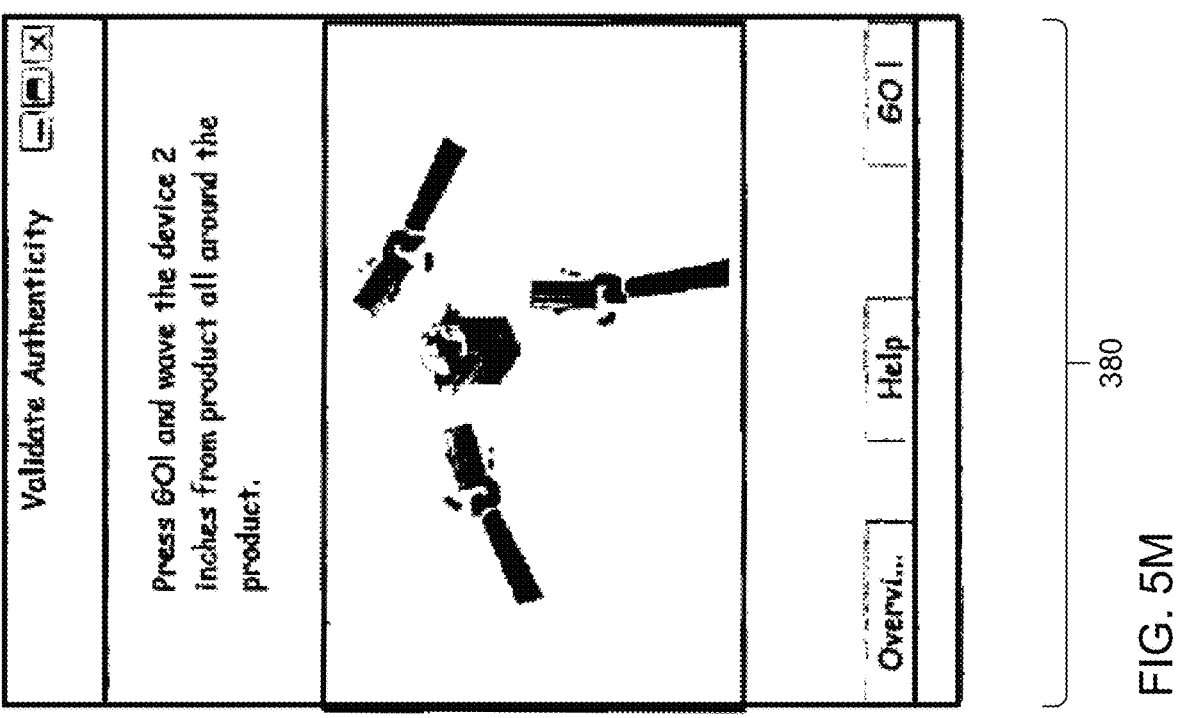
Figure 50:
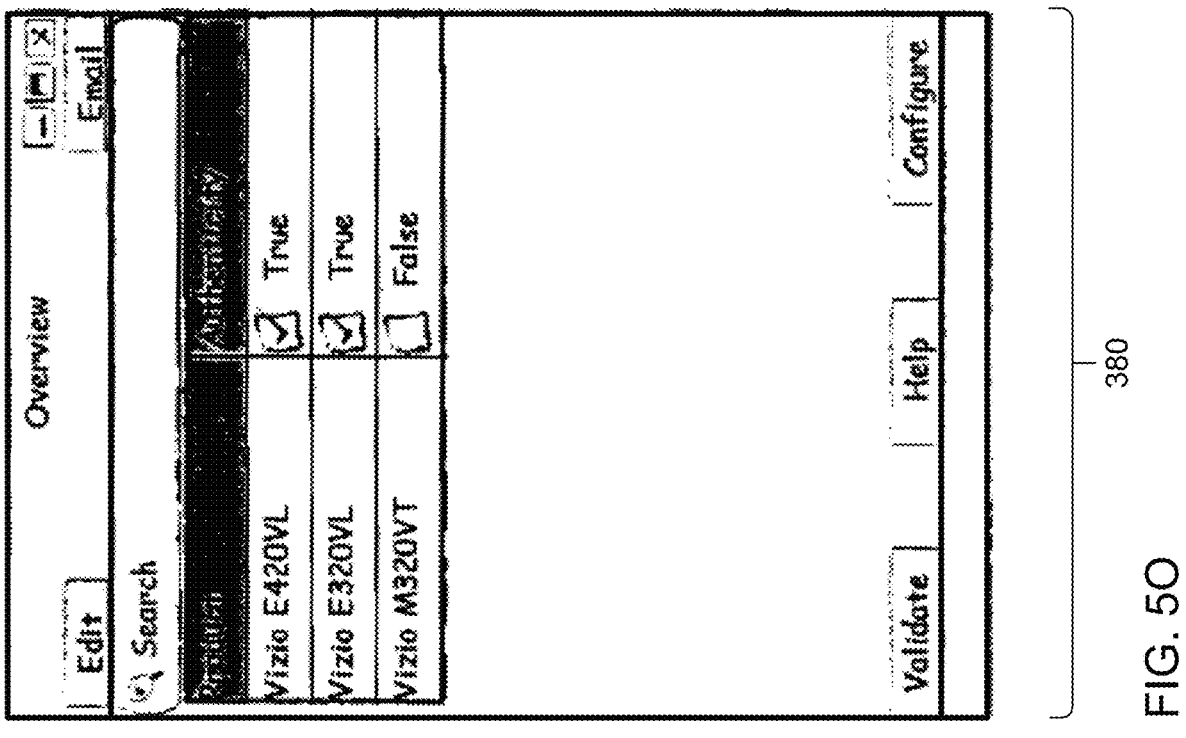

Referring to FIGS. 5J and 5K, the complete system and components can be realized with a combination of current technologies and some enhancements or extension of these technologies in form or function. A systematic and component breakdown and how one skilled in the art may create the WWVN and the supporting components are offered.

1. A True Artifact 100 is a heterogeneous object that is made up of two (2) or more homogeneous object or ART. Each ART is considered the lowest separable component because it is identified by its own uniqueness. An ART is defined and identified by its classic features, individual characteristics, and one or more AIMs. The types of features and markers that allow an ART to be identified include things such as:

a. Color b. Shape c. Size and weight (dimensions)

d. Function e. AIM

I. An RFID tag (HF or UHF or NFC)

II. Etched or embossed serial number

III. Permanent barcode

IV. Doping agent (chemical)

V. Ink (invisible, requires different light/wavelength to expose)

VI. Software key or certificate of authenticity code f. ART or True Artifacts may contain passive, semi-passive or active RFID tags. They may also contain other magnetic or electronic wave sensitive or emitting tags of various wavelengths outside the radio range. These tags may be interrogated or transmit their unique identifying information, including manufacturer tag ID (TID) and/or user encoded data.

g. If the piece of ART or Artifact is a volatile or non-volatile piece of software or firmware, it may contain secured serialized values. These values may be interrogated programmatically and contribute as a unique identifier.

h. An AIM may be activated or interrogated and perform other functions to help control or identify the object.

The greater the number and strength of the AIMs, and depending on the closeness of the match to the WAAL database 530, the higher the probability is that the object is Authentic. Tamper proof RFID (electric or magnetic field sensitive) tags may be designed to resist tamper by having trip mechanisms, sewn or semi-permanent attached antennas that removal or disturbance of the tag may cause to fail the tag are possible. An example of a trip mechanism is a physical or electronic switch held in place by the attaching, positioning or placement of the AIM. It may also be linked chemically or electronically to the ART. If the AIM is equipped or designed with a trip mechanism, then when you remove it or separate it sufficiently from the ART by distance or physical blocking, the AIM will be changed or switch its state, such that it cannot be reversed. A typical trip mechanism is a relay or switch that is a closed circuit when the AIM is fastened to an object. If you remove the AIM or tag, the relay is released and the signal changes a setting in the ID to a tampered state. This is an irreversible setting and once tripped, you can identify that the tag has been tampered with. Another trip mechanism typical of RFID tags is to have an antenna wire or conductor that once attached to the object, can only be removed by breaking or destroying the antenna, thus indicating that the AIM has been tampered with an may indicate a suspect piece of ART. The AIM may either cease to function, or otherwise change to indicate to the interrogator that it has been tampered with. This AIM connections can be chemical adhesive to the ART, or an electronic contact switch that triggers a change to the aim when moved equivalent to a mechanical relay, an electronic, voltaic or photovoltaic bridge that once broken, cannot be reversed or even a chemically stable bond when attached, and the AIM changes due to an irreversible chemical reaction when removed from the ART.

2. A smart device (phone or pad like device) 300 consisting of various components, executing the AAVP software 340 and communicating over a broadband or wireless network to execute validation and authentication of ART and True Artifacts is envisioned in object 2. The device consists of the following components in the diagram, allowing user interaction and performing certain functions to execute the AAVP program effectively.

A video display 1A (380) is configured to support touch input or multiple touches input to select and activate the AAVP program. The program is configured to display one or more images on the screen, the subject of the camera and sensors (310), may ask for user input either by touch screen keyboard input, scanning input from one of the devices (bar-code reading by camera or scanner) and show progress, results and other pertinent information of the AAVP software.

The AAVP program is executed by selecting its icon or name the screen or other menu choice. Once the program launches, an initial screen is displayed and offer the user initial selections which may include beginning a validation or change settings or exit. The program is configured to scan for or use all available scanning or wave detecting devices (e.g. components 9A-15A, B/1B), or a user may be able to selectively use the scanners, reader, camera or audio wave sensing device or sensor (310) on the device.

One or more physical keys or buttons 2A (520) on the device A100 (casing 301 of smart device 300) to control standard or advanced functions such as power on or off to the device A100, locked mode to disable touch screen input, select sub menus, move screen cursor or object, or many other functions providing input or selection to the AAVP.

A processor (350) or other computational circuit, chip, device or combination thereof 3A is configured to perform various computer program operations. The processor 3A is configured to execute the AAVP in response to a user pressing one or more keys 2A. In some embodiments, multiple processors or multiple core architectures of computing processors 3A may be implemented.

Device A100 includes computer memory 4A (a portion of storage 360) for performing rapid application execution storage. In some embodiments, computer memory may be a Random Access (RAM) for program use. The computer memory 4A is used by the AAVP to perform functions and store information, so that operation will be expedited.

Device A100 may also include a more persistent Storage 5A (another portion of storage 360) in the form of a computer type disk or solid state memory (non-volatile) to store programs. THE AAVP will be retrieved from storage, loaded into RAM and executed by the processor. Examples of such storage 5A includes, but is not limited to, read only memories ("ROMs") and Flash memories, to name a few possibilities.

6A—The Power supply 6A may be implemented as a rechargeable battery such as, for example, a Lithium based or other battery. In some embodiments, power supply 6A may be removable. One or more batteries may be available in the device A100 to assist in powering the sensors or wave detecting devices (310).

Device A100 includes a wireless communication interface 7A (390) that enables device A100 to connect to a mobile carrier for access to the Internet or other computer network (999) which provides access to the WAAL (500) or equivalent PPLs (700). Public or private CDMA, GSM or other mobile networks may be accessed by the device through communication interface A100. Wireless communication interface 7A enables the AAVP to access the WAAL for validation and exchange of the IT information. In some embodiments, the connection between the AAVP and the WAAL is a two way communication link that allows profile validation for access to the WAAL, the exchange of information, reports, advertising and other state or stateless data communication.

Device A100 may also include a wireless network adapter 7A (390) that enables device 7A to connect to a wireless data network for access to the WAAL and other systems or devices on the Wireless network such that the AAVP may access the WAAL or PPL systems. The WIFI adapter 7A may be placed into a promiscuous mode to allow interrogation of ART AIM that responds to such a device. One example of this is that the WIFI adapter may be used to read the media access control ("MAC") or burned in/permanent address of a network card present in another device (Computer for example). As will be understood by one skilled in the art, a MAC address of a network card is a unique, non-duplicated code set by the manufacturer, equivalent in discussion to the fact that all transponding devices produced in accordance to internal agreement of manufacturers are unique. Tag identification ("TID") of an RFID tag, as discussed below, is another example of an AIM for use in the authentication, if the information is gathered and presented for use in the WAAL at the beginning of distribution.

Device A100 may also include a short range wireless adapter 8A (390), such as a Bluetooth interface, for enabling device A to communicate and access information from remote sensing devices. The incorporation of a short range wireless adapter 8A extends the capability of the AAVP to use sensors (310) external to the main device, and may be a dedicated sensor or other information providing source to assist in the AAVP collection of AIM or IT data. The short range wireless adapter 8A may also be placed into a promiscuous mode in which the short range wireless adapter 8A performs information gathering.

9A is a digital or CCD type camera, or other equivalent device (310) capable of receiving information across a broad spectrum of visible and invisible wavelengths may also be incorporated into the device A100. One example of such a camera 9A is a high definition ("HD") camera. Camera 9A is configured to detect small (e.g. a few millimeters down to micrometer or microscopic in size) or special AIMs. Camera 9A is configured to enable device A100 to perform macro examination of larger images and/or to support dimensional analysis, the collection of pattern information and other "visible" data to analyze the ART or ARTIFACT. Other physical characteristics like size, weight, range of movement, special movement, mass, scale and others may be calculated or measured with camera 9A. Camera 9A may also collect a range of observations or observable points to calculate pattern or patterns for use in validation and authentication.

The small size or ability to resolve a tiny AIM (e.g., from less than 2 MM to microscopic size) is a function of many factors in digital imagery. The following common definitions help to describe the camera capability and functions of this sensor.

Digital Camera as sensor quality or ability is rated on its megapixel (MP) value. A megapixel (MP or Mpx) is one million pixels, and is a term used not only for the number of pixels in an image, but also to express the number of image sensor elements of digital cameras or the number of display elements of digital displays. For example, a camera with an array of 2048×1536 sensor elements is commonly said to have "3.1 megapixels" (2048×1536=3,145,728). The megapixel count is often used as a figure of merit, though there are other figures that determine camera quality.

Digital cameras use photosensitive electronics, either charge-coupled device (CCD) or complementary metal-oxide-semiconductor (CMOS) image sensors, consisting of a large number of single sensor elements, each of which records a measured intensity level. In most digital cameras, the sensor array is covered with a patterned color filter mosaic having red, green, and blue regions in the Bayer filter arrangement, so that each sensor element can record the intensity of a single primary color of light. The camera interpolates the color information of neighboring sensor elements, through a process called demosaicing, to create the final image. These sensor elements are often called "pixels", even though they only record 1 channel (only red, or green, or blue) of the final color image. Thus, two of the three color channels for each sensor must be interpolated and a so-called N-megapixel camera that produces an N-megapixel image provides only one-third of the information that an image of the same size could get from a scanner. Thus, certain color contrasts may look fuzzier than others; depending on the allocation of the primary colors (green has twice as many elements as red or blue in the Bayer arrangement).

"PPI" or "pixel density" may also be used to describe the resolution of an image scanner. In this context, PPI is synonymous with samples per inch.

In digital photography, pixel density is the number of pixels divided by the area of the sensor. A typical DSLR circa 2008 will have 1-4 MP/cm2; a typical compact will have 20-35 MP/cm2. Interestingly, as can be seen here, the professional camera has a lower PPI than does a compact, because it has larger photodiodes due to having far larger sensors.

The heart of every digital camera is the Sensor, usually either a CCD or a CMOS type. All Sensors are analog devices, converting photons into electrical signals. The process by which the analog information is changed to digital is called Analog to Digital (A/D) Conversion. This can occur within the Sensor itself, or within the camera, or within the PC, as was the case with older video camera/frame grabber technology. The Sensor size is another consideration. The larger the Sensor size (actually the larger the individual pixel size), the more light sensitive the Sensor should be, so larger is better, at least in theory. Some of the most advanced digital cameras, like the ProgRes C14+, use a large 1.4 MP moving Sensor that scans the image area in up to 36 increments to produce extremely high resolution 12.5 MP final images.

Device 10A also includes a microphone or other component for collecting sound or audio waves emitted by the Art or Artifact or ART-AIM. The Art or Artifact may produce sound or audio waves when it is either used or activated (by any user means) including electronic, physical excitation, movement, behavior or other use (e.g. pressing a button, opening a lid, activating an audible alert). Many objects of ART or ARTIFACT may have "signature" sounds that will contribute to the calculation of the overall IT and authenticity.

11A—Device A100 includes a sensor 11A (310), such as a Near Field Communication ("NFC") sensor, configured to detect wave ranges of that in the radio spectrum. Sensor 11A is configured to operate in a frequency range specified for specific business functions. In some embodiments, sensor 11A may operate at a fixed frequency or be variable through hardware of software design or configuration. The AAVP may use module 11A to interrogate objects (ART/ARTIFACT) and gather information from AIM designed to respond, reply, identify or become know to this sensor. As will be understood by one skilled in the art, NFC sensors operate in a relatively close range, in comparison to other long range radio device (contrast to the wireless network or broadband connection). Sensor 11A is capable of two way operation, and may transmit and receive and even issue control to an object with a tag or device that operates on the same frequency and protocol as the NFC reader. Sensor in 11A is configured to enable a range of possibilities in identification and control. For example, sensor 11A may be used to send a communication to an object to operate, stop or retrieve information, activate other functions or capabilities in the object. Sensor 11A is configured to be used for many complex communication interrogations, and supports security and information gathering capabilities. The strength or power of the sensor in 11A may be varied automatically (programmatically) or by the user to increase or decrease the field of visibility, (distance or area to which the AIM must enter to be detected or communicated with).

Radio spectrum refers to the part of the electromagnetic spectrum corresponding to radio frequencies—that is, frequencies lower than around 300 GHz (or, equivalently, wavelengths longer than about 1 mm).

Different parts of the radio spectrum are used for different radio transmission technologies and applications. Radio spectrum is typically government regulated in developed countries, and in some cases is sold or licensed to operators of private radio transmission systems (for example, cellular telephone operators or broadcast television stations). Ranges of allocated frequencies are often referred to by their provisioned use (for example, cellular spectrum or television spectrum).

| Frequency | Designation | Abbreviation[2] |
|---|---|---|
| 300-3000 Hz | Voice frequency | VF |
| 3-30 kHz | Very low frequency | VLF |
| 30-300 kHz | Low frequency | LF |
| 300 kHz-3 MHz | Medium frequency | MF |
| 3-30 MHz | High frequency | HF |
| 30-300 MHz | Very high frequency | VHF |
| 300 MHz-3 GHz | Ultra high frequency | UHF |
| 3-30 GHz | Super high frequency | SHF |
| 30-300 GHz | Extra high frequency | EHF |

Radio frequency (RF) energy has been used in medical treatments for over 75 years, [3] generally for minimally invasive surgeries, using radiofrequency ablation and coagulation, including the treatment of sleep apnea.[4] Magnetic resonance imaging (MRI) uses radio frequency waves to generate images of the human body.

RF as a Synonym for Wireless

Although radio frequency is a rate of oscillation, the term "radio frequency" or its acronym "RF" is also used as a synonym for radio i.e. to describe the use of wireless communication, as opposed to communication via an electrical connector. Examples include:

Radio-frequency identification

ISO/IEC 14443-2 Radio frequency power and signal interface

12A—An HF reader 12A may also be incorporated into device A100. HF reader is configured to interrogate High Frequency ("HF") RFID tags or devices. The HF reader 12A is configured to provide close range capability to gather information from many types of HF RFID tags. The HF reader is configured to operate as a magnetic field induced RFID solution, whereby the tag is sensed in the wave field of the HF reader. The HF reader 12A is also characterized by the fact that if operating using the magnetic field principle, the reader and the object may be relatively motionless. HF reader 12A may be used by the AAVP, and provide AIM interrogation of HF responding devices, in close proximity, tight quarters, through many liquids and solids, as the wavelength is characterized by its ability to penetrate liquids and operate near metals as well. HF reader 12A is configured to exploit and interrogate HF RFID tags, and may also be used to activate other materials sensitive to the UHF wave emissions.

13A—A widely used and growing range of Ultra High Frequency (UHF) RFID identifiers that are excellent AIMs if securely embedded or attached to ART. These RFID tags are making their ways into all manner of objects. A UHF reader will be able to exploit and interrogate UHF RFID tags, and may also be used to activate other materials sensitive to the UHF wave emissions (pigments or dies that change when exposed to UHF, metals that deform or change under UHF). UHF tags may be both near or far field (meaning the distance or area the technology can be extended to interact from the source or antenna in RF technology) in nature, depending on the design of the tag with respect to antenna geometry and internal chip designs or programming. The UHF RFID reader will be used by the AAVP to gain a vital AIM of many objects today. The embedding and use of UHF RFID tags in all type of objects of ART will be a vital tool in authentication. The UHF (and any other radio tag, produced in accordance with international radio specification), will contain its own unique identifier (Transponder ID or TID), as dictated by the international RF associations. The international RF associations and most or all manufacturers of RF equipment participate and maintain a unique identification scheme to the ID of any Radio transponder. This may be a "built in" ID set by the manufacturer, and unchangeable by design, never to be duplicated. Therefore, the TID along with other usable data locked into the RFID tag provide a very powerful AIM that the two values together insure integrity and non-duplication of the TAG. If a supplier of ART/True Artifact records these values at the start of distribution and locks the user definable portion in, the tag cannot be counterfeited without incredibly extreme and likely costly measures. Combining the tag with other unique data as part of the AAVP solution, contributes mightily to the Raotronic fingerprint, and strength of calculation of the Immutable Token (IT). Restated, the TID, USER Data portion of an RFID Tag, and other characteristics that are "permanent" or genuine according the probabilistic measure in the AAVP and WAAL will facilitate the higher probabilities of authenticity that users seek in determining if the stuff is real.

14A—Multi-color single or array of Light Emitting Diodes (LED) or similar light emitting device may be used to make visible all or part of the ART. The control and use of a device that produces waves in the visible or ultraviolet range may be used to expose AIM or other characteristics of ART or ARTIFACT. The resulting exposure may be captured by the optical reader or HD camera, or may be visible to the human eye and information input either electronically or manually respectively into the AAVP. Manual input will be through the screen user interface and may be entered by the typical choice or keyboard entry, depending on the design of the AAVP, information desired, device display/input, or some other connected (wired/wireless) manual entry device. For example, the LED may be controlled to emit specific wavelength or color combinations to expose patterns specifically sensitive, or that become "visible" to either the device, human or other sensor when exposed to the special light range produced by the LED's (the classic "invisible ink" technique is a metaphoric example, whereby the writing on an object is only exposed to a certain wavelength of light shined on it. Then the observer can collect the information and provide it to the AAVP).

15A—The device A100 may contain one or more physical types of connectors to connect for communications to networks or to control other types of devices (readers or other wave sensors, other sensors or emitters) to aid in the collection of AIM or other data. For example, a USB attached RFID reader may be connected and used by the AAVP. Any of the aforementioned or equivalent sensing or interrogating devices may be in a form of wired or wirelessly connectable to the main device used to execute the AAVP. The USB represents one type of physical connector to allow the AAVP to use a device not accessible to the built in bus of the smart device running the AAVP.

B100—the External Wave Sensor (with Respect to the Smart Device, Phone or Pad)

1B—This device (casing 302) includes one or more radio, optical or audio wave sensing, collecting or reading devices. The purpose of this device is to extend the ability of the AAVP to interrogated ART or ARTI-FACTS and read AIMs. Other sensors may also be implemented such as, for example remote sensors like (Bluetooth, wired or wireless network attached) RFID readers, ultrasound examination devices, temperature measuring device (thermometer or thermistor), weight scales (tensiometer), and could be any kind of special external sensor perhaps dedicated to the interrogation of very specific AIMs, or substances that are all or part of the ART or True Artifact.

2B—This is a visible/audible display (optional) on the remote device. It may display graphical or text based information and controls of objects or actions such as operation, power, activity, allow input, errors or other user feedback. This may or may not be needed, depending on the device itself. A display may not be required, but many remote or add-on devices may have a display. This can range from a minor optical or audio indicator to some more advanced visual screen showing words, images or other metrics or information specific to the remote sensing device.

3B—This wireless connection is equivalent to the one as described in the main device A100-7A. A remote device like B100 may in fact be sufficiently distanced physically from device A100 and allow remote sensing or interrogation, allowing the invention to use information physically collected and transmitted to the main device over a wireless network. The wireless network is a transmission method employing radio wave technology to transmit and receive information, and may be today's Ethernet based design, supporting multiple protocols of transmission over the air, ultimately to a wired electrical or optical network to communicate between device A100, B100 and the WAAL and PPLs.

4B—The Bluetooth adapter in B100 is equivalent to that described in 8A. It may be used to connect the B100 device to the A100 device, or be exploited as described as for in device A100.

8B—A power supply may or may not be included in the B100 device, depending on its complexity. If the device can receive external power from a wireless excitation (equivalent to an RFID tag that draws power from an external magnetic or electric field), then a power supply may not be needed. In other cases, this will be a battery or physically wired connection to some AC or DC power supply, the source being any number of power providers. A solar power provider or source may even be used.

5B—The device may contain a processor to perform functions required of the sensing device. This is equivalent in function to the processor described in 3A.

6B—The device may contain one or more forms of "computer" memory. It is assumed that the device may need some form of memory to store, buffer or operate programs requiring permanent or temporary storage to execute the desired sensing functions, and store results for a given time. Memory device 6B may be similar to those memory devices described above with respect to device 4A in A100.

7B—The external device may contain one or more keys to control its operations. This could include a key to power the device on and off, put it into a synchronization mode to connect the blue tooth, control sound or feedback or any number of functions. The key may be multi-function depending on how it is depressed in sequence, time or succession. This is equivalent to 2A.

The lines connecting the components in the diagram represent steps in communication between the various components of the WWVN. In some embodiments, these lines represent data communications over the internet or other forms of public and private data networks. information may be transmitted via digital communication over an Ethernet network, using TCP/IP or equivalent protocols. The WWVN can use the Internet, Web, and/or other shared communications networks.

3—PPL (700) This is an example of one form of a Public or Private Library ("PPL") of AIMS where the AIMS are embedded codes in digital media, software or the like. There is no need for any physical difference in the PPLs design. This is PPL is offered as an example to emphasize the fact that the AIMs, keys or characteristics may be codes or serialized values of any sort, including things like digital certificates, software license keys, or other encoded AIM. The AIM is configured to be associated to the ART eventually at some physical level, and may use special devices, computer or software applications (possibly part of the AAVP) to read or obtain the AIM or serial number indirectly, as opposed to a direct physical observation on ART or ARTIFACTS.

4—This is an example of another repository of serialized values that may represent physical serial numbers, or tag values directly associated to a physical ART. These may be values from placards, RFID tags, etched values, or other serial numbers of ART or ARTIFACT.

The Public and Private Library (PPL) systems (700) represented logically in 3 and 4 may be physical or virtual computer servers including components for storing serialized information. The PPL includes a database management system and a database for storing, collecting, and providing access to AIM values. PPL is configured to send or be queried to get the values to the WAAL, or make the values accessible to the WAAL in dynamic fashion when needed. In some cases, an AAVP may be used directly against a PPL by a specific art supplier, typically in a private fashion. The PPL may be implemented with many server technologies that one skilled in the art will be able to deploy. Commercial and open source version of the PPLs are available today and are recognized as equivalent to EPCIS database solutions as described above.

The central repository, authorization and analytical system are the Worldwide Art and Artifact Library (WAAL) shown in 5. The WAAL (500) may be created by one skilled in the art on a computer server, real or virtual, and may in fact be a collection of servers, cloud or other computing platforms. A cloud or virtually scalable solution may host the WAAL. The WAAL may also be a group of federated computing devices acting cooperatively to distribute store and access information. Other version of the WAAL may be created on a massive computing structure (Mainframe or supercomputer) to host the WAAL. Regardless of the physical manifestation, the WAAL may operate on one or more computing platforms such as, for example, Microsoft Windows Servers, UNIX Servers, IBM Servers, AMAZON Cloud EC2, Virtual servers, etc. The WAAL includes a database and database management system to store the collection of AIMs and other characteristics of ART and True Artifacts to be authenticated. The database is configured to support the fields and data structure that make up the profiles of the users of the WAAL. The profile engine is configured to control access to the WAAL, and also to characterize the users across a broad range of features. The Advanced Analytics Engine is configured to develop IT of users, effectively providing a unique identifier for each user, by using the features as AIM type values.

The System Curator may be implemented as a software application running on the WAAL computer. This will be the overall controlling application to orchestrate storage, search and execute the Profile engine and Advanced Analytics engine. All these are software applications built to perform the functions as described herein.

The WAAL may be configured to capture, query and integrate interfaces for the AAVP and PPL to communicate and use the WAAL.

The WAAL may be configured with network devices, wired, wireless or other so that this computing platform will physically or wirelessly be accessible. Access to build and control the WAAL may be directly physical from attached peripherals (keyboard, display, and mouse) to the WAAL hardware, or typically be remote using virtual desktop type solutions (Remote Desktop).

Example

Referring to FIG. 5L, although the consumer electronics product is presented as an example article, the disclosed system and methods may be used to authenticate other objects or devices. Other examples of ART and ARTIFACTS from airplane parts to zoo animals may be validated by the system. Other examples include but are not limited to articles of clothing, footwear, fashion accessories, handbags, luggage, furniture, jewelry, watches, coffee, cosmetics, pharmaceuticals, electric meters, automobile tires, telephone poles, all manner of software and hardware creations, food items, and packaged goods, to name a few potential objects.

1. A semiconductor manufacturer produces/manufactures and sends a chip (ART) with an embedded RFID tag (AIM) to an OEM manufacturing authority.
1.1. The semiconductor manufacturer reports their distribution to their own event repository (PPL).
1.1.1. The SC manufacturer updates the WAAL
2. A software vendor sends licensed software (ART) and/or certificates (AIM) to the OEM MFG for use in the consumer electronics product
2.1. The software vendor reports their distribution to their own PPL
3. The receiving OEM MFG identifies the consumer electronics product (TA) and its tag (AIM), and sends a record of the combined tags (IT) back to the semiconductor manufacturer.
3.1. The CE manufacturer updates their PPL.
3.1.1. The CE MFG updates the WAAL
3.1.2. The CE reports back to the PPLs of the hardware and software suppliers.
3.1.3. The System Curator (S.C.) at the WAAL creates the Immutable Token (IT) of the saleable/consumable product (True Artifact or TA).
4. Sales and distribution of the product occurs through the supply chain

4.1. Distribution and Point of Sale transactors can query and update the WAAL to respectively validate the authenticity of the product and report its true whereabouts. The IT forms the fingerprint and determines the authenticity of the product to any buyers or sellers.
4.2. PPLs may be updated {optional, push or pull)
5. Prior to purchase, the buyer and seller can check the product with a Smartphone equipped with an ITR and the AAVP and a connection to the WAAL (cloud/internet)
5.1. The AAVP analyzes the product, develops an IT or fingerprint, and validates it with a reported degree of certainty and other statistics to the inquirer. Lack of authenticity or corruption of the planned supply chain can be recorded and reported back to the product manufacturer.
6. A consumer may wish to resell or distribute the product through a secondary market (e.g. eBay). The reseller then uses his Smartphone, captures and validates the I.T. of the product.
6.1. The IT is reported to the secondary market broker (eBay) upon offering for sale. The broker may validate the authenticity individually or in bulk using the AAVP API.
7. Multiple buyers may examine or transact with resellers.
7.1. Multiple buyers may use their Smartphone or the WAAL online portal AAVP to validate the authenticity of the product they wish to buy.
8. A buyer receives a product from the secondary market.
8.1. The buyer checks the validity of the product using their Smartphone and ITR equipped with the AAVP.
9. The WAAL tracks and updates it database of product and component information
10. The Governing Organization operates the WAAL, supports global standards, and provides interfaces, API and reports for the Worldwide Validation Network (WWVN).

Use Case Scenarios
Scenario A: AAVP on a Smartphone
Referring to FIGS. 5M, 5N and 5O, the following example details the use of the AAVP software on a ruggedized Smartphone device for validating a product which contains a serialized RFID HF tag on a component within the product and serial number barcode located on the outside of the product. The RFID HF tag and the serial number barcode are the ART-AIMs. The combination of the ART-AIMs creates the True Artifact in this example to be used for validation against the WAAL. The following steps are to take place:

1. AAVP software application may be downloaded to a Smartphone device configured with a camera and/or a NFC component (RFID HF/UHF reader) via software distribution architecture.
2. AAVP software is installed on the Smartphone device and during the installation determines that a camera and NFC component (RFID HF reader) are available. Sequencing of the individual ART-AIM reads are configurable.
3. User desires to validate the product and initiates the AAVP software application which confirms status of camera and NFC components.
4. User is prompted to execute a NFC read. The device reads the RFID HF tag located inside the product using the NFC component and records the unique serialized product code and informs the user of a successful read.
5. User is prompted to execute a barcode scan and is guided to frame the barcode or other indicia that is to be used in the validation/authentication process through the device camera. The device auto-focuses the barcode and takes the photo reading the serial number found on the outside of the product, records the serial number and informs the user of a successful read.

6. User is informed that all automated data has been recorded and could prompt user for manual ART entries based on the AAVP configuration.

7. User requests validation and the ART-AIMs create the True Artifact which is transmitted to the WAAL for validating the authenticity of the product. The user is informed whether or not the product is deemed authentic. If it is determined that the object is not authentic, then the device displays or otherwise informs the user of where the authenticity flaw resides. A flaw in the authenticity is when one or more AIMs do not belong as part of the True Artifact, or when the product fails to match in content or quality of workmanship, when improper or contraband materials are part of the product. Other flaws may be of the nature of improper materials, fake leather, missing logos, misspelled labels, mismatched components, and other material parts that indicate that the product is not genuine. In consumer electronics, flaws may be components that are incorrect for a product, missing parts, improper software or firmware that does not belong as part of the product, improper functions, and any general hardware or software or function that the product validation indicates is wrong or does not belong. The authentication status is to be incorporated into an authentication workflow (probability, percentage confidence, similar art/artifacts in decreasing order, optical and audible and manual inputs as well, even operational tests—"activate the device and tell if it lights up like this.").").

Scenario B: AAVP Software Access from an Online Marketing Retailer

Figure 5P:
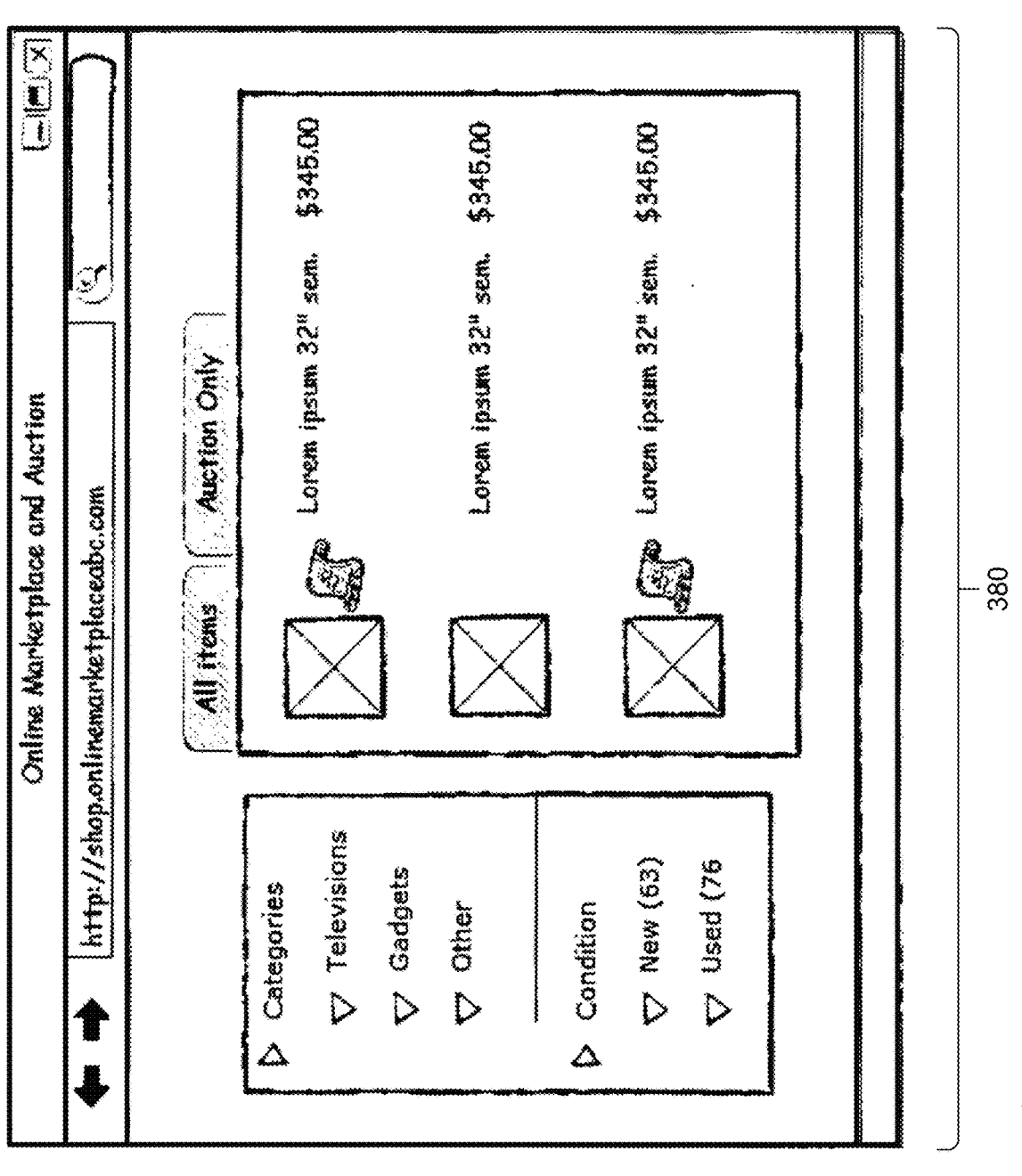
Figure 5T:
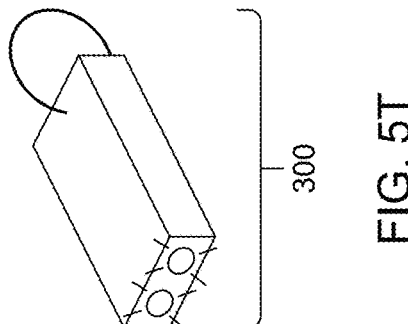
Figure 5R:
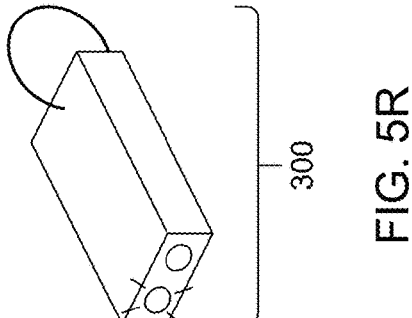
Figure 5S:
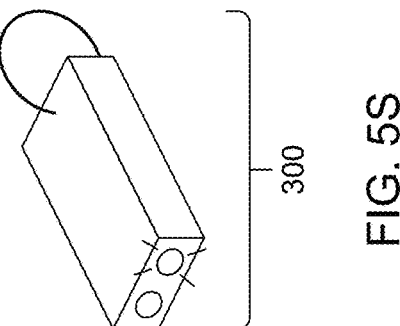
Figure 5Q:
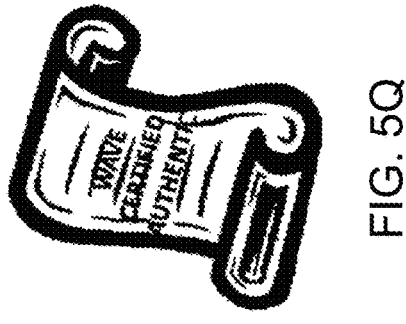

Referring to FIGS. 5P and 5Q, the following example details the use of the AAVP software as an application programming interface between the AAVP and WAAL, and the third party software of the online marketing retailer. The gray market brings into question the authenticity of the product being purchased from a retailer on an online marketing retail site. The product purchaser is leery of offering a full bid given the possibility of a fraudulent product. The online marketing retailer can acquire the ART-AIMS for the product offered and can submit the True Artifact IT to the AAVP API which will validate the authenticity of the product with the WAAL and return a certificate of authenticity that can be featured during the offer for sale of the product. The following steps are to take place:

1. Seller requests True Artifact authenticity certification from the online marketing retailer.

2. Online marketing retailer requests the ART-AIMS including but not limited, the serial number and product number from barcodes, the location from which the product was procured and where the product currently resides, the NFC data if product has NFC tag and seller has NFC reader, and multi-dimension photos or videos of the product.

3. Seller provides requested ART-AIMS.

4. Online marketing retailer sends ART-AIMS via AAVP API to the AAVP software. AAVP validates product authenticity with WAAL and returns a certificate of authenticity or notification of authenticity failure.

5. The purchaser of the product offered on the online marketplace can click on the certificate icon and is routed to the AAVP portal that reveals the name of the vendor, date of certification, certification product details and a description of the product. The portal website will provide information as outlined but not limited to in the wireframe (AAVP certification portal).

Scenario C: AAVP Software on a Key Fob or Payment System (Card or Checkout System)

Referring to FIGS. 5R, 5S and 5T, the following example details the use of the AAVP software on key FOB device, payment system or any machine to machine computing device for validating a product which contains a RFID HF tag with tag id and serial number on a component within the product. The RFID HF tag id and the serial number incorporated in the RFID tag are the ART-AIMs. The combination of the ART-AIMs creates the True Artifact in this example to be used for validation against the WAAL. The concepts of the key FOB, payment system or machine to machine computing device are similar in that the user is not required to enter any information manually either through manual typing, photography, laser scanning, or any other user initiated action. The machine to machine computing device becomes in contact with the product and via a NFC read, pulls the relevant data into the appropriate validation system.

The following steps are to take place with a key FOB device:

1. The user selects the product that is to be purchased. If the purchaser has a key FOB, the user can waive the key FOB (configured with WIFI, cell network access or any available communication capability) over the product.

2. The key FOB reads the RFID tag contained within the product, reading the tag id, serial number and transponder number creating a True Artifact IT from the ART-AIMS.

3. This True Artifact IT is transmitted to the WAAL via the AAVP API set for validation and depending upon the manufacturer agreed authenticity probability, an authenticity validated or not validated message is returned.

4. The key FOB device would return a green light for validated.

5. The key FOB device would return a red light for not-validated.

6. The key FOB device would return two yellow lights if not found.

This allows the customer to validate the authenticity of the product before completing the purchase.

Authentication Business Processes

The data stored by the WAAL is used to validate the authenticity of a product. The WWVN is configured to enable one or more of the following: (1) loading of True Artifact IT combinations by the product manufacturer inclusive of tag id, serial number, product diagram and dimensions, and unique features (including by not limited to: color, pattern, sound, logos . . . ) (2) loading of True Artifact IT combinations by the product assembler subject to similar AIM combinations and (3) the ability for the public to submit a subset of AIM components.

The submission of the AIMs for validating authenticity by the manufacturer and assembler of the product establish a validation database for new or recently manufactured products. However, products that less recent, such as antiques can be submitted via loading method (3)

APPENDIX B—REPRODUCTION OF U.S.
PATENT APPLICATION SER. NO. 13/495,183

FIGS. 6A, 6B, 6C, 6D, 6E, 6F, 6G, 6H, 6I, 6J, 6K, 6L, 6M, 6N, 6O, 6P, 6Q and 6R, along with the text below, are reproduced from earlier U.S. application Ser. No. 13/495, 183. In this present application, these reproduced figures from the aforementioned earlier patent application have been modified only to better comply with formal drawing requirements for non-provisional applications, and to change figure numbers and reference numerals to better align with those presented in the earlier figures of this present application. Also, in this present application, the text reproduced from the aforementioned earlier patent application has been modified only to make corresponding changes to figure numbers and reference numerals that better align with those presented in the earlier figures of this present application.

Field of Disclosure

The disclosed systems and methods relate to authentication. More particularly, the disclosed systems and methods relate to the authentication of objects using various parameter value sensors for discerning attributes of an object, and a data processing system and associated data storage, for comparing sensed parameters to stored criteria that are associated with authenticity.

Background

Counterfeit goods are damaging to the owners of name brand products as well as damaging to unknowing purchasers of such goods. For example, brand name owners or manufacturers suffer as they lose out on revenue from the sale of counterfeit goods and such goods can also damage the reputation of the brand name owner if the goods are shoddily made. Consumers can be damaged by unknowingly over-paying for counterfeit goods that they believe are authentic.

Summary

In some embodiments, a system includes a machine-readable storage medium, a processor in communication with the machine-readable storage medium, communication circuitry in communication with the processor; and a plurality of sensors in communication with the processor. Each of the plurality of sensors is configured to generate an electrical signal in response to receiving wave energy. The processor is configured to control data acquisition for authenticating an object using at least a subset of the plurality of sensors, calculate an authentication value based on signals received from the subset of the plurality of sensors, and cause the communication circuitry to transmit an authentication request including the authentication value to an authentication entity.

In some embodiments, an authentication method includes performing a plurality of data acquisition processes on an object using sensors configured to generate electrical signals in response to receiving wave energy, calculating an authentication value based on signals received from at least a subset of the sensors, and transmitting an authentication request including the authentication value to an authentication entity.

In some embodiments, a machine readable storage medium is encoded with program code, wherein when the program code is executed by a processor, the processor performs a method. The method includes performing a plurality of data acquisition processes on an object using sensors configured to generate electrical signals in response to receiving wave energy, calculating an authentication value based on signals received from at least a subset of the sensors, and transmitting an authentication request including the authentication value to an authentication entity.

Detailed Description

This description of the exemplary embodiments is intended to be read in connection with the accompanying drawings, which are to be considered part of the entire written description.

The disclosed systems and methods advantageously provide the ability to authenticate objects, referred to herein as authentic real things ("ART"), using mobile and stationary devices. The number and type of objects that can be authenticated are not limited, and examples of such objects include, but are not limited to, apparel, footwear, fashion accessories, consumer electronics, consumer appliances, collectibles (dolls, sport paraphernalia, etc.), pharmaceuticals, medical devices, and large assemblies like cars, trucks, and planes to list but only a few possibilities.

Figure 6A:
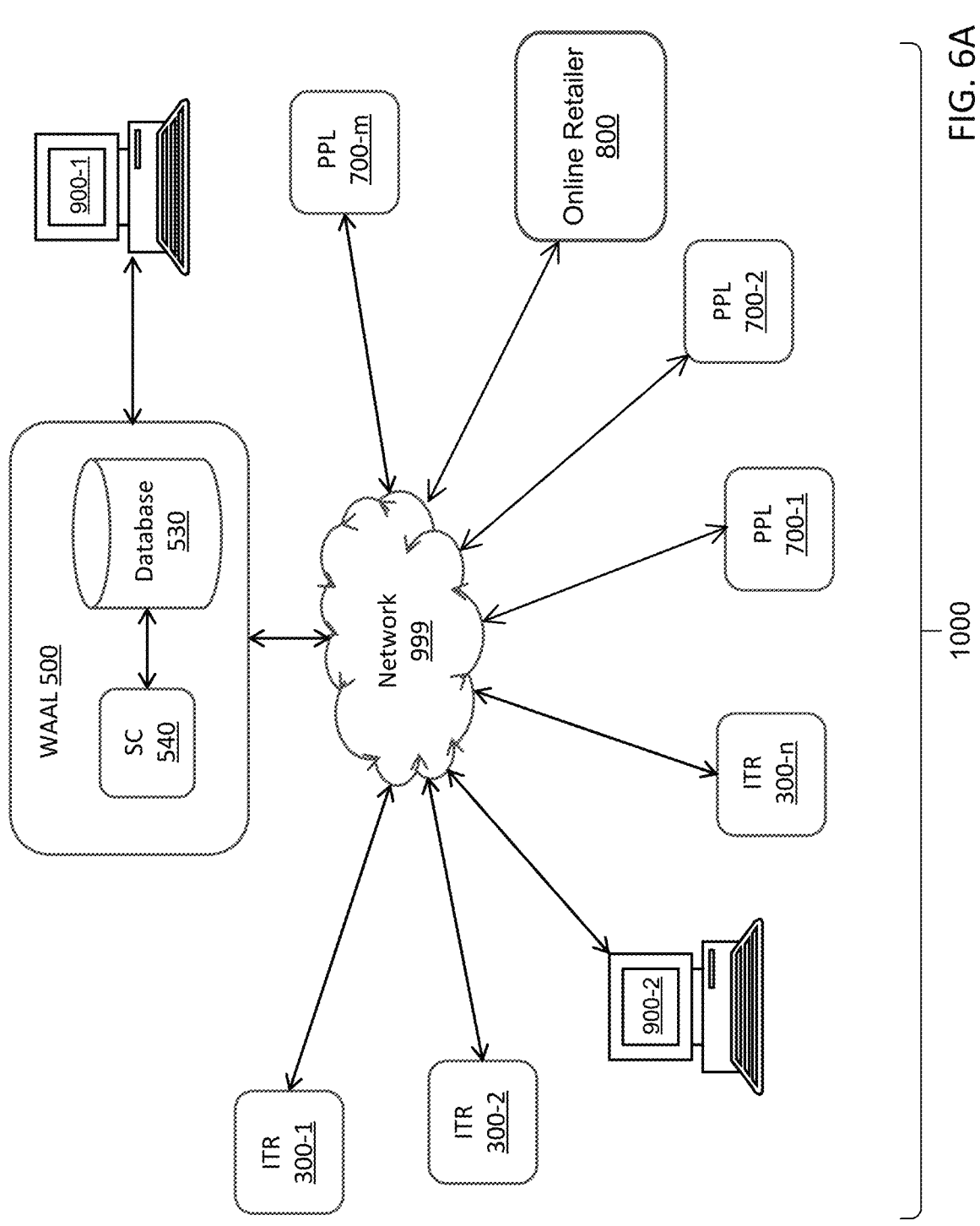

FIG. 6A illustrates one example of a World-Wide Validation Network ("WWVN") 1000 in accordance with some embodiments. WWVN 1000 includes one or more World-Wide ART & Artifact Libraries ("WAALs") 500 that include a database 530 and a System Curator ("SC") 540, which may be implemented in one or more processors or central processing units ("CPU") as will be understood by one of ordinary skill in the art. The one or more WAALs 500 are in communication with one or more Immutable Token Readers ("ITRs") 300-1, 300-2, . . . , 300-n (collectively "ITRs 300") and with one or more Public and Private Libraries ("PPLs") 700-1, 700-2, . . . , 700-m (collectively "PPLs 700") via network 999.

In some embodiments, WAAL(s) 500 are implemented using one or more computers or servers on which database 530 and SC 540 are implemented. Database 530 can be implemented as a relational database that stores data of ART 150 that are used to define True Artifacts ("TAs") 100 that are described in greater detail below. Version history, information, lineage, and other details about an ART 150 and TA 100 for validation and tracking are also stored in database 530.

SC 540 includes one or more processors and software and/or program(s) configured to manage the communication, indexing, activities and functions of the WAAL 500. Examples of such functions include, but are not limited to, authentication calculations, registration and record management of TAs and their respective digital fingerprints, communications with ITRs 300 and PPLs 700, and generating reports and analytics to users of local terminals 900-1 or remote terminals 900-2. In some embodiments, SC 540 provides an application programming interface ("API") for WAAL 500. The API provides for access and bulk processing of a large number of requests from ITRs 300 and PPLs 700. Online retailers, such as online retailer 800, can access database 530 and have WAAL 500 authenticate goods via network 999 by communicating with WAAL 500 via the API.

SC 540 is configured to perform analytics on data stored in database 530 and/or on data received from ITRs 300 and/or PPLs 700 via network 999. Such analytics involve determining whether attributes or combinations of attributes of objects, which attributes have been sensed or reported, qualify the objects as authentic real things (ART) 150 or as true artifacts (TA) 100. In addition to comparing sensed or reported attributes versus stored values that definitively distinguish objects (such as a unique identifying code), the analytics can involve plural attributes and can be implemented using one or more techniques including, but not limited to, pattern matching, artificial intelligence, optical recognition, key marking, fuzzy logic, chaos theory, entropic intelligence networks, Bayesian network(s), and quantum physics.

As described in greater detail below, data received at WAAL 500 and analyzed by SC 540 can be derived from an interrogation of one or more added indelible markers ("AIMs") such as, for example, radio frequency identification ("RFID") tag(s), product serial number(s), transponder identification numbers, doping agents, barcodes, quick response ("QR") codes, invisible ink(s), software keys, certificates of authenticity codes, colors, sounds, and combinations thereof by ITRs 300. Such data is combined to provide a unique identification for the ART 150 referred to herein as an Immutable Token ("IT") 400 of the ART 150. In some embodiments, SC 540 performs weighting of AIMs 160 of an ART 150 to calculate the IT 400.

In some embodiments, the weighting of AIMs 160 is based on the likelihood that the AIMs 160 can be forged or counterfeited. For example, the physical appearance of an article of manufacture, e.g., a shirt, bag, pair of shoes, etc., can be somewhat easily copied or replicated whereas an RFID tag number and a manufacturer serial number are less likely to match an authentic RFID tag number and manufacturer serial number affixed to an object during manufacture. Consequently, the RFID tag number and manufacturer serial number can be more heavily weighted than the physical appearance of an object. As will be understood by one of ordinary skill in the art, taking all available AIM values into account increases the certainty that an object is authentic.

Additionally, the physical appearance of authentic goods may vary due to the manufacturing process and the use of multiple AIMs 160 also reduces the likelihood that an authentic item is falsely identified as being counterfeit. For example, colors and the location of certain features of articles of manufacture may vary due to slight variances in dyes used to create cloth for a shirt or the exact position of buttons and logos that are affixed by hand to a garment. Weighting such AIM values less than AIM values that provide a higher degree of certainty reduces the likelihood of a false negative authentication.

Data stored in WAAL 500 is amassed over time progressively improving the probability that calculations performed by WAAL 500 are accurate in determining or disproving the authenticity of an object, i.e., to determine accurately whether or not the object is an ART 150. WAAL 500 is configured to perform token (e.g., IT) management and provide real-time communication with ITRs 300 and PPLs 700, including validation and verification of the authenticity of an object, i.e., ART.

In some embodiments, WAAL 500 is configured to store attributes of known facsimile or counterfeit goods to improve the ability of WAAL 500 to identify fraudulent or counterfeit goods. For example, counterfeit goods may include differences in the physical appearance of the good that are known to a manufacturer or producer of the goods, but are not well-known by a prospective buyer. In some embodiments, these known physical differences are stored in WAAL 500 and used to identify an object as counterfeit.

For example, known counterfeit goods may include a tag in a location that is offset from the location in which the same or similar tag of an authentic item is to be located or the known counterfeit good may include differences in a collar or in the number of buttons. The attributes of known counterfeit goods are stored by the WAAL 500 and can be used during an authentication process by analyzing an image collected by an ITR to assess whether the object being authenticated is in fact authentic or counterfeit. In this manner, the knowledge base of the WAAL 500 is increased over a period of time as data on known counterfeit goods (and authentic goods) are collected and stored in WAAL 500.

ITRs 300 includes devices configured to read, interrogate, and interpret one or more AIMs 160, which are described in greater detail below, using one or more sensors configured to generate electrical signals in response to wave energy. Examples of such wave sensors includes receivers for receiving audio sounds, a camera or light-sensitive sensor for performing optical measurements, and magnetic-sensitive sensors, to list but only a few possibilities.

In some embodiments, ITRs 300 are implemented in a mobile form factor such as, for example, a fob, a smartphone, portable music player, tablet computer, laptop computer, personal digital assistant ("PDA"), or other portable electronic device with capacity for wireless data communication or at least intermittent coupling into a data network. In some embodiments, ITRs 300 are implemented in more stationary devices such as a desktop computer, kiosk, and/or point-of-sale terminals.

Figure 6C:
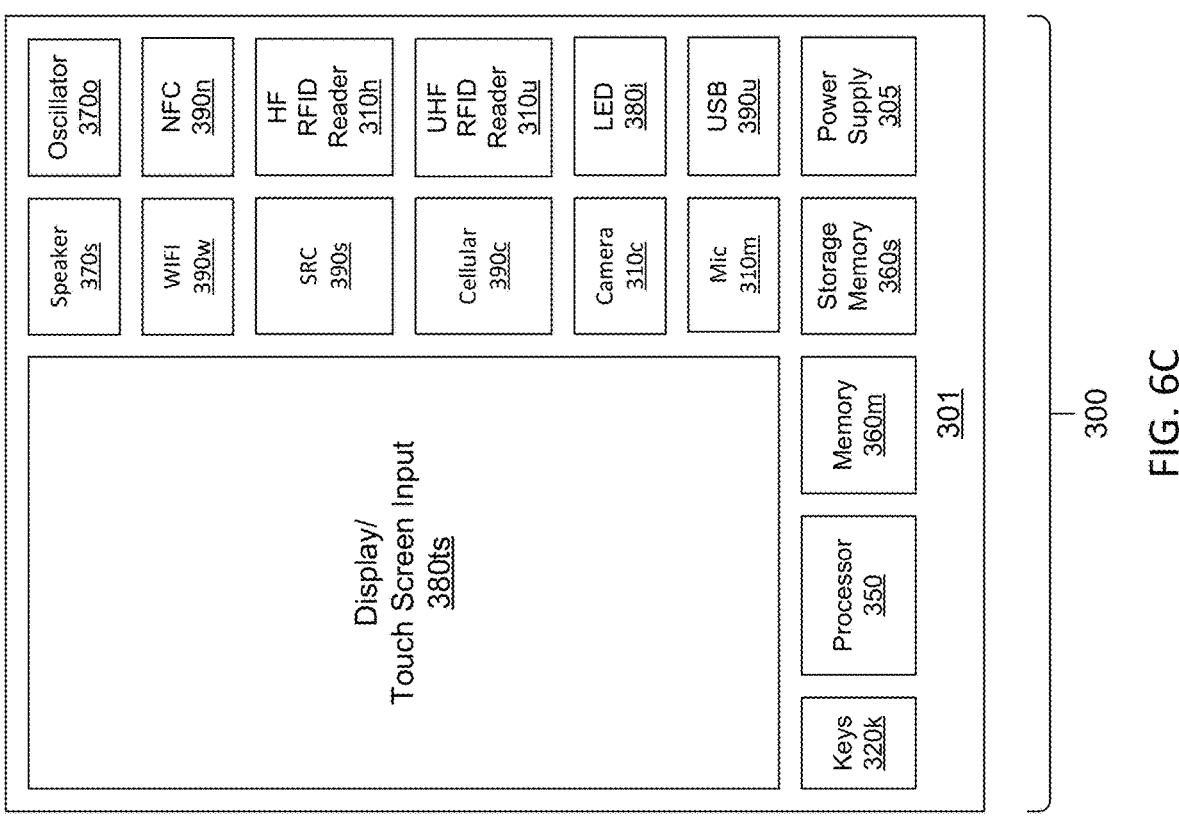
Figure 6B:
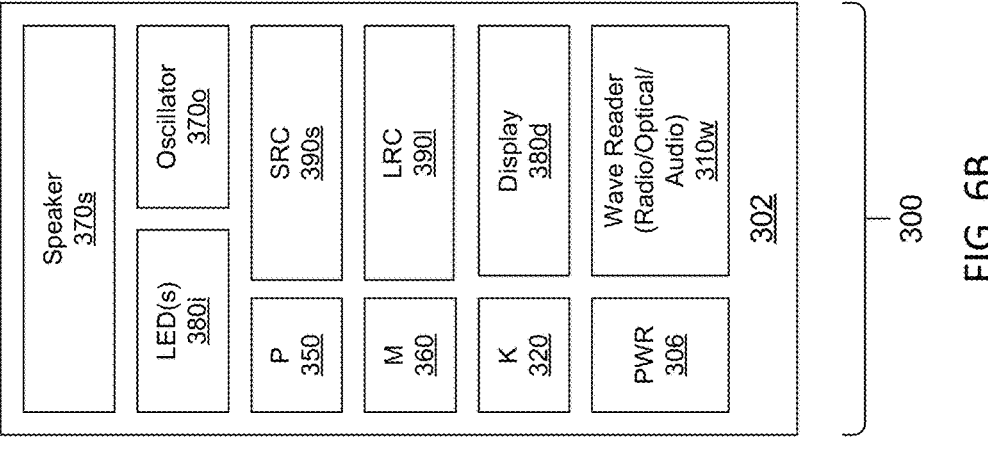

As illustrated in FIG. 6B, ITR 300 is illustrated as a mobile module (including the casing 302) configured to communicate with other mobile devices, such as another mobile unit (including the casing 301) illustrated in FIG. 6C, and/or other stationary devices such as a computer. ITR module (i.e., the portion including the casing 302) includes a wave reader 310w that is a multi-function sensor array configured to sense radio, optical, magnetic, audio, and other wave energy. Wave reader 310w is configured to receive waves emitted from an object such that a radio-audio-optical-electronic ("Raotronic") fingerprint of the object can be calculated as described in greater detail below.

In some embodiments, the ITR module includes a display 380d configured to display images and text to a user. In some embodiments, display 380d is a touch screen display configured to display virtual icons or keys through which a user may input data. In some embodiments, the ITR module is a fob without a display 380d, but that includes other circuitry and features illustrated in FIG. 6B.

A long-range and/or cellular communication chip ("LRC") or circuitry 3901 provides the ITR module with the ability to communication via a cellular network and/or a WIFI network. A cellular chip enables module 120 to communication with WAAL 500 and/or PPLs 700 via a wireless communication protocol such as, for example, CDMA, GSM, 3G, and 4G LTE, to list but only a few possibilities. As described in greater detail below, ITR module (and more generally ITRs 300) exchange calculated IT data values, user profile data, reports, advertising, and/or other data with WAALs 500 and/or with PPLs 700 via network 999, which may be accessed via the Internet, a cellular network, and/or other network.

In embodiments in which LRC 3901 includes a WIFI adapter, LRC 3901 is configured to be placed into a promiscuous mode such that one or more AIMs 160 can be interrogated. One example of this is that LRC 3901 is configured to read the media access control ("MAC") or burned in/permanent address of a network card present in another device (e.g., a computer). As will be understood by one skilled in the art, a MAC address of a network card is a unique, non-duplicated code set by the manufacturer, equivalent in discussion to the fact that all transponding devices produced in accordance to internal agreement of manufacturers are unique.

In some embodiments, the ITR module also includes a short range communication chip ("SRC") 390s such as, for example, a Bluetooth, Near-Field Communication ("NFC"), or other chip that enables the ITR module to pair with (e.g., communicate data bidirectionally with) other devices. Although communication chips 390l and 390s are depicted as separate components, one of ordinary skill in the art will understand that chips 390l and 390s may be implemented in a single package. In some embodiments, SRC chip 390s can be placed in a promiscuous mode in which SRC chip 390s performs data gathering.

A power supply 306, such as a rechargeable or replaceable battery, is configured to provide power to each of the active devices of the ITR module. In addition to the active devices described above, the ITR module also includes one or more processors or CPUs 350. Processor(s) 350 are configured to execute an ART & Artifact Validation Program ("AAVP") 340. The AAVP 340 provides the instructions for the ITR module to interrogate an object 100 or 150, and calculate IT values to assess the authenticity of the object. When executing the AAVP 340, processor(s) 350 may cause display 380d to display information about the object 100 or 150 in question to a user. Examples of such information include, but are not limited to, history, status, and/or location of the object 100 or 150.

The ITR Module also includes a memory 360 such as a random access memory ("RAM") and/or a read only memory ("ROM"). Memory 360 is a non-transitory machine readable storage medium configured to store the instructions for executing the AAVP 340. Memory 360 is also configured to store data obtained by the ITR module from wave reader 310w and communication chips 390l and 390s. One or more keys 320 or other user input device can also be included in the ITR module.

In some embodiments, the ITR module includes means for conveying signals and notifications to a user beyond a display. For example, the ITR module includes one or more light emitting diode(s) ("LED(s)") 380i that are configured to emit one or more colors of light based on an authentication response as described in greater detail below. An oscillator 370o is configured to vibrate or generate a tactile notification, and a speaker 370s is configured to generate an audible notification to a user. In some embodiments, the notifications emitted by one or more of LEDs 380i, oscillator 370o, and speaker 370s are to notify a user as to whether an object 100 or 150 has been authenticated as described in greater detail below.

The ITR module can communicate with a mobile device (e.g., the depicted ITR device 300 that includes the casing 301) using a wireless, wired, or other communication channel. As shown in FIG. 6C, such a mobile device includes one or more processors 350 in signal communication with a persistent memory 360m and a more volatile memory 360s. In some embodiments, memory 360m is configured to store the AAVP 340, and memory 360s is configured to store data acquired by the mobile device. A power supply 305 is configured to provide power for the mobile device, including power to processor(s) 350. Power supply 305 can be a replaceable and/or rechargeable battery as will be understood by one of ordinary skill in the art.

In some embodiments, the mobile device includes an attachment port, such as a universal serial bus ("USB") interface 390u or a secure digital ("SD") card slot, for transmitting and receiving data via a wired or otherwise mechanical connection (e.g., slot and card).

One or more LED 380i are provided for displaying status signals to a user. In some embodiments, LEDs 380i are used to make visible all or part of an ART 150. The use and control of LEDs 380i, or other illuminating device that produces waves in the visible or ultraviolet range, can be used to expose AIM 160 or other characteristics of ART 150.

The mobile device includes one or more sensor devices 310 that comprise a wave reader. For example, the mobile device includes an ultra-high frequency ("UHF") radio frequency identification ("RFID") reader 310u, a high-frequency RFID reader 310h, a microphone 310m, and a camera 310c. Although shown as separate devices, one of ordinary skill in the art will understand that RFID readers 310u and 310h can be implemented as a single device in some embodiments and are configured to interrogate RFID tags that may be embedded or coupled to objects 100 or 150 as described in greater detail below.

Microphone 310m and camera 310c are configured to receive audio signals (waves) and light signals (waves), respectively, and generate and/or output electrical signals in response. Camera 310c can be a digital camera that includes photosensitive electronics, such as charge-coupled devices ("CCD") or complementary metal-oxide-semiconductor ("CMOS") image sensors. The sensor array of camera 310c is covered with a patterned color filter mosaic having red, green, and blue regions in the Bayer filter arrangement such that each sensor element can record the intensity of a single primary color of light. Camera 310c interpolates the color information of neighboring sensor elements, through a process called demosaicing to create a final image.

Camera 310c is configured to receive information across a broad spectrum of visible and invisible wavelengths and to detect small objects (e.g. objects on a scale of a few millimeters down to micrometer or microscopic in size). In some embodiments, camera 310c is configured to enable the mobile device to perform macro examination of larger images and/or to support dimensional analysis, the collection of pattern information and other "visible" data to analyze ART 150. Other physical characteristics like size, weight, range of movement, special movement, mass, scale and others may be calculated or measured with camera 310c. Camera 310c may also collect a range of observations or observable points to calculate pattern or patterns for use in validation and authentication.

In some embodiments, camera 310c is used in connection with LED(s) 380i or other illuminating device(s) that produce waves in the visible or ultraviolet range. For example, the one or more LEDs 380i are controlled by processor 350 to emit specific wavelength or color combinations to expose patterns specifically sensitive, or that become "visible" to either the device, human or other sensor when exposed to the special light range produced by the LED(s) 380i (the classic "invisible ink" technique is a metaphoric example, whereby the writing on an object is only exposed to a certain wavelength of light shined on it. Then the observer can collect the information and provide it to the AAVP). Camera 310c is used to record the resulting image.

The mobile device also includes one or more units for providing communications with other devices. For example, the mobile device includes an NFC chip 390n, a WIFI or other wireless networking chip 390w, a short-range (e.g., a Bluetooth) chip 390s, and a cellular chip 390c. Communication chips or units 390n, 390w, 390s, and 390c may be separate units or combined into a single package.

Display 380ts can be a touchscreen display configured to display information to a user in the form graphics and text. Examples of such information includes, but is not limited to, history, status, and/or location of an object being interrogated for authenticity. One or more keys 320k or other user input device can also be included in the mobile device such that a user can input data and control the mobile device.

In some embodiments, the mobile device also includes a speaker 370s and an oscillator 370o. LEDs 380i, speaker 370s, and oscillator 370o are configured to provide notifications to a user. For example, LEDs 380i and display 380ts may generate a visual notification to a user, speaker 370s is configured to generate an audible notification to a user, and oscillator 370o is configured to generate a tactile notification to a user.

One of ordinary skill in the art will understand that more stationary devices, such as computers, kiosks, and point-of-sale or checkout devices or registers, to list but only a few possibilities, can be configured as an ITR 300 and include some or all of the features described above with respect to the ITR module and the mobile device.

PPLs 700 can be public or private libraries of ART. For example, a company or manufacturer of goods can develop its own library or database of the signatures of the products the company sells or produces. In some embodiments, PPLs 700 are implemented in one or more servers that are in signal communication with WAAL 500 and one or more ITRs 300 via network 999. PPLs 700 store AIMs 160 as embedded codes in digital media, software or electronic medium. At some level AIMs 160 are associated to ARTs 150 in a database 730 residing in PPLs 700.

As mentioned above, ITRs 300 are configured to interrogate objects 100 or 150 to determine their authenticity. FIG. 6D illustrates one example of a diagram key of ART 150. ART 150 is used to describe a physical object that is authentic.

Figure 6E:
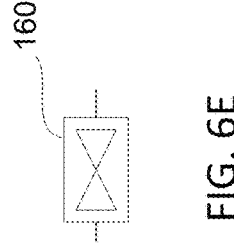

FIG. 6E illustrates one example of a diagram key of an AIM 160. In some embodiments, AIMs 160 are applied to ART 150 during the manufacturing process by a manufacturer. Examples of AIMs 160 include, but are not limited to, RFID tags, product serial numbers, transponder identification numbers, doping agents, barcodes, invisible ink(s), software keys, certificates of authenticity codes, and combinations thereof.

In some embodiments, one or more AIMs 160 include tamper-proof RFID (electric or magnetic field sensitive) tags. As will be understood by one of ordinary skill in the art, such tamper-resistant tags include trip mechanisms, which are sewn or otherwise permanently or semi-permanently affixed to an object. In some embodiments, the tamper-resistant tags are chemically or electronically linked to the ART 150.

If the AIM 160 is equipped or designed with a trip mechanism, then removal or separation of the AIM 160 beyond a certain distance from the ART 150 causes a detectable change in state of the AIM 160. Non-limiting examples of trip mechanisms include physical or electronic switches, a relay, or other closed circuit that is fastened to the object. Removal or tampering is detected by the AIM 160 emitting a signal or changing its response to an interrogation signal due to being in the tampered state.

Another example of a trip mechanism of RFID tags is an antenna wire or conductor that once attached to the object, can only be removed by breaking or destroying the antenna, thus indicating that the AIM 160 has been tampered with and may indicate a suspect piece of ART 150. The AIM 160 may either cease to function, or otherwise change to indicate to the interrogator that it has been tampered with. This AIM connection can be a chemical adhesive to the ART 150, or an electronic contact switch that triggers a change to the AIM 160 when moved equivalent to a mechanical relay, an electronic, voltaic or photovoltaic bridge that once broken, cannot be reversed or even a chemically stable bond when attached, and the AIM 160 changes due to an irreversible chemical reaction when removed from the ART 150.

Figure 6F:
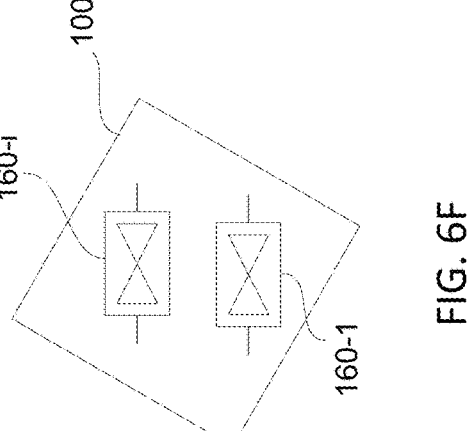
Figure 6D:
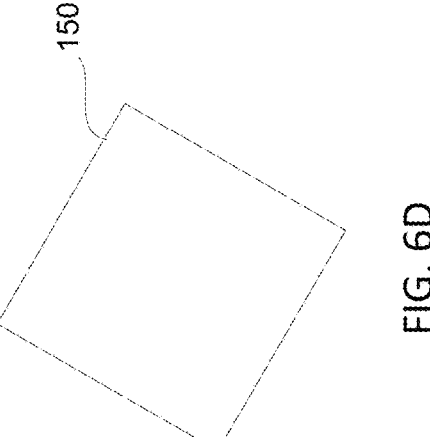

FIG. 6F illustrates one example of a diagram key of a TA 100. A TA 100 is an ART that includes a number, i, of AIMs 160. An immutable token ("IT") 400 is a calculated sum of all AIMs 160 of a TA 100 and forms a Raotronic fingerprint of the TA 100. The IT of an TA 100 is calculated and assigned by a manufacturer, assembly, and/or a supplier. The IT value is stored in a database 530 of WAAL 500 and/or in a non-transitory machine readable storage medium 760 of a PPL 700. As will be understood by one of ordinary skill in the art, the IT value may be used to authenticate the ART 150 and to track the movement of the ART 150 through a supply chain.

Figure 6G:
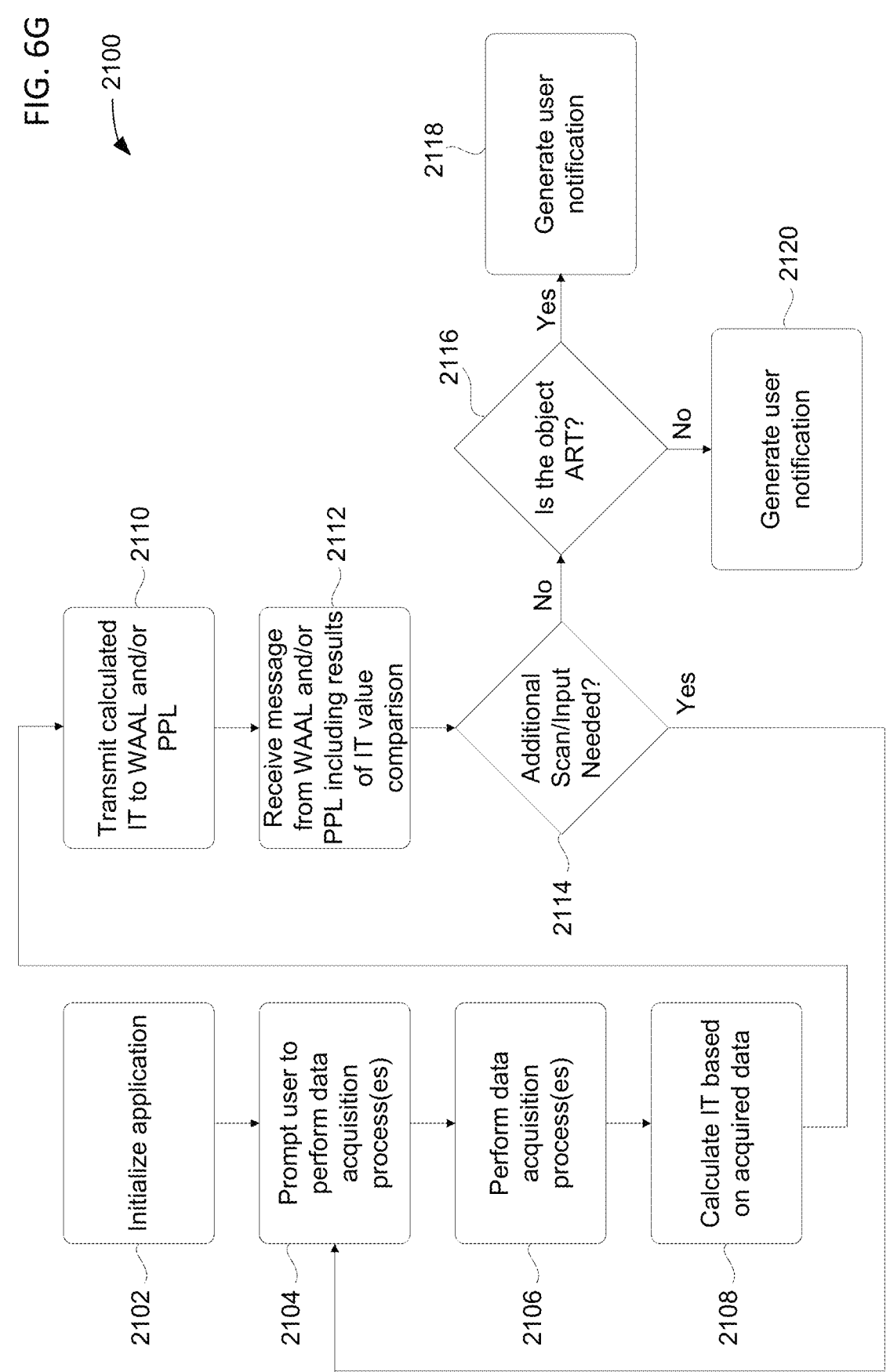
Figure 6K:
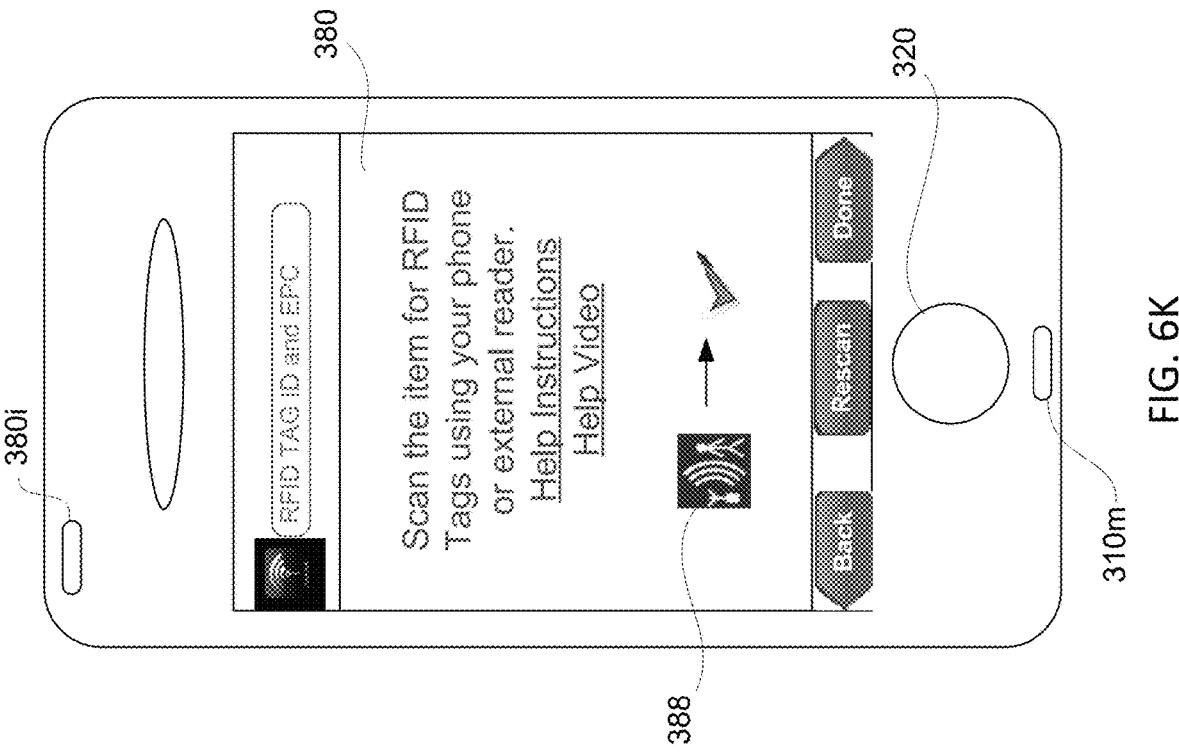
Figure 6J:
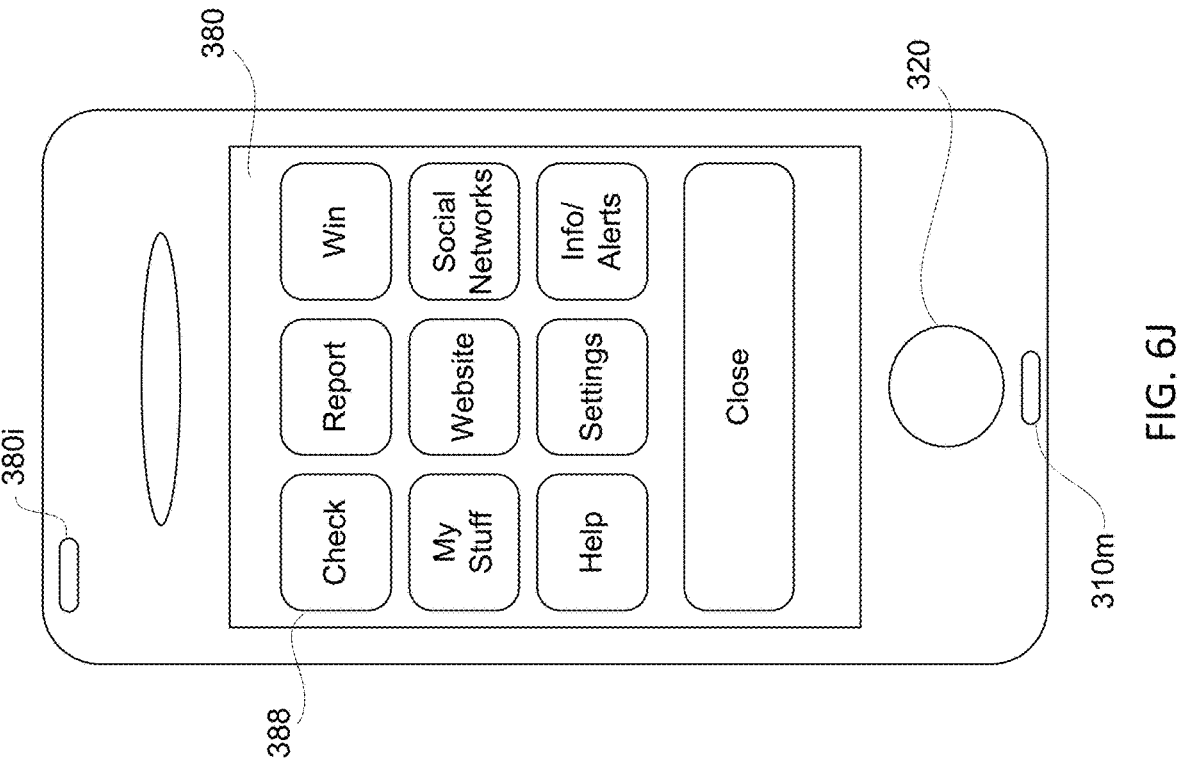

One example of a method of authenticating an ART 150 using an ITR 300 is described with reference to FIGS. 6G-6O. Referring first to FIG. 6G, method 2100 begins at block 2102 when the AAVP program 340 is initialized on an ITR 300. FIG. 6J illustrates one example of a home screen of the AAVP 340 displayed to a user of an ITR 300, which takes the form of a tablet or smart phone. In some embodiments, the AAVP 340 is executed by a processor 350 of a stationary ITR 300 such as a computer or kiosk. As understood by one of ordinary skill in the art, processor 350 executes the AAVP 340 and causes a home screen graphical user interface ("GUI") to be displayed to a user on display 380. A plurality of virtual icons 388 are presented to a user on display 380. In some embodiments, icons 388 provide a user with various options such as, for example, perform a check ("Check"), access a report ("Report"), win items ("Win"), review authenticated items ("My Stuff"), go to website ("Website"), access social network interface "Social Networks"), help ("Help"), adjust settings ("Settings"), access information or alerts ("Info/Alerts"), and close the program ("Close").

If a user selects the Check icon, then the AAVP 340 prompts the user to perform one or more data acquisition processes at block 2104. For example, and referring to FIG. 6K, a message is displayed to a user on display 380 requesting the user to perform a first data acquisition process, such as scan an RFID tag of a TA 100.

At block 2106, the first data acquisition process is performed. In some embodiments, one data acquisition process is performed in response to a user input, such as a user contacting a graphical icon 388 that triggers ITR 300 to perform the first data acquisition process. In embodiments in which the first data acquisition process is an RFID scan, an RFID reader 310h, 310u of ITR 300 emits a trigger signal to interrogate an RFID tag affixed to the ART 150. In some embodiments, the trigger signal is a high frequency signal, e.g., 3-30 MHz, and/or an ultra-high frequency signal, e.g., 300 MHz-3 GHz. In response to the trigger signal, RFID reader(s) 310h, 310u receive a signal from an RFID tag, which includes the tag ID ("TID") of the tag. The TID is stored in a memory 360m, 360s such that the TID is associated with a data file of the ART 150 being authenticated.

Figure 6M:
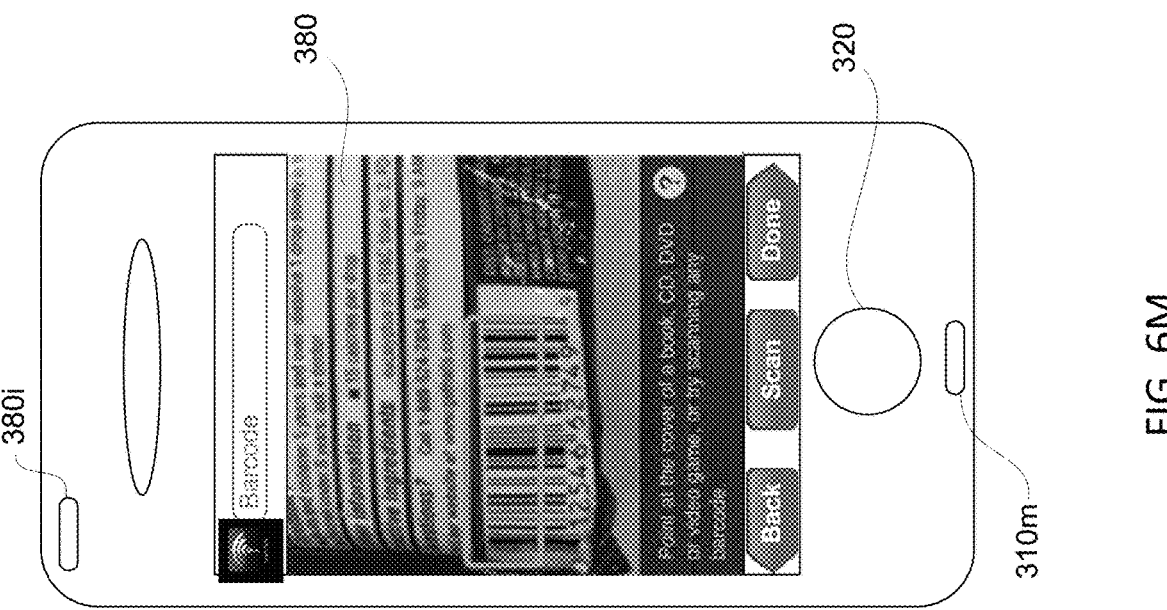
Figure 6L:
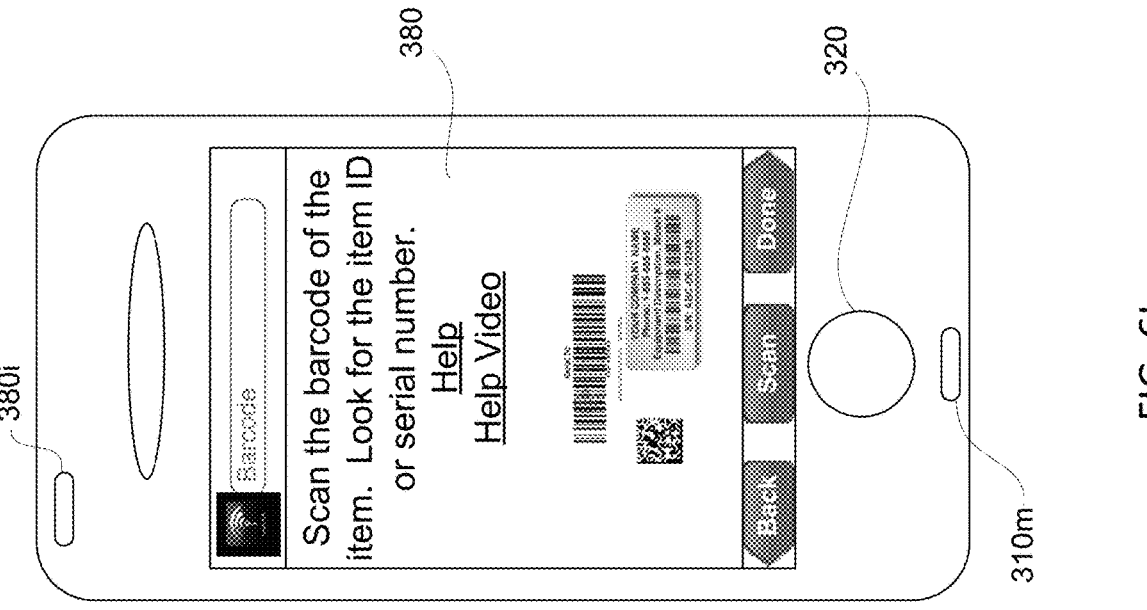

FIGS. 6L and 6M illustrate another example of a data acquisition process that may be performed at blocks 2104 and 2106. Referring first to FIG. 6L, a GUI is displayed on display 380 prompting a user to scan a barcode. A user taps the "Scan" button, which engages the camera 310c. As shown in FIG. 6M, display 380 shows projects the image acquired by the camera 310c such that the user can line up the barcode, which is then scanned by ITR 300.

Figure 6O:
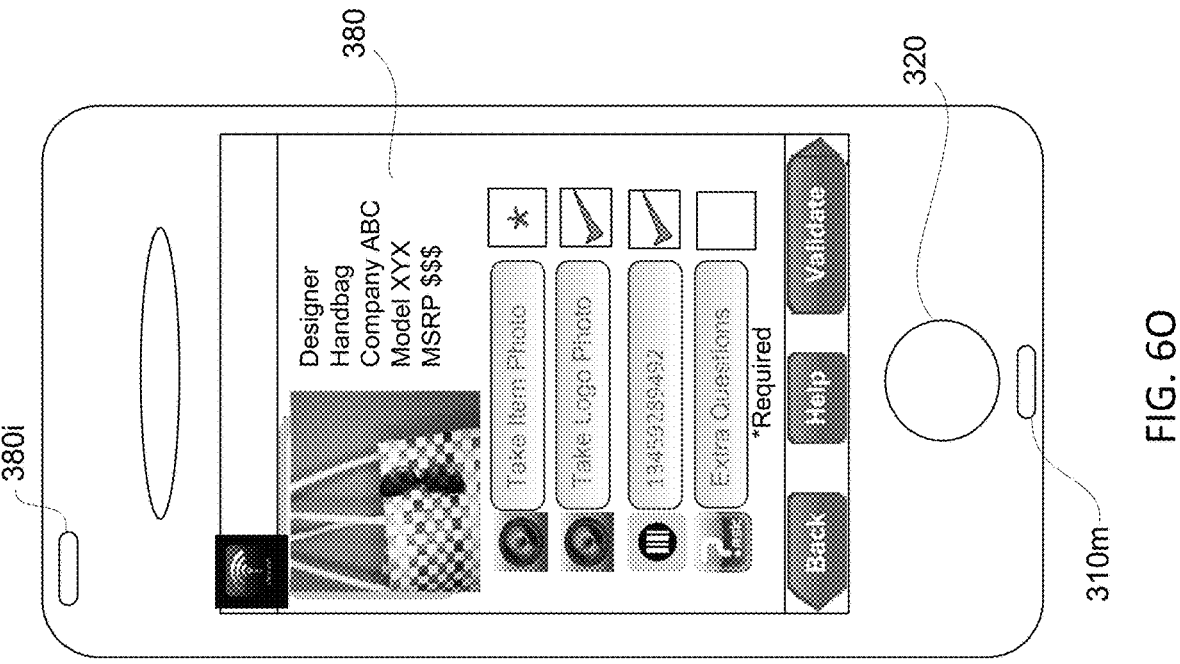
Figure 6N:
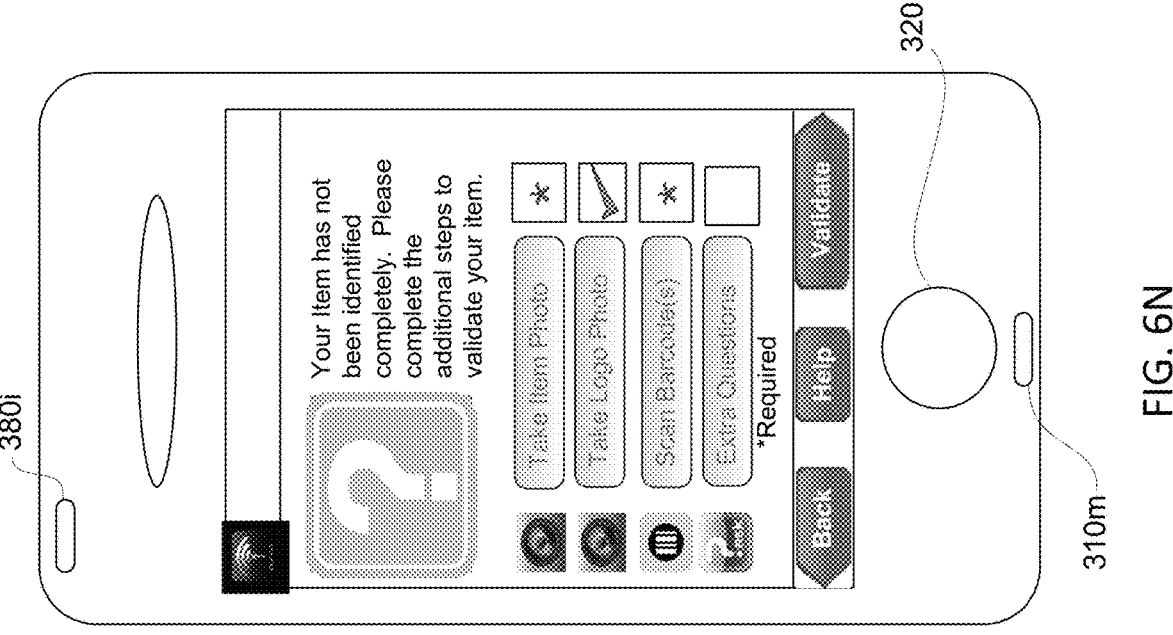

Each data acquisition process is used to create a profile for the object to confirm that the object is ART 150. As illustrated in FIG. 6N, display 380 presents a GUI to a user that includes a checklist of possible data acquisition processes that can be formed to collect data for authenticating an object 100 or 150. Examples of such data acquisition processes include, but are not limited to, taking a photograph of the object, taking a photograph of identifying indicia of the object (e.g., a logo or trademark), a barcode scan, and reading an RFID tag, to list but only a few possibilities. FIG. 6O illustrates the checklist having been updated to include a photograph of the object along with the barcode.

In some embodiments, multiple photographs are acquired of various aspects of an object 100 or 150 to authenticate an object. For example, if the object 100 or 150 being authenticated is apparel, the object's profile stored by WAAL 500 may include numerous parameters that are to be checked for authenticity. Taking a shirt as an example, an authentic version of the shirt may include an RFID tag, a hangtag including a barcode that is looped through a particular buttonhole of the shirt, a company logo or emblem, and a particular type of collar. Consequently, a user of the ITR 300 may be prompted to acquire an image of each of these particular features for comparison by the AAVP 340 and WAAL 500.

In some embodiments, multiple RFID or other scans are used to authenticate an item. For example, a consumer electronics product or OEM assembly for a government entity (e.g., the Department of Defense ("DOD")) typically includes multiple OEM components that can each be interrogated. If the electronic device includes a wireless access chip and a Bluetooth chip, ITR 300 can pair with the electronic device to acquire the Bluetooth ID and a MAC address of the wireless access chip can be acquired by the ITR 300. The Bluetooth ID and MAC address of the wireless access chip are used by the AAVP 340 and WAAL 500 for authentication as described in greater detail below.

In some embodiments, a combination of scans and photographs are used for authenticating an item. For example, a pharmaceutical package may be secured with a tamper-proof (resistant) RFID tag and including a content label comprising a barcode. The content label may include a logo, lot number, expiration date, and/or a manufacturer's list of compounds or ingredients. In some embodiments, the container, which may be a plastic bottle or other suitable pharmaceutical container, is also embossed with a lot number.

ITR 300 interrogates the RFID tag using an RFID reader (e.g., wave reader 310w or RFID readers 301h, 310u) and acquires one or more images of the label and pharmaceutical package using camera 310c. In some embodiments, the AAVP 340 includes an optical character recognition ("OCR") program for extracting data from the one or more images acquired by camera 310c. For example, the lot number, expiration date, and/or list of compounds or ingredients can be recognized from the one or more images acquired by camera 310c of ITR 300.

Referring again to FIG. 6G, processor 350 executes AAVP 340 and calculates an IT value for the ART 150 at block 2108 based on the AIM values collected during the data acquisition. In some embodiments, the IT calculation includes applying weights to data values. For example, an image may be weighted less than a weight of an RFID tag or barcode value since a counterfeit object may have a similar if not identical appearance to an authentic object. The Raotronic fingerprint (i.e., calculated IT value), is calculated based on several factors including, but not limited to, the number of AIMs 160, types of AIMs 160, accuracy of AIMs 160, number of records, and number weighting factors. Increasing the number of factors that are taken into consideration increases the strength of the authentication while preventing false negatives as described above.

The following provides one example of an authentication calculation for a shirt, which has a profile identifying a total of 370 possible points, with 200 points provided for a match of a TID of an RFID tag, a barcode match providing 50 points, a color match providing 25 points, a size match providing 20 points, and a lot and cut match providing 75 points. If data acquisition processes are performed on a shirt such that 300 of the possible 370 points are identified (e.g., 200 points for the TID matching, 25 points for the color match, and 75 points for the lot and cut match), then the IT value is 300 or 0.811 percent of a match.

Referring again to the pharmaceutical container example described above, the IT calculation is based on the expiration data, the RFID tag ID, which is weighted five times as much that the expiration data, the lot number bar code, which is weighted twice as much as the expiration data. The visual (e.g., optical) comparison of the company logo may be given a weight of twice that of the expiration data. Out of a possible 100 percent match, the data acquisition processes may identify a 90 percent of the possible values based on a horizontal confidence. Based on a population of several thousands of bottles in the lot, the value is strengthened by five percent to 95 percent. If a manufacturer had been alerted that the lot number had been compromised, then the value may be lowered to 85 percent.

At block 2110, the IT value calculated by ITR 300 (and other data in some embodiments) is transmitted to a WAAL 500 and/or to a PPL 700. The calculated IT value can be transmitted to WAAL 500 and/or to one or more PPLs 700 via network 999. In some embodiments, the message transmitting the calculated IT value is encrypted prior to transmission.

The process performed by WAAL 500 in response to receiving the message and the calculated IT value from ITR 300 is described with reference to FIG. 6H, which is a flow diagram of one example of an authentication method 2200 performed by WAAL 500. At block 2202, WAAL 500 receives the message including the calculated IT value. In some embodiments, the message including the calculated IT value is received directly from ITR 300 via network 999, and, in some embodiments, WAAL 500 receives the calculated IT value from a PPL 700, which forwards the calculated IT value in the event PPL 700 was not able to confirm the authenticity of the object based on the calculated IT value as described in greater detail below with respect to FIG. 6I.

At block 2204, the calculated ITR value (and other data, if applicable) is extracted from the message and compared to IT values stored in database 530. In some embodiments, WAAL 500 hashes the ITR value and compares the hash key to a hashing table to determine if the calculated IT value resides in memory. In some embodiments, WAAL 500 performs a straight comparison of the calculated value to the stored IT values.

At block 2206, WAAL 500 transmits a message to ITR 300 that confirms the authentication of the object as being an ART 150, identifies the object as not being ART 150, requests additional information, and/or identifies a probability that the item is authentic or counterfeit. In some embodiments, the message transmitted directly from WAAL 500 to ITR 300 via network 999. In some embodiments, such as embodiments in which WAAL 500 receives the message from ITR 300 via a PPL 700, WAAL 500 transmits a message destined for ITR 300 to PPL 700 with instructions to forward the message to ITR 300.

If the calculated IT value received from ITR 300 matches a value stored in database 530 or varies from a value stored within database 530 within a first predetermined error range, then WAAL 500 transmits a message identifying that the object interrogated by ITR 300 is ART 150. If the IT value does not match an IT value in database 530 and is outside the first predetermined range, but within a second predetermined range, then the message transmitted from WAAL 500 requests ITR 300 provide additional data and/or recalculate the IT value before WAAL 500 will authenticate the object as ART 150. If the calculated IT value received from ITR 300 does not match an IT value in database 530 and is outside of the second predetermined range, then the message transmitted from WAAL 500 to ITR 300 identifies the object as not being ART 150. As will be understood by one of ordinary skill in the art, the greater the number and strength of AIMs 160, and depending on the closeness of the match to the WAAL database 530, the higher the probability is that the object is ART 150.

Turning now to FIG. 6I, which is a flow diagram of an authentication method 2300 performed by a PPL 700, PPL 700 receives a message including the calculated IT value from ITR 300 via network 999 at block 2302.

At block 2304, PPL 700 extracts the calculated IT value from the message and compares the extracted IT value to values stored in a database 730 controlled by and local to PPL 700. In some embodiments, PPL 700 hashes the ITR value received from ITR 300 and compares the hash key to a hashing table to determine if the calculated IT value resides in memory. In some embodiments, PPL 700 performs a straight comparison of the calculated IT value received from ITR 300 to stored IT values.

At decision block 2306, PPL 700 determines if the calculated IT value received from ITR 300 matches an IT value within the local database 730 or is within a first or second predetermined range of one of the stored IT values.

If the calculated IT value received from ITR 300 does not match and is not within one of the predetermined error ranges, then method 2300 proceeds to block 2308. At block 2308, PPL 700 transmits a message including the calculated IT value received from ITR 300 to WAAL 500, which performs the authentication check method 2200 described above with respect to FIG. 6H. PPL transmits the message to WAAL 500 such that WAAL 500 can perform a secondary check of the calculated IT value using WAALs database 530, which is larger than a database 730 retained by PPL 700.

At block 2310, PPL 700 receives message from WAAL 500. In some embodiments, the message received from WAAL 500 includes a copy of an IT value and the associated data of ART 150 if WAAL 500 was able to identify a match (or a suitable match within a predetermined error range) to the calculated IT value received from ITR 300. PPL 700 extracts the data included in the message from WAAL 500 and updates its associated database 730. In some embodiments, the message received from WAAL 500 identifies that WAAL 500 was not able to identify an identical or suitable match (i.e., a match within a predetermined range).

At block 2312, PPL 700 transmits a message to ITR 300 via network 999. If the calculated IT value received from ITR 300 matched or was a suitable match (i.e., is within a first predetermined range of an IT value) as determined by PPL 700 or by WAAL 500, then PPL 700 transmits a message to ITR 300 identifying that the interrogated object is an ART 150. If the calculated IT value received from ITR 300 does not match an IT value and is not within the first predetermined range, but is within a second predetermined range as determined by PPL 700 or WAAL 500, then PPL 700 transmits a message to ITR 300 requesting additional data and/or requesting ITR 300 to recalculate the IT value. If the calculated IT value received from ITR 300 does not match an IT value and is outside of the second predetermined range as determined by PPL 700 or WAAL 500, then the message transmitted from PPL 700 to ITR 300 identifies the object as not being ART 150.

Referring again to FIG. 6G, ITR 300 receives a message from WAAL 500 or PPL 700 and determines if additional data acquisition is needed at decision block 2114. ITR 300 determines if additional data acquisitions processes should be performed based on the message received from WAAL 500 or PPL 700. If additional data acquisition is needed, then ITR 300 proceeds to block 2104 where a user is prompted to perform one or more data acquisition processes. As described above, additional data acquisition may be needed if WAAL 500 and/or PPL 700 cannot definitively determine if the calculated IT value corresponds to a stored IT value. For example, if the calculated value does not exactly or suitably match a stored IT value, but is with the second predetermined range of values, then additional data acquisition processes should be performed.

A notification that additional data acquisition is required to authenticate the object can be provided to the user. For example, display 380*d* can generate a message requesting additional data acquisition. In some embodiments, LEDs 380*i* can generate a predetermined color, e.g., a yellow light, which indicates that additional data acquisition is needed before the object can be authenticated. Speaker 370*s* and/or oscillator 370*o* can also generate notifications to a user. For example, speaker 370*s* may emit multiple beeps or tones or play a message requesting additional data acquisition steps be performed. Oscillator 370*o* may provide a series of short or long pulses, which indicates that additional data steps are needed before the object can be authenticated as ART/TA. One of ordinary skill in the art will understand that the notifications are not exclusive of one another and each can be simultaneously generated. In some embodiments, the AAVP 340 enables a user to customize the types of notifications he/her would like to receive, e.g., audible, tactile, and/or visual.

If additional data acquisition is not needed, then ITR 300 moves to decision block 2116 to determine if the interrogated object is ART 150. In some embodiments, the decision at block 2116 is based on the message received from WAAL 500 or PPL 700. If the object is determined to be ART 150, then ITR 300 moves to block 418 and generates one or more notifications to a user on display 380*d* identifying that the object is ART. For example, display 380*d* can generate a message identifying the object as ART/TA. In some embodiments, LED(s) 380*i* emit a light, such as a green light, signifying that the object is ART/TA. Speaker 370*s* can emit a sound indicating the object is ART/TA and/or oscillator 370*o* can generate a series of pulses signifying that the object is authentic.

If the object is determined to not be ART 150, then ITR 300 moves to block 2120 and generates one or more notifications to a user on display 380*d* identifying that the object is not ART. Visual, audible, and/or tactile notifications can be generated by one or more of LED(s) 380*i*, display 380*d*, speaker 370*s*, and/or oscillator 370*o*. For example, LED(s) 380*i* can be configured to generate a red light and display can be configured to generate a message conveying that the object is not authentic. Speaker 370*s* can be configured to emit a noise or message, and oscillator 370*o* can be configured to provide one or more pulses that identify the object as not being authentic.

Figure 6P:
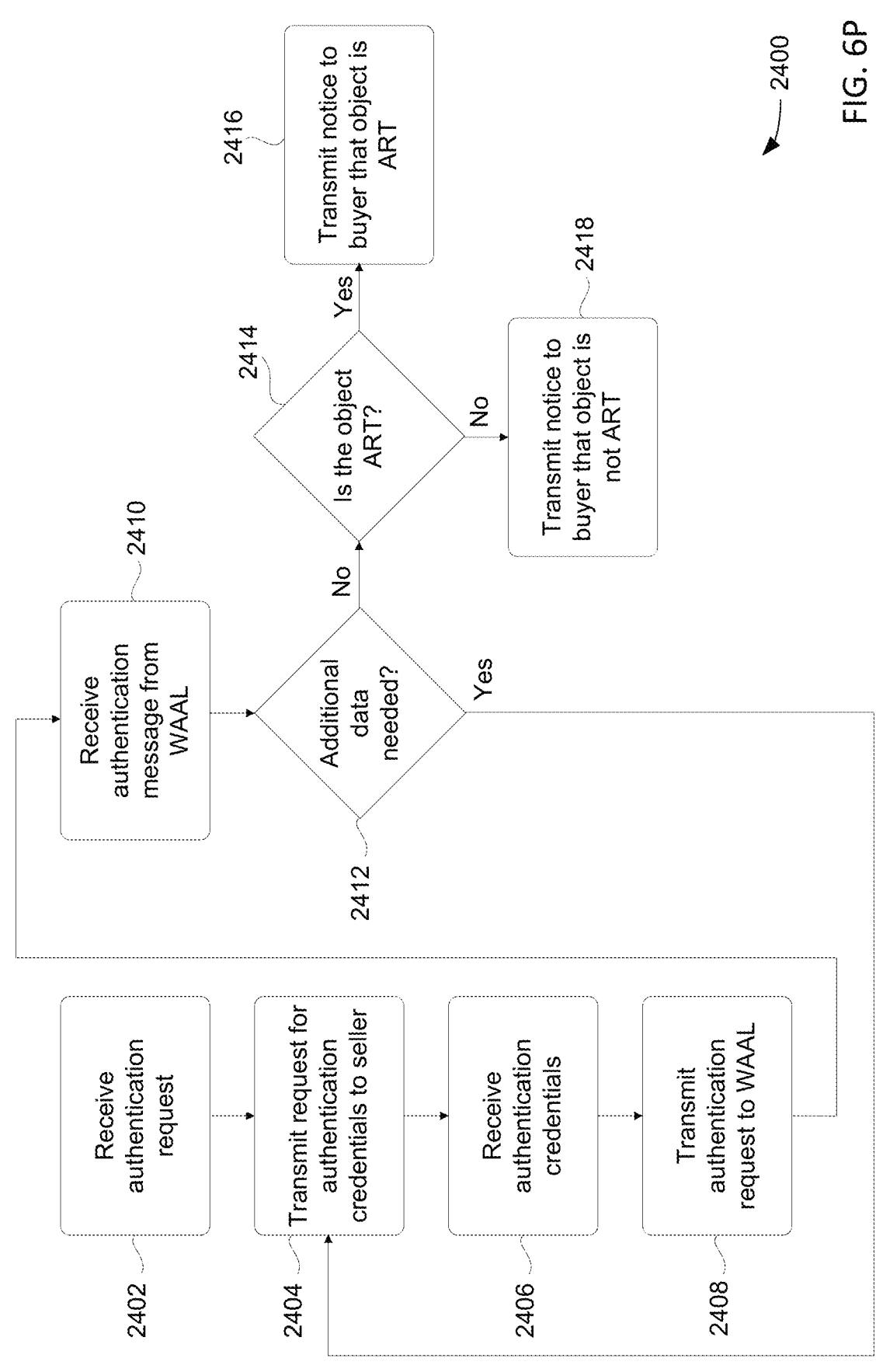

WAAL 500 can also be used to authenticate goods purchased via an online retailer or reseller. One example of such an authentication method is described with reference to FIGS. 6P-6Q, which are flow diagrams of one example of such a method. Referring first to FIG. 6P, an online marketer 800, such as a distributer or auction house, receives a request from a purchaser for the marketed object to be authenticated at block 2402.

At block 2404, online marketer 800 transmits a message to the seller requesting the AIM values or other authentication credentials. The message transmitted to seller can request various AIMs including, but not limited, the serial number and product number, which may be obtained from one or more barcodes, the location from which the object was procured, where the object currently resides, the NFC data if the object includes an NFC tag, and one or more multi-dimension photos or videos of the object, to provide only a few non-limiting examples.

At block 2406, online marketer 800 receives one or more AIMs 160 from the seller in response to the transmitted request. In some embodiments, online marketer 800 calculates an IT value for the object based on the AIMs 160 received from seller. In some embodiments, online marketer 800 stores the AIM values received from seller without calculating an IT value.

At block 2408, online marketer 800 transmits an authentication request to WAAL 500 or to PPL 700. In some embodiments, the authentication request message transmitted to WAAL 500 includes an IT value calculated by online retailer 800, and in some embodiments, the authentication request message transmitted to WAAL 500 includes the AIM values received from the seller.

Figure 6Q:
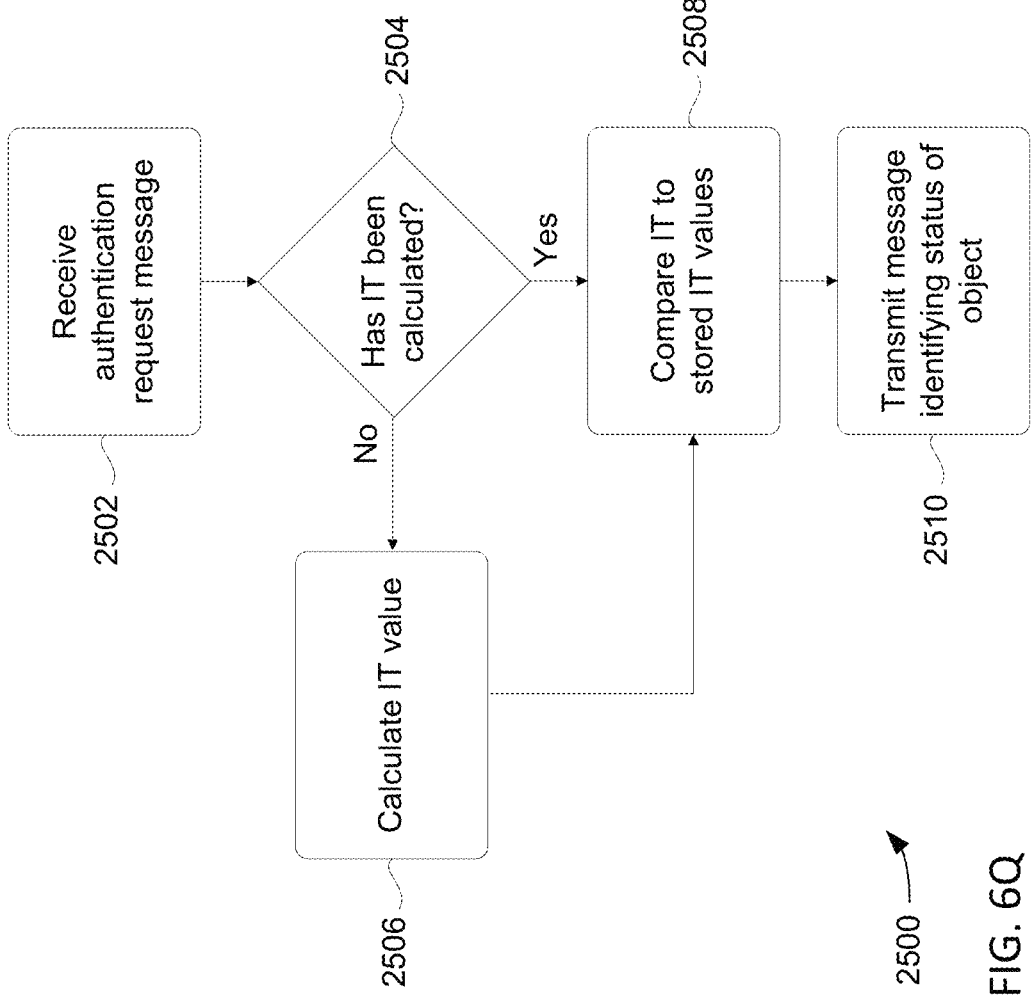

Referring now to FIG. 6Q, which is a flow diagram of one example of an authentication method performed by WAAL 500, WAAL 500 receives the authentication request message at block 2502. In some embodiments, the authentication request message received from online marketer 800 is received via network 999 in accordance with the API of WAAL 500.

At decision block 2504, WAAL 500 parses the received message and determines if the message includes a calculated IT value. If the message does not include an IT value, then method 2500 moves to block 2506 where WAAL 500 calculates an IT value from the AIM values provided in the message received from online retailer 800.

At block 2508, with an IT value having been calculated either by online retailer 800 or by WAAL 500, WAAL 500 compares the calculated IT value to IT values stored in database 530. In some embodiments, the comparison at block 2508 includes hashing the calculated IT value and comparing the hash key to a hash table stored in database 530. In some embodiments, WAAL 500 performs a straight comparison of the calculated IT value to the stored IT values.

At block 2510, WAAL 500 transmits a message to online retailer 800 that confirms the authentication of the object as an ART 150, identifies the object as not being ART 150, or requests additional information. For example, if the calculated IT value matches a value stored in database 530 or is within a suitable range of values stored as an authenticity defining criterion (i.e., is within a first predetermined range), then WAAL 500 transmits a message identifying that the object is ART 150. If the calculated IT value does not match an IT value in database 530 and is outside the first predetermined range, but within a second predetermined range, then the message transmitted from WAAL 500 to online retailer 800 requests additional data. If the calculated IT value does not match an IT value in database 530 and is outside of the second predetermined range, then the message transmitted from WAAL 500 to online retailer identifies the object as not being ART 150.

Turning back to FIG. 6P, online retailer 800 receives the authentication message from WAAL 500 at block 2410. As described above, the authentication message received from WAAL 500 includes a determination of whether the object is ART 150, the object is not ART 150, or additional information is needed by WAAL 500 before WAAL 500 can authenticate the object.

At decision block 2412, online retailer 800 determines whether additional information is needed before the object can be authenticated. If the message received from WAAL 500 identifies that additional information is needed (i.e., the calculated IT value was outside of the first predetermined range, but within the second predetermined range), then method 2400 moves to block 2404 and requests the seller to provide additional information about the object.

If the message received from WAAL 500 identifies that additional information is not needed (i.e., the calculated IT value was within the first predetermined range or outside the second predetermined range), then method 2400 moves to decision block 2414 to determine if the object has been authenticated, i.e., if the object is ART 150.

If the message received from WAAL 500 identifies the object as being ART 150, then online retailer 800 transmits a message to the prospective buyer at block 2416 that notifies the buyer that the object was able to be authenticated and is ART. In some embodiments, the message transmitted to the prospective buyer at block 2416 includes a certificate of authentication that includes embedded links to a website or portal maintained by WAAL 500 that enables the prospective buyer to access the profile of the object that has been identified as ART 150. The ART profile can include AIM data including, but not limited to, the name of the vendor, date of certification, certification product details and a description of the product.

If the message received from WAAL 500 identifies the object as not being ART 150, then online retailer 800 transmits a message to the prospective buyer at block 2418 that notifies the buyer that the object cannot be authenticated, but that it is not ART.

The systems and methods described above can also be used to assess risk for large assemblies in which authentication is critical such as assemblies for national defense (e.g., cars, trucks, drones, fighter planes, self-guided munitions, etc.). For example and referring to FIG. 6R, the AAVP can be configured to present graphics to a user on a display 124, 170 that identifies the likelihood of authentication and the associated risk. The amount of risk associated with a certain authenticity percentage may be configured by a particular entity, e.g., government, defense contractor, etc.

Figure 6R:
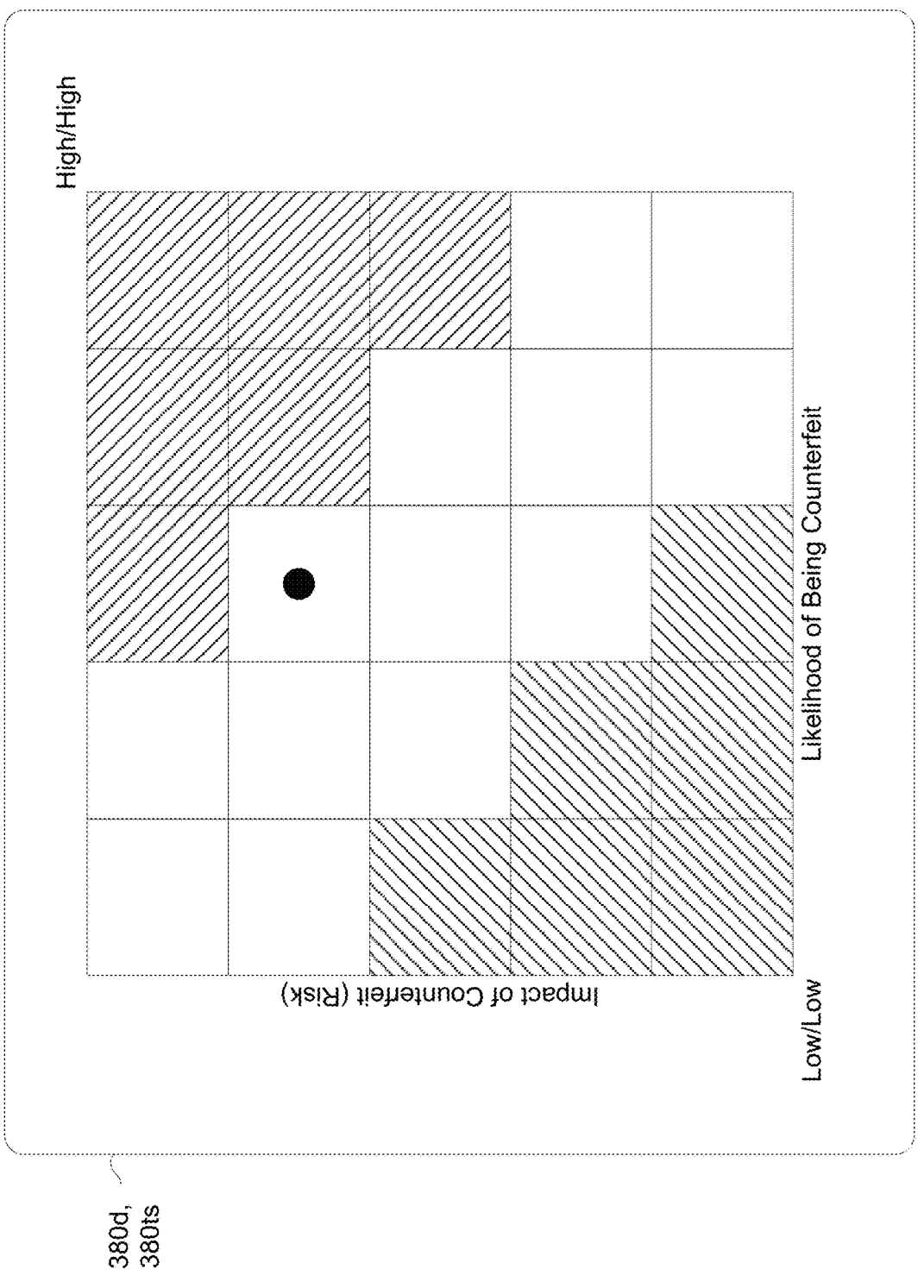

The AAVP generates the graphics illustrated in FIG. 6R after performing numerous data acquisition processes on one or more components of the assembly. Interrogating the components in a supply chain or a finished assembly provides an increased assurance that the goods are authentic and have not been tampered.

The systems and methods described above advantageously enable objects to be identified using various data. The WAAL 500, a central repository of authentication information, is able to be accessed via networks 999 such that individual users and organizations can access the database 530. By providing data that can be used for authentication, brand name owners and manufacturers can track goods through supply chains as well as ensure that the ultimate purchasers are receiving authentic goods.

The present invention can be embodied in the form of methods and apparatus for practicing those methods. The present invention can also be embodied in the form of program code embodied in tangible media, such as secure digital ("SD") cards, USB flash drives, diskettes, CD-ROMs, DVD-ROMs, Blu-ray disks, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

There is thus disclosed a system and a method for authenticating objects in a manner that is based on information gathered from a wide and decentralized variety of sources.

A method for distributed authentication includes: storing, within a first computing device and a second computing device of a validation network, a first immutable token (IT) that incorporates at least a first data concerning a first characteristic of a registered virtual object; receiving, at the first computing device and at the second computing device, and from a reading device of the validation network, a request to authenticate another virtual object as being the registered virtual object based on a second IT associated with the other virtual object; separately comparing, at the first computing device and at the second computing device, the second IT to the first IT; separately determining, at the first computing device and at the second computing device, whether to authenticate the other virtual object based on a degree to which the second IT matches the first IT; transmitting, from the first computing device, and to the reading device, a first indication of whether the other virtual object is able to be authenticated; and transmitting, from the second computing device, and to the reading device, a second indication of whether the other virtual object is able to be authenticated.

Determining whether to authenticate the other virtual object based on a degree to which the second IT matches the first IT may include performing operations including: determining, at the first computing device, whether the second IT matches the first IT to within a first predetermined degree;

and in response to the second IT matching the first IT to within the first predetermined degree, transmitting, from the first computing device, and to the reading device, an indication that the other virtual object is able to be authenticated. In response to the second IT failing to match the first IT to within the first predetermined degree, determining whether to authenticate the other virtual object may further include performing operations including: determining, at the first computing device, whether the second IT matches the first IT to within a second predetermined degree; in response to the second IT matching the first IT to within the second predetermined degree, transmitting, from the first computing device, and to the reading device, a request for at least a second data concerning a second characteristic of the other virtual object; and in response to the second IT failing to match the first IT to within the second predetermined degree, transmitting, from the first computing device, and to the reading device, an indication that the other virtual object cannot be authenticated.

The first data may include an indication of a first location of the registered virtual object; and the second data may include an indication of a second location to which the registered virtual object is purported to have been moved at a time after the registered virtual object was at the first location.

The first location and the second location, together, may be purported to specify at least a portion of a chain of custody of the registered virtual object.

The first data may include a measure of the first characteristic of the registered virtual object detected by another reading device at a time when the registered virtual object was registered, wherein registration of the registered virtual object may include: generating the first IT based on at least the first data; and storing the first IT within at least the first computing device and the second computing device.

The second data may include a measure of the second characteristic of the other virtual object detected by the reading device.

Incorporation of the first data into the first IT may include applying a first weight to the first data; and the first weight may be based on an evaluation of likelihood of the first data being counterfeited.

Incorporation of the first data into the first IT may include generating a first hash value based on the first data, and incorporating the first hash value into the first IT; and comparing the second IT to the first IT may include comparing a second hash value incorporated into the second IT to the first hash value.

The method may further include: exchanging, between the first computing device and the second computing device, at least one copy of the first IT; and authenticating, within at least one of the first computing device and the second computing device, the at least one copy of the first IT.

The registered virtual object may include a data structure; the data structure may be associated with a physical piece of artwork or an amount of a currency; and the first characteristic may include a characteristic of the physical piece of artwork or a measure of value correlated to the amount of currency.

A system includes a first computing device of a validation network, the first computing device including a first storage configured to store a first immutable token (IT) that incorporates at least a first data concerning a first characteristic of a registered virtual object, and a first processor, wherein the first processor is configured to perform operations including: receive, at the first computing device, and from a reading device of the validation network, a request to authenticate another virtual object as being the registered virtual object based on a second IT associated with the other virtual object; compare, at the first computing device, the second IT to the first IT; determine, at the first computing device, whether to authenticate the other virtual object based on a degree to which the second IT matches the first IT; and transmit, from the first computing device, and to the reading device, a first indication of whether the other virtual object is able to be authenticated. The system also includes a second computing device of the validation network, the second comprising a second storage configured to store the first IT, and a second processor, wherein the second processor is configured to perform operations including: receive, at the second computing device, and from the reading device, the request to authenticate the other virtual object; separately compare, at the second computing device, the second IT to the first IT; separately determine, at the second computing device, whether to authenticate the other virtual object based on the degree to which the second IT matches the first IT; and transmit, from the second computing device, and to the reading device, a second indication of whether the other virtual object is able to be authenticated.

Determining, at the first computing device, whether to authenticate the other virtual object based on a degree to which the second IT matches the first IT may include the first processor being configured to: determine whether the second IT matches the first IT to within a first predetermined degree; and in response to the second IT matching the first IT to within the first predetermined degree, transmit, from the first computing device, and to the reading device, an indication that the other virtual object is able to be authenticated. Determining, at the first computing device, whether to authenticate the other virtual object based on a degree to which the second IT matches the first IT may also include, in response to the second IT failing to match the first IT to within the first predetermined degree, perform operations including: determine whether the second IT matches the first IT to within a second predetermined degree; in response to the second IT matching the first IT to within the second predetermined degree, transmit, from the first computing device, and to the reading device, a request for at least a second data concerning a second characteristic of the other virtual object; and in response to the second IT failing to match the first IT to within the second predetermined degree, transmit, from the first computing device, and to the reading device, an indication that the other virtual object cannot be authenticated.

The first data may include an indication of a first location of the registered virtual object; and the second data may include an indication of a second location to which the registered virtual object is purported to have been moved at a time after the registered virtual object was at the first location.

The first location and the second location, together, may be purported to specify at least a portion of a chain of custody of the registered virtual object.

The first data may include a measure of the first characteristic of the registered virtual object detected by another reading device at a time when the registered virtual object was registered, wherein registration of the registered virtual object may include: generating the first IT based on at least the first data; and storing the first IT within at least the first computing device and the second computing device.

The second data may include a measure of the second characteristic of the other virtual object detected by the reading device.

Incorporation of the first data into the first IT may include applying a first weight to the first data; and the first weight may be based on an evaluation of likelihood of the first data being counterfeited.

Incorporation of the first data into the first IT may include generating a first hash value based on the first data, and incorporating the first hash value into the first IT; and comparing the second IT to the first IT may include comparing a second hash value incorporated into the second IT to the first hash value.

The first processor and the second processor may be configured to cooperate to: exchange, between the first computing device and the second computing device, at least one copy of the first IT; and authenticate, within at least one of the first computing device and the second computing device, the at least one copy of the first IT.

The registered virtual object may include a data structure; the data structure may be associated with a physical piece of artwork or an amount of a currency; and the first characteristic may include a characteristic of the physical piece of artwork or a measure of value correlated to the amount of currency.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the claimed invention not be limited to the particular embodiment disclosed as the best mode contemplated for carrying out this invention, but that the invention will include all embodiments falling within the scope of the appended claims.

The invention claimed is:

1. A method for distributed authentication, the method comprising:

storing, within a first computing device and a second computing device of a validation network, a first immutable token (IT) that incorporates at least a first data concerning a first characteristic of a registered virtual object;

receiving, at the first computing device and at the second computing device, and from a reading device of the validation network, a request to authenticate another virtual object as being the registered virtual object based on a second IT associated with the other virtual object;

separately comparing, at the first computing device and at the second computing device, the second IT to the first IT;

separately determining, at the first computing device and at the second computing device, whether to authenticate the other virtual object based on a degree to which the second IT matches the first IT;

transmitting, from the first computing device, and to the reading device, a first indication of whether the other virtual object is able to be authenticated; and transmitting, from the second computing device, and to the reading device, a second indication of whether the other virtual object is able to be authenticated.

2. The method of claim 1, wherein determining whether to authenticate the other virtual object based on a degree to which the second IT matches the first IT comprises performing operations comprising:

determining, at the first computing device, whether the second IT matches the first IT to within a first predetermined degree;

in response to the second IT matching the first IT to within the first predetermined degree, transmitting, from the first computing device, and to the reading device, an indication that the other virtual object is able to be authenticated; and in response to the second IT failing to match the first IT to within the first predetermined degree, performing operations comprising:

determining, at the first computing device, whether the second IT matches the first IT to within a second predetermined degree;

in response to the second IT matching the first IT to within the second predetermined degree, transmitting, from the first computing device, and to the reading device, a request for at least a second data concerning a second characteristic of the other virtual object; and in response to the second IT failing to match the first IT to within the second predetermined degree, transmitting, from the first computing device, and to the reading device, an indication that the other virtual object cannot be authenticated.

3. The method of claim 2, wherein:

the first data comprises an indication of a first location of the registered virtual object; and the second data comprises an indication of a second location to which the registered virtual object is purported to have been moved at a time after the registered virtual object was at the first location.

4. The method of claim 3, wherein the first location and the second location, together, are purported to specify at least a portion of a chain of custody of the registered virtual object.

5. The method of claim 2, wherein the first data comprises a measure of the first characteristic of the registered virtual object detected by another reading device at a time when the registered virtual object was registered, wherein registration of the registered virtual object comprises:

generating the first IT based on at least the first data; and storing the first IT within at least the first computing device and the second computing device.

6. The method of claim 5, wherein the second data comprises a measure of the second characteristic of the other virtual object detected by the reading device.

7. The method of claim 1, wherein:

incorporation of the first data into the first IT comprises applying a first weight to the first data; and the first weight is based on an evaluation of likelihood of the first data being counterfeited.

8. The method of claim 1, wherein:

incorporation of the first data into the first IT comprises generating a first hash value based on the first data, and incorporating the first hash value into the first IT; and comparing the second IT to the first IT comprises comparing a second hash value incorporated into the second IT to the first hash value.

9. The method of claim 1, further comprising:

exchanging, between the first computing device and the second computing device, at least one copy of the first IT; and authenticating, within at least one of the first computing device and the second computing device, the at least one copy of the first IT.

10. The method of claim 1, wherein:

the registered virtual object comprises a data structure;

the data structure is associated with a physical piece of artwork or an amount of a currency; and the first characteristic comprises a characteristic of the physical piece of artwork or a measure of value correlated to the amount of currency.

11. A system comprising:

a first computing device of a validation network, the first computing device comprising a first storage configured to store a first immutable token (IT) that incorporates at least a first data concerning a first characteristic of a registered virtual object, and a first processor, wherein the first processor is configured to perform operations comprising:

receive, at the first computing device, and from a reading device of the validation network, a request to authenticate another virtual object as being the registered virtual object based on a second IT associated with the other virtual object;

compare, at the first computing device, the second IT to the first IT;

determine, at the first computing device, whether to authenticate the other virtual object based on a degree to which the second IT matches the first IT; and transmit, from the first computing device, and to the reading device, a first indication of whether the other virtual object is able to be authenticated; and a second computing device of the validation network, the second comprising a second storage configured to store the first IT, and a second processor, wherein the second processor is configured to perform operations comprising:

receive, at the second computing device, and from the reading device, the request to authenticate the other virtual object;

separately compare, at the second computing device, the second IT to the first IT;

separately determine, at the second computing device, whether to authenticate the other virtual object based on the degree to which the second IT matches the first IT; and transmit, from the second computing device, and to the reading device, a second indication of whether the other virtual object is able to be authenticated.

12. The system of claim 11, wherein determining, at the first computing device, whether to authenticate the other virtual object based on a degree to which the second IT matches the first IT comprises the first processor being configured to:

determine whether the second IT matches the first IT to within a first predetermined degree;

in response to the second IT matching the first IT to within the first predetermined degree, transmit, from the first computing device, and to the reading device, an indication that the other virtual object is able to be authenticated; and in response to the second IT failing to match the first IT to within the first predetermined degree, perform operations comprising:

determine whether the second IT matches the first IT to within a second predetermined degree;

in response to the second IT matching the first IT to within the second predetermined degree, transmit, from the first computing device, and to the reading device, a request for at least a second data concerning a second characteristic of the other virtual object; and in response to the second IT failing to match the first IT to within the second predetermined degree, transmit, from the first computing device, and to the reading device, an indication that the other virtual object cannot be authenticated.

13. The system of claim 12, wherein:

the first data comprises an indication of a first location of the registered virtual object; and the second data comprises an indication of a second location to which the registered virtual object is purported to have been moved at a time after the registered virtual object was at the first location.

14. The system of claim 13, wherein the first location and the second location, together, are purported to specify at least a portion of a chain of custody of the registered virtual object.

15. The system of claim 12, wherein the first data comprises a measure of the first characteristic of the registered virtual object detected by another reading device at a time when the registered virtual object was registered, wherein registration of the registered virtual object comprises:

generating the first IT based on at least the first data; and storing the first IT within at least the first computing device and the second computing device.

16. The system of claim 15, wherein the second data comprises a measure of the second characteristic of the other virtual object detected by the reading device.

17. The system of claim 11, wherein:

incorporation of the first data into the first IT comprises applying a first weight to the first data; and the first weight is based on an evaluation of likelihood of the first data being counterfeited.

18. The system of claim 11, wherein:

incorporation of the first data into the first IT comprises generating a first hash value based on the first data, and incorporating the first hash value into the first IT; and comparing the second IT to the first IT comprises comparing a second hash value incorporated into the second IT to the first hash value.

19. The system of claim 11, wherein the first processor and the second processor are configured to cooperate to:

exchange, between the first computing device and the second computing device, at least one copy of the first IT; and authenticate, within at least one of the first computing device and the second computing device, the at least one copy of the first IT.

20. The system of claim 11, wherein:

the registered virtual object comprises a data structure;

the data structure is associated with a physical piece of artwork or an amount of a currency; and the first characteristic comprises a characteristic of the physical piece of artwork or a measure of value correlated to the amount of currency.

* * * * *